(12) United States Patent
Solomon et al.

(10) Patent No.: US 9,947,481 B2
(45) Date of Patent: Apr. 17, 2018

(54) LUBRICANT-IMPREGNATED SURFACES FOR ELECTROCHEMICAL APPLICATIONS, AND DEVICES AND SYSTEMS USING SAME

(71) Applicant: Massachusetts Institute of Technology, Cambridge, MA (US)

(72) Inventors: Brian Richmond Solomon, Gaithersburg, MD (US); Xinwei Chen, Cambridge, MA (US); Yet-Ming Chiang, Weston, MA (US); Kripa K. Varanasi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 223 days.

(21) Appl. No.: 14/744,792

(22) Filed: Jun. 19, 2015

(65) Prior Publication Data
US 2015/0372350 A1    Dec. 24, 2015

Related U.S. Application Data

(60) Provisional application No. 62/014,207, filed on Jun. 19, 2014.

(51) Int. Cl.
*H01G 9/145* (2006.01)
*H01G 9/035* (2006.01)
(Continued)

(52) U.S. Cl.
CPC ............ *H01G 9/145* (2013.01); *C09D 5/037* (2013.01); *H01G 9/035* (2013.01); *H01G 9/048* (2013.01);
(Continued)

(58) Field of Classification Search
CPC .......... H01M 8/18–8/20; H01M 12/06; H01M 10/052; H01M 10/36; H01M 10/02;
(Continued)

(56) References Cited

U.S. PATENT DOCUMENTS

| 4,069,933 A | 1/1978 | Newing |
| 4,125,152 A | 11/1978 | Kestner et al. |

(Continued)

FOREIGN PATENT DOCUMENTS

| CN | 100344341 C | 10/2007 |
| CN | 101269960 B | 5/2011 |

(Continued)

OTHER PUBLICATIONS

3M Corporation, Fluorinert Liquids for Electronics Manufacturing, 3M Electronic Materials 2003, pp. 1-4.
(Continued)

*Primary Examiner* — Eugenia Wang
(74) *Attorney, Agent, or Firm* — Choate, Hall & Stewart, LLP; William R. Haulbrook; Alexnder D. Augst

(57) ABSTRACT

In certain embodiments, the invention relates to an electrochemical device having a liquid lubricant impregnated surface. At least a portion of the interior surface of the electrochemical device includes a portion that includes a plurality of solid features disposed therein. The plurality of solid features define a plurality of regions therebetween. A lubricant is disposed in the plurality of regions which retain the liquid lubricant in the plurality of regions during operation of the device. An electroactive phase comes in contact with at least the portion of the interior surface. The liquid lubricant impregnated surface introduces a slip at the surface when the electroactive phase flows along the surface. The electroactive phase may be a yield stress fluid.

40 Claims, 19 Drawing Sheets

(51) Int. Cl.

| | | |
|---|---|---|
| *H01G 9/048* | (2006.01) | |
| *H01M 12/06* | (2006.01) | |
| *H01M 10/052* | (2010.01) | |
| *H01M 10/36* | (2010.01) | |
| *H01M 8/12* | (2016.01) | |
| *H01M 8/18* | (2006.01) | |
| *H01M 10/02* | (2006.01) | |
| *H01M 8/02* | (2016.01) | |
| *C09D 5/03* | (2006.01) | |

(52) U.S. Cl.
 CPC .............. *H01M 8/02* (2013.01); *H01M 8/12* (2013.01); *H01M 8/188* (2013.01); *H01M 10/02* (2013.01); *H01M 10/052* (2013.01); *H01M 10/36* (2013.01); *H01M 12/06* (2013.01)

(58) Field of Classification Search
 CPC .......... H01M 8/12; H01M 8/188; H01M 8/02; H01G 9/145; H01G 9/035; H01G 9/048; C09D 5/037
 See application file for complete search history.

(56) References Cited

U.S. PATENT DOCUMENTS

| | | |
|---|---|---|
| 4,204,021 A | 5/1980 | Becker |
| 4,316,745 A | 2/1982 | Blount |
| 4,503,099 A | 3/1985 | Chang et al. |
| 5,154,741 A | 10/1992 | da Costa Filho |
| 5,624,713 A | 4/1997 | Ramer |
| 5,853,802 A | 12/1998 | Boyer et al. |
| 5,900,516 A | 5/1999 | Talley et al. |
| 6,329,490 B1 | 12/2001 | Yamashita et al. |
| 7,323,221 B2 | 1/2008 | Heppekausen et al. |
| 7,338,734 B2 | 3/2008 | Chiang et al. |
| 7,458,384 B1 | 12/2008 | Seal et al. |
| 7,622,197 B2 | 11/2009 | Balow et al. |
| 7,687,593 B2 | 3/2010 | Yamahiro et al. |
| 7,722,951 B2 | 5/2010 | Li et al. |
| 7,887,934 B2 | 2/2011 | Gentleman et al. |
| 7,892,660 B2 | 2/2011 | Gentleman et al. |
| 7,897,271 B2 | 3/2011 | Gentleman et al. |
| 7,977,267 B2 | 7/2011 | Gentleman et al. |
| 7,985,451 B2 | 7/2011 | Luzinov et al. |
| 8,057,922 B2 | 11/2011 | Gentleman et al. |
| 8,057,923 B2 | 11/2011 | Gentleman et al. |
| 8,062,775 B2 | 11/2011 | Gentleman et al. |
| 8,148,013 B2 | 4/2012 | Chiang et al. |
| 8,173,279 B2 | 5/2012 | Gentleman et al. |
| 8,178,219 B2 | 5/2012 | Gentleman et al. |
| 8,222,172 B2 | 7/2012 | Gentleman et al. |
| 8,235,096 B1 | 8/2012 | Mahefkey et al. |
| 8,236,432 B2 | 8/2012 | Gentleman et al. |
| 8,252,259 B2 | 8/2012 | Seal et al. |
| 8,535,779 B1 | 9/2013 | Smith et al. |
| 8,574,704 B2 | 11/2013 | Smith et al. |
| 8,582,807 B2 | 11/2013 | Yang et al. |
| 8,722,227 B2 | 5/2014 | Chiang et al. |
| 8,859,090 B2 | 10/2014 | Angelescu et al. |
| 2002/0164443 A1 | 11/2002 | Oles et al. |
| 2003/0096083 A1 | 5/2003 | Morgan et al. |
| 2003/0134035 A1 | 7/2003 | Lamb et al. |
| 2003/0203117 A1 | 10/2003 | Bartkowiak et al. |
| 2003/0226806 A1 | 12/2003 | Young et al. |
| 2004/0026832 A1 | 2/2004 | Gier et al. |
| 2004/0037961 A1 | 2/2004 | Dieleman et al. |
| 2004/0219373 A1 | 11/2004 | Deruelle et al. |
| 2005/0003146 A1 | 1/2005 | Spath |
| 2005/0009953 A1 | 1/2005 | Shea |
| 2005/0016489 A1 | 1/2005 | Endicott et al. |
| 2005/0061221 A1 | 3/2005 | Paszkowski |
| 2005/0112326 A1 | 5/2005 | Nun et al. |
| 2005/0136217 A1 | 6/2005 | Barthlott et al. |
| 2005/0208272 A1 | 9/2005 | Groll |
| 2006/0013735 A1 | 1/2006 | Engelking et al. |
| 2006/0078724 A1 | 4/2006 | Bhushan et al. |
| 2006/0147675 A1 | 7/2006 | Nun et al. |
| 2006/0204738 A1 | 9/2006 | Dubrow et al. |
| 2006/0240218 A1 | 10/2006 | Parce |
| 2006/0246226 A1 | 11/2006 | Dai et al. |
| 2007/0031639 A1 | 2/2007 | Hsu et al. |
| 2007/0135602 A1 | 6/2007 | Yamahiro et al. |
| 2007/0207335 A1 | 9/2007 | Karandikar et al. |
| 2007/0231542 A1 | 10/2007 | Deng et al. |
| 2007/0282247 A1 | 12/2007 | Desai et al. |
| 2007/0298216 A1 | 12/2007 | Jing et al. |
| 2008/0085070 A1 | 4/2008 | Hirata et al. |
| 2008/0118763 A1 | 5/2008 | Balow et al. |
| 2008/0213461 A1 | 9/2008 | Gill et al. |
| 2008/0225378 A1 | 9/2008 | Weikert et al. |
| 2009/0155609 A1 | 6/2009 | Gentleman et al. |
| 2009/0185867 A1 | 7/2009 | Masters et al. |
| 2009/0211735 A1 | 8/2009 | Stenkamp et al. |
| 2009/0231273 A1 | 9/2009 | Lashina et al. |
| 2009/0269651 A1* | 10/2009 | Yoshihiro ......... H01M 8/04201 429/515 |
| 2010/0028604 A1 | 2/2010 | Bhushan et al. |
| 2010/0092621 A1 | 4/2010 | Akutsu et al. |
| 2010/0098909 A1 | 4/2010 | Reyssat et al. |
| 2010/0112286 A1 | 5/2010 | Bahadur et al. |
| 2010/0147441 A1 | 6/2010 | Nakagawa et al. |
| 2010/0200094 A1 | 8/2010 | Ermakov |
| 2010/0218517 A1 | 9/2010 | Luther |
| 2010/0285229 A1 | 11/2010 | Elbahri et al. |
| 2010/0285275 A1 | 11/2010 | Baca et al. |
| 2010/0307922 A1 | 12/2010 | Wu |
| 2010/0330146 A1 | 12/2010 | Chauhan et al. |
| 2011/0003229 A1* | 1/2011 | Schrooten ............. H01B 1/122 429/457 |
| 2011/0042850 A1 | 2/2011 | Hong et al. |
| 2011/0077172 A1 | 3/2011 | Aizenberg et al. |
| 2011/0106504 A1 | 5/2011 | Noureldin |
| 2011/0189520 A1* | 8/2011 | Carter ................. B60L 11/1879 429/107 |
| 2011/0200848 A1 | 8/2011 | Chiang et al. |
| 2011/0201984 A1 | 8/2011 | Dubrow et al. |
| 2011/0226998 A1 | 9/2011 | Van De Weijer-Wagemans et al. |
| 2011/0274948 A1 | 11/2011 | Duduta et al. |
| 2011/0283778 A1 | 11/2011 | Angelescu et al. |
| 2011/0287217 A1 | 11/2011 | Mazumder et al. |
| 2012/0036846 A1 | 2/2012 | Aizenberg et al. |
| 2012/0128963 A1 | 5/2012 | Mao et al. |
| 2012/0164499 A1* | 6/2012 | Chiang ................. H01M 8/188 429/81 |
| 2012/0214071 A1 | 8/2012 | Chiang et al. |
| 2013/0003258 A1 | 1/2013 | Xie et al. |
| 2013/0011702 A1* | 1/2013 | Horne ................. B60L 11/1824 429/51 |
| 2013/0032316 A1 | 2/2013 | Dhiman et al. |
| 2013/0034695 A1 | 2/2013 | Smith et al. |
| 2013/0059177 A1* | 3/2013 | De Jonghe .......... H01M 4/5815 429/51 |
| 2013/0062285 A1 | 3/2013 | Hoek et al. |
| 2013/0146536 A1 | 6/2013 | Tarabara et al. |
| 2013/0220813 A1 | 8/2013 | Anand et al. |
| 2013/0251769 A1 | 9/2013 | Smith et al. |
| 2013/0251942 A1 | 9/2013 | Azimi et al. |
| 2013/0251946 A1 | 9/2013 | Azimi et al. |
| 2013/0251952 A1 | 9/2013 | Smith et al. |
| 2013/0333789 A1 | 12/2013 | Smith et al. |
| 2013/0335697 A1 | 12/2013 | Smith et al. |
| 2013/0337027 A1 | 12/2013 | Smith et al. |
| 2014/0291420 A1 | 10/2014 | Dhiman et al. |
| 2014/0302370 A1 | 10/2014 | Woodford |
| 2014/0302400 A1* | 10/2014 | Shao ................. H01M 10/0569 429/326 |

(56) References Cited

U.S. PATENT DOCUMENTS

| | | |
|---|---|---|
| 2015/0111063 A1 | 4/2015 | Khan et al. |
| 2015/0125575 A1 | 5/2015 | Smith et al. |

FOREIGN PATENT DOCUMENTS

| | | |
|---|---|---|
| DE | 198 18 956 A1 | 11/1998 |
| EP | 0230112 A2 | 7/1987 |
| EP | 1892458 A1 | 2/2008 |
| JP | 1 170932 A | 7/1989 |
| JP | 5 240251 A | 9/1993 |
| JP | 2004 037764 A | 2/2004 |
| JP | 2008240910 A | 10/2008 |
| TW | I 233 968 B | 6/2005 |
| WO | WO-93/17077 A1 | 9/1993 |
| WO | WO-99/36490 A1 | 7/1999 |
| WO | WO-01/38288 A1 | 5/2001 |
| WO | WO-2002/062568 A2 | 8/2002 |
| WO | WO-2003/071275 A1 | 8/2003 |
| WO | WO-2006/017009 A2 | 2/2006 |
| WO | WO-2006/091235 A1 | 8/2006 |
| WO | WO-2006/132892 A2 | 12/2006 |
| WO | WO-2007/019362 A1 | 2/2007 |
| WO | WO-2008/111603 A1 | 9/2008 |
| WO | WO-2010/028752 A1 | 3/2010 |
| WO | WO-2010/082710 A1 | 7/2010 |
| WO | WO-2010/096073 A1 | 8/2010 |
| WO | WO-2010/129807 A1 | 11/2010 |
| WO | WO-2011/087458 A1 | 7/2011 |
| WO | WO-2011/143371 A1 | 11/2011 |
| WO | WO-2012/024099 A1 | 2/2012 |
| WO | WO-2012/100099 A2 | 7/2012 |
| WO | WO-2012/100100 A2 | 7/2012 |
| WO | WO-2012/112481 A1 | 8/2012 |
| WO | WO-2013/022467 A2 | 2/2013 |
| WO | WO-2013/130118 A1 | 9/2013 |
| WO | WO-2013/141888 A1 | 9/2013 |
| WO | WO-2013/141953 A2 | 9/2013 |
| WO | WO-2013/177579 A2 | 11/2013 |
| WO | WO-2014/078867 A1 | 5/2014 |
| WO | WO-2014/121276 A2 | 8/2014 |
| WO | WO-2015/058058 A1 | 4/2015 |

OTHER PUBLICATIONS

Allain, C. et al., A New Method for Contact-Angle Measurements of Sessile Drops, Journal of Calloid and Interface Science, 107(1):5-13, (1985).
Anand, S. et al., Enhanced Condensation on Lubricant-Impregnated Nanotextured Surfaces. ACS Nano, 6(11):10122-10129 (2012) (Supporting Information included, 8 pages).
Antonini, C. et al., Water Drops Dancing on Ice: How Sublimation Leads to Drop Rebound, PRL 111(1):014501(1-5), (2013), (Supplementary Material included, 5 pages).
Arkles, B., Hydrophobicity, Hydrophilicity and Silanes, Paint and Coatings Industry, Oct. 1, 2006, 10 pages.
Azimi, G. et al., Hydrophobicity of rare-earth oxide ceramics, Nature Materials 12, 315-320 (2013) (http://www.nature.com/nmat/journal/v12/n4/abs/nmat3545.html).
Bargir, S. et al., The use of contact angle measurements to estimate the adhesion propensity of calcium carbonate to solid substrates in water, Applied Surface Science 255:4873-4879 (2009).
Barnes, G. T., The Potential for Monolayers to Reduce the Evaporation of Water From Large Water Storages, Agricultural Water Management 95, 4:339-353, (2008).
Bartolozzi, M., Development of Redox Flow Batteries: A Historical Bibliography, J. Power Sources, 27:219-234 (1989).
Bauer, U. and Federle, W., The insect-trapping rim of Nepenthes pitchers: surface structure and function, Plant Signaling & Behavior, 4 (11): 1019-1023 (2009).
Beauty Packaging, Liquiglide's Coatings Ensure Evacuation of Viscous Formulations, http://www.beautypackaging.com/issues/2014-08/view_design-center/liquiglides-coatings-ensure-evacuation-of-viscous-formulations/, 1 page (2014).
Betz, A. R. et al., Do surfaces with mixed hydrophilic and hydrophobic areas enhance pool boiling?, Applied Physics Letters, 97:141909 p. 1-3, (2010).
Bico, J. et al., Pearl drops. Europhysics Letters, 47(2):220-226 (1999).
Bird, J. C. et al, Reducing the contact time of a bouncing drop, Nature, 503:385-389 (2013) (Supplementary Information included, 7 pages).
Blossey, R., Self-cleaning surfaces—Virtual realities. Nature Materials, 2(5):301-306 (2003).
Bohn, H. and Federle, W., Insect aquaplaning: Nepenthes pitcher plants capture prey with the peristome, a fully wettable water-lubricated anisotropic surface, Proceedings of the National Academy of Sciences,14138-14143 (2004).
Cao, L. et al., Anti-Icing Superhydrophobic Coatings, Langmuir, 25(21):12444-12448 (2009).
Cassie, A. B. D. and Baxter, S., Wettability of porous surfaces, Transactions of the Faraday Society, 40: 546-551, (1944).
Chandra, S. and Avedisian, C. T., Observations of droplet impingement on a ceramic porous surface. International Journal of Heat and Mass Transfer 35(10):2377-2388 (1992).
Chaudhuri, R. G. and Paria, S., Dynamic Contact Angles on PTFE Surface by Aqueous Surfactant Solution in Absence and Presence of Electrolytes, Journal of Colloid and Interface Science, 337:555-562 (2009).
Chen, T. et al., A Wettability Switchable Surface by Microscale Surface Morphology Change, Journal of Micromechanics & Microengineering, 17(3):489-195 (2007).
Consumer Reports, How much is left in that container? http://www.consumerreports.org/cro/magazine-archive/september-2009/personal-finance/good-to-the-last-drop/overview/good-to-the-last-drop-ov.htm?view=Print, 2 pages (2009).
Deng, T. et al., Nonwetting of impinging droplets on textured surfaces, Applied Physics Letters, 94(13):133109:1-3 (2009).
Dickerson, K., Incredible new invention has solved a universally annoying problem, Business Insider, http://www.businessinsider.com/liquiglide-nonstick-coating-on-bottles-2015-3, 4 pages (2015).
Duduta, M. et al., Semi-Solid Lithium Rechargeable Flow Battery, Adv. Energy Mater., 1:511-516 (2011).
Eck, S. et al., Growth and thermal properties of ultrathin cerium oxide layers on Rh(111), Surface Science, 520:173-185, (2002).
Fan, F. Y. et al., Polysulfide Flow Batteries Enabled by Percolating Nanoscale Conductor Networks, Nano Letters, 14:2210-2218 (2014).
Feng, X. and Jiang, L., Design and creation of superwetting/antiwetting surfaces. Advanced Materials, 18(23):3063-3078 (2006).
Fondecave, R. and Wyart, F.B., Polymers as Dewetting Agents, Marcomolecules 31:9305-9315 (1998).
Food Processing, LiquiGlide Lets Food Slide Out of Packaging with Ease, http://www.foodprocessing.com/vendors/products/2014/liquiglide-lets-food-slide-out-of-packaging-with-easel, 6 pages (2014).
Furmidge, C. G. L., Studies at Phase Interfaces, Journal of Colloid Science, 1962, 17: 309-324.
Gao, L. and McCarthy, T. T., Artificial lotus leaf prepared using a 1945 patent and a commercial textile. Langmuir, 22(14):5998-6000 (2006).
Good, R. J., Contact angle, wetting and adhesion: a critical review, J. Adhesion Sci. Technol. vol. 6, No. 12, pp. 1269-1302 (1992).
Hejazi, V. and Nosonovsky, M., Wetting Transitions in Two-, Three-, and Four-Phase Systems, Langmuir, 28:2173-2180 (2012).
Holden, K. M. et al., The Use of Organic Coatings to Promote Dropwise Condensation of Steam, Journal of Heat Transfer, 109: 768-774 (1987).
International Preliminary Report on Patentability for PCT/US2011/049187, dated Mar. 7, 2013, 8 pages.
International Preliminary Report on Patentability, PCT/US2011/061498, dated Feb. 13, 2014, 12 pages.
International Search Report and Written Opinion, PCT/US2011/061498, dated Jul. 31, 2012, 17 pages.

(56) References Cited

OTHER PUBLICATIONS

International Search Report, PCT/US12/65627, dated Mar. 8, 2013, 3 pages.
International Search Report, PCT/US2011/049187, dated Jan. 23, 2013, 4 pages.
International Search Report, PCT/US2011/061898, dated Apr. 24, 2013, 6 pages.
International Search Report, PCT/US2012/030370, dated Oct. 15, 2012, 6 pages.
International Search Report, PCT/US2012/042326, dated Dec. 3, 2012, 4 pages.
International Search Report, PCT/US2012/042327, dated May 16, 2013, 6 pages.
International Search Report, PCT/US2013/021558, dated Oct. 11, 2013, 5 pages.
International Search Report, PCT/US2013/028439, dated Dec. 5, 2013, 6 pages.
International Search Report, PCT/US2013/042771, dated May 26, 2014, 4 pages.
International Search Report, PCT/US2013/045731, dated Nov. 12, 2013, 3 pages.
International Search Report, PCT/US2013/070827, dated Mar. 27, 2014, 7 pages.
Jung, S. et al., Are Superhydrophobic Surfaces Best for Icephobicity? Langmuir, 27(6):3059-3066 (2011).
Kazi, S. N. et al., Mineral Scale Formation and Mitigation on Metals and a Polymeric Heat Exchanger Surface, Applied Thermal Engineering, 30:2236-2242 (2010).
Kim, P. et al., Hierarchical or not? Effect of the length scale and hierarchy of the surface roughness on omniphobicity of lubricant-infused substrates. Nano Letters, 13(4):1793-1799 (2013).
King, B., MIT Bottle Coating Offers Promising Solution to Product Waste, http://www.sustainablebrands.com/news_and_views_/articles/mit-bottle-coating-offers-promising-solution-product-waste, 2 pages (2012).
Kulinich, S.A. and Farzaneh, M., Ice Adhesion on Super-Hydrophobic Surfaces, Applied Surface Science, 2009, 225: 8153-8157.
Lafuma, A. et al., Slippery Pre-Suffused Surfaces; EPL, 96: 56001-p1-56001-p4 (2011).
Lee, J.B. and Lee, S.H., Dynamic Wetting and Spreading Characteristics of a Liquid Droplet Impinging on Hydrophobic Textured Surfaces, Langmuir, 27:6565-6573 (2011).
Li, X. et al., Dynamic Behavior of the Water Droplet Impact on a Textured Hydrophobic/Superhydrophobic Surface: The Effect of the Remaining Liquid Film Arising on the Pillars' Tops on the Contact Time, Langmuir, 26(7):4831-4838 (2010).
Liu, K. and Jiang, L., Metallic Surfaces with Special Wettability, Nanoscale, 3:825-838 (2011).
Matolin, V. et al., Growth of ultra-thin cerium oxide layers on Cu(111), Applied Surface Science 254:153-155, (2007).
Meuler, A. J. et al., Exploiting Topographical Texture to Impact Icephobicity, ACS Nano, 2010, 4(12): 7048-7052.
Mishchenko, L. et al., Design of ice-free nanostructured surfaces based on repulsion of impacting water droplets. ACS Nano, 4(12):7699-7707 (2010).
Mullins, D. R. et al., Ordered cerium oxide thin films gown on Ru(0001) and Ni(111), Surface Science, 429:186-198, (1999).
Onda, T. et al., Super-water-repellent fractal surfaces. Langmuir, 12(9):2125-2127 (1996).
Ou, J. et al., Laminar drag reduction in microchannels using ultrahydrophobic surfaces. Physics of Fluids, 16(12):4635-4643 (2004).
Packaging News, LiquiGlide gets it all out, http://www.packagingnews.com.au/news/liquiglide-gets-it-all-out, 4 pages (2015).
Park, H. et al., A Numerical Study of the Effects of Superhydrophobic Surface on Skin-Friction Drag in Turbulent Channel Flow, Phys. Fluids 25, 110815:1-10 (2013).
Ponce de Leon, C. et al., Redox flow batteries for energy conversion, J. Power Sources, 160:716-732(2006).
Pozzato, A. et al., Superhydrophobic surfaces fabricated by nanoimprint lithography, Microelectronic Engineering, 83:884-888 (2006).
Quéré, D. and Ajdari, A., Liquid drops: Surfing the hot spot, Nature Materials, 5(6):429-430 (2006).
Quéré, D., Non-sticking drops, Rep.Prog.Phys., 68(11):2495-2532 (2005).
Rausch, M. H. et al., On the Characteristics of Ion Implanted Metallic Surfaces Inducing Dropwise Condensation of Steam, Langmuir, 26(8): 5971-5975 (2010).
Reyssat, M. et al., Bouncing transitions on microtextured materials. Europhysics Letters, 74(2):306-312 (2006).
Reyssat, M. et al., Dynamical superhydrophobicity. Faraday Discussions, 146:19-33 (2010).
Rothstein, J. P., Slip on superhydrophobic surfaces, Annu. Rev. Fluid Mech., 42:89-109 (2010).
Rykaczewski, K. et al., Mechanism of Frost Formation of Lubricant-Impregnated Surfaces, Langmuir, 29:5230-5238, (2013) (Support Information included, 4 pages).
Santos, O. et al., Modified stainless steel surfaces targeted to reduce fouling—surface characterization, J. Food Engineering, 64:63-79 (2004).
Schierbaum, K., Ordered ultra-thin cerium oxide overlayers on Pt(111) single crystal surfaces studied by LEED and XPS, Surface Science, 399:29-38, (1998).
Seiwert, J. et al., Coating of a Textured Solid, J. Fluid Mech., 2011, 669: 55-63.
Sekeroglu, K. et al., Transport of a soft cargo on a nanoscale ratchet. Applied Physics Letters, 99(6):063703(1-3) (2011).
Skyllas-Kazacos, M. and Grossmith, F., Efficient Vanadium Redox Flow Cell, Journal of the Electrochemical Society, 134(12):2950-2953 (1987).
Smith, J. D. et al., Droplet Mobility on Lubricant-Impregnated Surfaces, Soft Matter, 9:1772-1780 (2013).
Smith, J. D. et al., Liquid-encapsulating surfaces: overcoming the limitations of superhydrophobic surfaces for robust non-wetting and anti-icing surfaces. In Bulletin of the American Physical Society (2011) Abstract Only.
Smith, K. C. et al., Maximizing Energetic Efficiency in Flow Batteries Utilizing Non-Newtonian Fluids, J. Electrochem. Soc., 161(4):A486-A496 (2014).
Song, Y. et al., Superhydrophobic Surfaces Produced by Applying a Self-Assembled Monolayer to Silicon Micro/Nano-Textured Surfaces, Nano Research, 2009, 2: 143-150.
Sutara, F. et al., Epitaxial growth of continuous $CeO_2(111)$ ultra-thin films on Cu(111), Thin Solid Films, 516:6120-6124 (2008).
Tropmann, A. et al., Completely Superhydrophobic PDMS Surfaces for Microfluidics, Langmuir, 28(22):8292-8295 (2012).
Tuteja, A. et al., Designing superoleophobic surfaces. Science, 318(5856):1618-1622 (2007) (Supporting Online Material included, 24 pages).
Tuteja, A. et al., Robust omniphobic surfaces. Proceedings of the National Academy of Sciences of the United States of America, 105(47):18200-18205 (2008) (Supporting Information included, 2 pages).
Varanasi, K. K. et al., Frost formation and ice adhesion on superhydrophobic surfaces, Applied Physics Letters, 97(23):234102(1-3) (2010).
Varanasi, K. K. et al., Spatial Control in the Heterogeneous Nucleation of Water, Applied Physics Letters, 95: 094101-01-03 (2009).
Wenzel, R. N., Resistance of Solid Surfaces to Wetting by Water, Industrial & Engineering Chemistry, 28(8): 988-994 (1936).
Wong, T. et al., Bioinspired Self-Repairing Slippery Surfaces with Pressure-Stable Omniphobicity, Nature, 477(7365):443-447 (2011).
Written Opinion, PCT/US12/65627, dated Mar. 8, 2013, 10 pages.
Written Opinion, PCT/US2011/049187, dated Jan. 23, 2013, 7 pages.
Written Opinion, PCT/US2011/061898, dated Apr. 24, 2013, 9 pages.
Written Opinion, PCT/US2012/030370, dated Oct. 15, 2012, 10 pages.
Written Opinion, PCT/US2012/042326, dated Dec. 3, 2012, 7 pages.

(56) References Cited

OTHER PUBLICATIONS

Written Opinion, PCT/US2012/042327, dated May 16, 2013, 6 pages.
Written Opinion, PCT/US2013/021558, dated Oct. 11, 2013, 7 pages.
Written Opinion, PCT/US2013/028439, dated Dec. 5, 2013, 11 pages.
Written Opinion, PCT/US2013/042771, dated May 26, 2014, 7 pages.
Written Opinion, PCT/US2013/045731, dated Nov. 12, 2013, 3 pages.
Written Opinion, PCT/US2013/070827, dated Mar. 27, 2014, 15 pages.
Zhao, Q. and Burnside, B. M., Dropwise condensation of Steam on Ion Implanted Condenser Surfaces, Heat Recovery Systems & CHP, 14(5): 525-534 (1994).
International Search Report, PCT/US2015/036650, 4 pages, dated Sep. 4, 2015.
Li, Z. et al., Aqueous semi-solid flow cell: demonstration and analysis, Phys. Chem. Chem. Phys., 15:15833-15839 (2013), note: first published Aug. 16, 2013.
Written Opinion, PCT/US2015/036650, 8 pages, dated Sep. 4, 2015.

* cited by examiner

| Interface | Configuration | | Total interface energy per unit area | Equivalent criteria | | |
|---|---|---|---|---|---|---|
| Oil-Solid-Air | A1 | Dry | $E_{A1} = r\gamma_{sa}$ | $E_{A1} < E_{A2}, E_{A3}$ | $S_{os(a)} < -\gamma_{oa}\left(\frac{r-1}{r-\phi}\right)$ | $\theta_{os(a)} > \theta_c$ |
| | A2 | Impregnated, emerged | $E_{A2} = (r-\phi)\gamma_{os} + \phi\gamma_{sa} + (1-\phi)\gamma_{oa}$ | $E_{A2} < E_{A1}, E_{A3}$ | $-\gamma_{oa}\left(\frac{r-1}{r-\phi}\right) < S_{os(a)} < 0$ | $0 < \theta_{os(a)} < \theta_c$ |
| | A3 | Encapsulated | $E_{A3} = \gamma_{oa} + r\gamma_{os}$ | $E_{A3} < E_{A2}, E_{A1}$ | $S_{os(a)} \geq 0$ | $\theta_{os(a)} = 0$ |
| Oil-Solid-Water | W1 | Impaled | $E_{w1} = r\gamma_{sw}$ | $E_{w1} < E_{w2}, E_{w3}$ | $S_{os(w)} < -\gamma_{ow}\left(\frac{r-1}{r-\phi}\right)$ | $\theta_{os(w)} > \theta_c$ |
| | W2 | Impregnated, emerged | $E_{w2} = (r-\phi)\gamma_{os} + \phi\gamma_{sw} + (1-\phi)\gamma_{ow}$ | $E_{w2} < E_{w1}, E_{w3}$ | $-\gamma_{ow}\left(\frac{r-1}{r-\phi}\right) < S_{os(w)} < 0$ | $0 < \theta_{os(w)} < \theta_c$ |
| | W3 | Encapsulated | $E_{w3} = \gamma_{ow} + r\gamma_{os}$ | $E_{w3} < E_{w1}, E_{w2}$ | $S_{os(w)} \geq 0$ | $\theta_{os(w)} = 0$ |

Figure 1C

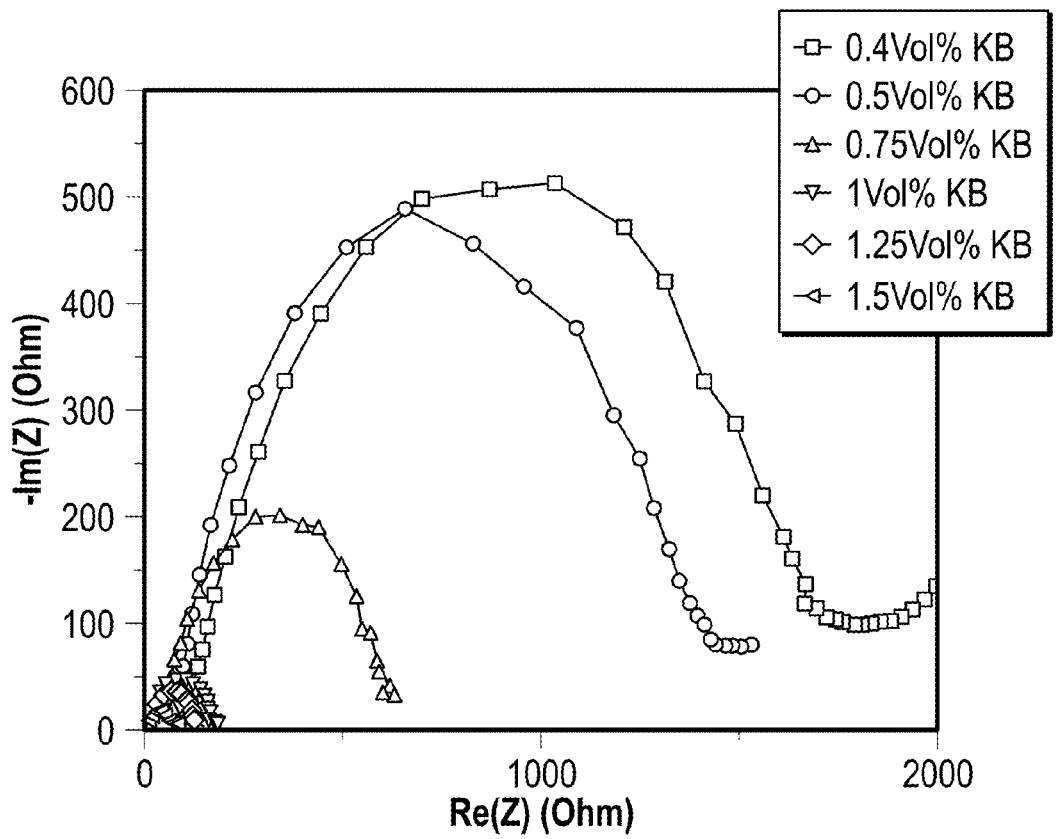
FIG. 2
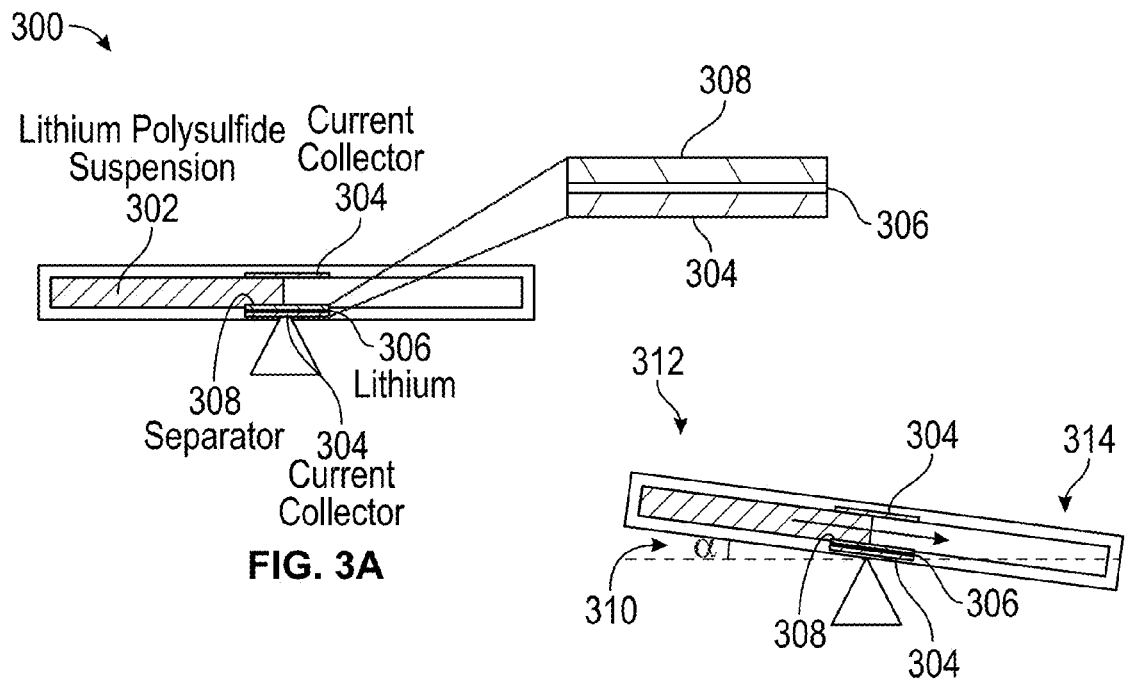
FIG. 3A
FIG. 3B

LUBRICANT-IMPREGNATED SURFACES FOR ELECTROCHEMICAL APPLICATIONS, AND DEVICES AND SYSTEMS USING SAME

CROSS-REFERENCE TO RELATED APPLICATIONS

This application claims priority to and the benefit of, and incorporates herein by reference in its entirety, U.S. Provisional Patent Application No. 62/014,207, filed Jun. 19, 2014.

GOVERNMENT LICENSE RIGHTS

This invention was made with government support under U.S. Department of Energy Grant No. DOE-FOA-0000559, Energy Innovation Hub—Batteries and Energy Storage, and Subcontract No. 3F-31144, issued under DOE Prime Contract No. DE-AC02-06CH11357 between the United States Government and UChicago Argonne, LLC representing Argonne National Laboratory. The government has certain rights in the invention.

FIELD OF INVENTION

This invention relates generally to electrochemical applications, devices, and systems. More particularly, in some embodiments, the invention relates to articles and methods that promote flow (e.g., of an electroactive phase) in electrochemical systems (e.g., batteries, fuel cells, capacitors) by encapsulating or impregnating a secondary liquid in surface textures of the electrochemical systems.

BACKGROUND

Electrochemical energy storage devices include primary (disposable) and secondary (rechargeable) batteries of almost any type, including but not limited to alkali ion and alkaline earth ion batteries and flow batteries as described in U.S. Provisional Patent Application Ser. Nos. 61/912,215, filed on Dec. 5, 2013, 61/911,101, filed on Dec. 3, 2013, 61/903,574 filed on Nov. 13, 2013, 61/903,739 filed on Nov. 13, 2013, 61/892,588, filed on Oct. 18, 2013, 61/831,321, U.S. patent application Ser. No. 14/172,648, filed on Dec. 4, 2014, Ser. No. 13/083,167, filed on Apr. 8, 2011, Ser. No. 12/970,753, filed on Dec. 16, 2010, Ser. No. 13/404,735 (now U.S. Pat. No. 8,582,807), filed on Feb. 24, 2012, and U.S. Pat. No. 7,338,734, filed on Dec. 23, 2002, U.S. Pat. No. 8,722,227, filed on Aug. 26, 2013, U.S. Pat. No. 8,148,013, filed on Sep. 17, 2007, each of which is hereby incorporated by reference in its entirety.

Fuel cells include any fuel cell type in which at least one of the fuels or reactants is a condensed phase, including instances where the fuel is liquid or semi-solid, and where the fuel cell uses a physical membrane or is "membraneless" with electronic isolation of the electroactive reactants being achieved through controlled flow of one or more fluid phases.

A battery stores electrochemical energy by separating two half cells (e.g., a conductive electrode and surrounding conductive electrolytes) with different electro-chemical potential. Each half-cell has an electromotive force, determined by its ability to drive electric current from the interior to the exterior of the cell. A difference in electrochemical potentials and/or electromotive forces generates an electric current when a conductive material connects the electrodes.

Rechargeable batteries can be constructed using static negative electrode/electrolyte and positive electrode/electrolyte media. Rechargeable batteries can be restored (e.g., recharged) by applying reverse current and/or voltage. Lead-acid batteries used in vehicles and lithium ion batteries for portable electronics are some examples of rechargeable batteries. In rechargeable batteries, the electrode active materials generally need to be able to accept (e.g., to be charged) and provide (e.g., to discharge) ions.

A flow battery is a rechargeable battery that has soluble metal ions in liquid solutions. The ability of a flow battery to be recharged is generally provided by oxidation and reduction of two flowing electrolyte liquids separated by a membrane. A flow battery typically includes reservoirs for storing electrolytes, a membrane for ion exchange, and pumps for controlling flow of the electrolytes.

Redox flow batteries, also referred to as flow cells, redox batteries, or reversible fuel cells are energy storage devices in which the positive and negative electrode reactants are soluble metal ions in liquid solution that are oxidized or reduced during the operation of the cell. Using two reversible redox couples, liquid state redox reactions are carried out at the positive and negative electrodes. A redox flow cell typically has a power-generating assembly comprising at least an ionically transporting membrane separating the positive and negative electrode reactants (also called catholyte and anolyte respectively), and positive and negative current collectors (also called electrodes) which facilitate the transfer of electrons to the external circuit but do not participate in the redox reaction (i.e., the current collector materials themselves do not undergo Faradaic activity). Redox flow batteries have been discussed, for example, by C. Ponce de Leon, A. Frias-Ferrer, J. Gonzalez-Garcia, D. A. Szantos and F. C. Walsh, "Redox Flow Batteries for Energy Conversion," J. Power Sources, 160, 716 (2006), M. Bartolozzi, "Development of Redox Flow Batteries: A Historical Bibliography," J. Power Sources, 27, 219 (1989), and by M. Skyllas-Kazacos and F. Grossmith, "Efficient Vanadium Redox Flow Cell," Journal of the Electrochemical Society, 134, 2950 (1987).

Some batteries (e.g., flow batteries) have significant pumping losses due to a variety of factors, including a combination of high flow electrode viscosity, high flow velocity during operation, and/or narrow channel cross-sectional dimensions and/or long channel length. Some flow batteries utilize flow electrodes with non-Newtonian rheology (e.g., yield-stress fluids), for example, the high energy density flow electrodes described in U.S. Provisional Patent Application Ser. Nos. 61/892,588, filed on Oct. 18, 2013, 61/903,574, filed on Nov. 13, 2013, 61/903,739, filed on Nov. 13, 2013, U.S. patent application Ser. No. 12/970,753, filed on Dec. 16, 2010, U.S. Pat. No. 8,722,227, filed on Aug. 26, 2013, each of which is incorporated herein by reference in its entirety and publications M. Duduta, B. Y. Ho, V. C. Wood, P. Limthongkul, V. E. Brunini, W. C. Carter, Y.-M. Chiang, "Semi-Solid Lithium Rechargeable Flow Battery," Adv. Energy Mater., 1[4] 511-516 (2011) (DOI: 10.1002/aenm.201100152) and F. Y. Fan, W. H. Woodford, Z. Li, N. Baram. K. C. Smith, A. Helal, G. H. McKinley, W. C. Carter, Y.-M. Chiang, "Polysulfide Flow Batteries Enabled by Percolating Nanoscale Conductor Networks," Nano Letters, 5 Mar. 2014, DOI: 10.1021/nl500740t, the disclosure of each of these publications being incorporated herein by reference in its entirety.

In some instances, the flow electrodes have a continuous percolating network of an electronic conductor phase that imparts electronic conductivity to the flow electrodes. The rheology of the flow electrodes may be non-Newtonian by possessing, for example, shear-thinning behavior, or Bingham plastic or Hershel-Bulkley rheology wherein there is a measurable yield stress to the fluid followed by Newtonian or non-Newtonian viscosity after the yields stress is overcome. High energy density fluid electrodes for high energy density flow batteries typically have non-Newtonian rheology, especially when formulated as suspensions which increase electrical conductivity, energy density, or both. The rheology of the flow electrodes can result in significant pumping energy losses and/or decreases in electrochemical energy efficiency (e.g., in a flow battery).

Thus, there is a need for improved articles and methods for promoting flow of electroactive phases of electrochemical devices. For example, there is a need for robust surfaces that promote electrode flow in batteries.

SUMMARY OF INVENTION

Presented herein are systems and methods for promoting, manipulating, and controlling the flow of electroactive phases of electrochemical devices by providing at least one surface (or a portion thereof) that includes a liquid lubricant impregnated within its surface features. For example, the at least one surface is a non-wetting surface that includes a liquid impregnated within a matrix of micro and/or nano-engineered features on the surface, or a liquid filling pores or other wells on the surface. In some embodiments, the liquid fills the spaces between/within the surface features, and the liquid is held between/within the surface features. In some implementations, the liquid stably is held between/within the surface feature regardless of orientation of the electrochemical device. The at least one liquid-lubricant impregnated surface may be resistant to impalement (e.g., by the flowing phase, e.g., electroactive phase). The surface may be configured to reduce viscous drag on the surface. The surface may also serve to minimize accumulation of impinging/flowing phases (e.g., electroactive phase) in some implementations.

Through proper selection of the impregnating liquid, the liquid-impregnated surfaces described herein are easily customizable to suit a desired application. In some embodiments, an existing article is retrofitted to include the at least one surface described herein.

One aspect of the invention relates to an electrochemical device that includes an interior surface, at least a first portion of which includes a plurality of solid features disposed thereon, the plurality of solid features defining a plurality of regions therebetween, and a liquid lubricant disposed in the plurality of regions, the plurality of solid features retaining the liquid lubricant in the plurality of regions during operation of the device, thereby providing a liquid lubricant impregnated surface. The electrochemical device also includes an electroactive phase in contact with at least the first portion of the interior surface, wherein the liquid lubricant impregnated surface introduces a slip at the surface (e.g., where a ratio of slip velocity against mean velocity ($u_w/\bar{u}$) is greater than 0.9) when the electroactive phase flows along the surface (e.g., thereby providing low shear rate and high slip ratio at the surface and promoting plug flow of the electroactive phase within the device). In some embodiments, a ratio of slip velocity against mean velocity ($u_w/\bar{u}$) is greater than 0.9. In some embodiments, a ratio of slip velocity against mean velocity ($u_w/\bar{u}$) is greater than 0.85. In some embodiments, a ratio of slip velocity against mean velocity ($u_w/\bar{u}$) is greater than 0.8. In some embodiments, a ratio of slip velocity against mean velocity ($u_w/\bar{u}$) is greater than 0.75.

In some embodiments, the electroactive phase is a non-Newtonian fluid. In some embodiments, the electroactive phase is a yield-stress fluid. The electrochemical device of claim 3, wherein the electroactive phase has a yield-stress between 1 Pa and 2 kPa (e.g., between 1 Pa and 5 Pa, between 1 Pa and 20 Pa, between 5 Pa and 40 Pa, between 25 Pa and 100 Pa, between 50 Pa and 250 Pa, between 150 Pa and 350 Pa, between 250 Pa and 500 Pa, between 400 Pa and 600 Pa, between 500 Pa and 800 Pa, between 750 Pa and 1 kPa, between 900 Pa and 1.25 kPa, between 1 kPa and 1.5 kPa, between 1.25 kPa and 1.75 kPa, between 1.5 kPa and 2 kPa).

In some embodiments, the electroactive phase flows along the first portion of the interior surface such that the first portion is substantially free from residue left by the electroactive phase along its path of flow (e.g., the electroactive phase does not smudge or smear on the surface, e.g., less than 10%, less than 5%, or less than 1% of the electroactive surface is left on the surface).

In some embodiments, the first portion enables flowing of the electroactive phase solely due to gravity (e.g., such that no other force is required for the electroactive phase to flow along the surface; e.g., where tilting the electroactive device at an angle enables the electroactive phase to flow along the surface, without requiring application of any other force).

In some embodiments, the electroactive phase includes at least one solvent and at least one electrolyte. In some embodiments, the electrolyte is a Lithium-containing salt (e.g., in organic solvent or combination of organic solvents or in aqueous-based solvent or combination of solvents). In some embodiments, the Lithium-containing salt is selected from the group consisting of $LiPF_6$, $LiBF_4$, LiTFSI, LiFSI, $LiClO_4$, $LiAlCl_4$, and $LiGaCl_4$ in organic solvent or combination of solvents or in aqueous-based solvent or combination of solvents. In some embodiments, the electrolyte is selected from the group consisting of iron/chromium, bromine/polysulfide, vanadium, zinc/bromine, lithium polysulfide, vanadium, tris(bipyridine)nickel(II)tetrafluoroborate/tris(bipyridine)iron(II)tetrafluoroborate ($Ni(Bpy)_3(BF_4)_2$/Fe $(BPy)_3(BF_4)_2$), tris(bipyridine)ruthenium(II) (($Ru(bpy)_3]^{2+}$), and zinc/cerium.

In some embodiments, the solvent is selected from the list consisting of water, alkyl carbonates (e.g., ethylene carbonate, diethyl carbonate, dimethyl carbonate, propylene carbonate), alkyl phosphonates, phosphites, acetonitrile, propylene carbonate, glyme, diglyme, triglyme, tetraglyme, polyglyme, dioxolane (1,3-dioxolane), dimethyl sulfoxide (DMSO), dichloromethane, ethylene carbonate, tetrahydrafuran (THF), methane sulfonic acid, dimethyl ether (DEM), tetraethylene glycol dimethyl ether (TEG-DME) and dimethoxyethane, and any combination or derivative thereof.

In some embodiments, the electroactive phase also includes flame-retardant additives (e.g., trimethlyphosphate (TMP)) and/or ion transport enhancer(s). In some embodiments, the electroactive phase includes a flame retardant additive or a combination of flame retardant additives. In some embodiments, the electroactive phase includes an ion transport enhancer or a combination of ion transport enhancers.

In some embodiments, the electroactive phase includes at least one conductive additive selected from the group consisting of: metal carbides, metal nitrides, carbon black, graphitic carbon powder, carbon fibers, carbon microfibers, vapor-grown carbon fibers (VGCF), fullerenes, carbon nanotubes (CNTs), multiwall carbon nanotubes (MWNTs), single wall carbon nanotubes (SWNTs), graphene sheets, and materials comprising fullerenic fragments that are not predominantly a closed shell or tube of the graphene sheet, and any combination or mixture thereof. In some embodiments, the conductive additive is carbon black. In some embodiments, the carbon black is present in the electroactive phase in an amount of from between 0.25 vol % to 3 vol % (e.g., between 0.25 vol % to 0.5 vol %, 0.3 vol % to 0.6 vol %, 0.5 vol % to 0.8 vol %, 0.75 vol % to 1 vol %, 0.85 vol % to 1.25 vol %, 1 vol % to 1.5 vol %; 1.25 vol % to 1.75 vol %, 1.5 vol % to 2 vol %; 1.75 vol % to 2.25 vol %, 2 vol % to 2.5 vol %, 2.25 vol % to 2.75 vol %, 2.5 vol % to 3 vol %). In some embodiments, the electroactive phase flows solely due to gravity when the carbon black is present in the electroactive phase in an amount greater than 0.25 vol % (e.g., greater than 0.5 vol %, greater than 1 vol %, greater than 2 vol %, greater than 2.5 vol %, between 0.25 vol % to 3 vol %).

In some embodiments, the liquid lubricant impregnated surface promotes plug flow, wherein a ratio of slip velocity against mean velocity ($u_w/\bar{u}$) is greater than 0.9.

In some embodiments, the electrochemical device is designed such that at least one of the conditions or any combination of conditions (a) through (e) is satisfied: (a) wherein the solid features have an average dimension in a range of up to 200 microns (e.g., 1-200 microns, 1-10 microns, 5-15 microns, 10-50 microns, 25-75 microns, 50-100 microns, 75-125 microns, 100-150 microns, 125-175 microns, 150-200 microns, 1 nm-1 micron, 1-10 nm, 5-20 nm, 15-50 nm, 25-75 nm, 50-100 nm, 75-150 nm, 100-300 nm, 250-500 nm, 350-700 nm, 650-800 nm, 750-950 nm); (b) wherein the solid features comprise particles; (c) wherein a ratio of an exposed surface area of the plurality of solid features to an exposed surface area of the liquid lubricant contained in the plurality of regions is less than 0.5 (e.g., less than 0.4, less than 0.3, less than 0.2, less than 0.1); (d) wherein the solid features comprise particles and wherein an average spacing between adjacent particles or clusters of particles is in a range of up to 200 microns (e.g., 1-200 microns, 1-10 microns, 5-15 microns, 10-50 microns, 25-75 microns, 50-100 microns, 75-125 microns, 100-150 microns, 125-175 microns, 150-200 microns, 1 nm-1 micron, 1-10 nm, 5-20 nm, 15-50 nm, 25-75 nm, 50-100 nm, 75-150 nm, 100-300 nm, 250-500 nm, 350-700 nm, 650-800 nm, 750-950 nm); (e) wherein the interior surface (without the plurality of solid features and the liquid lubricant) has a first roll-off angle and wherein the plurality of solid features and the liquid lubricant collectively define a liquid-impregnated surface, the liquid-impregnated surface having a second roll-off angle, the second roll-off angle being less than the first roll-off angle.

In some embodiments, a ratio of an exposed surface area of the plurality of solid features to an exposed surface area of the liquid contained in the plurality of regions is less than 0.3. In some embodiments, a ratio of an exposed surface area of the plurality of solid features to an exposed surface area of the liquid contained in the plurality of regions greater than 0 and less than 0.2. In some embodiments, the second roll-off angle is less than 2°.

In some embodiments, the electrochemical device is a member selected from the group consisting of: a battery (e.g., flow battery, aqueous battery, non-aqueous battery, metal-air battery), a fuel cell (e.g., gravity-induced flow cell), and a capacitor (e.g., electrolytic capacitor, flow capacitor).

In some embodiments, the first portion passively (e.g., the effect is a property of the surface and does not require, e.g., application of additional forces to be achieved) promotes at least one effect selected from the list consisting of: (i) increases nucleation of insoluble materials (e.g., of reacting material, e.g., insoluble lithium sulfide species) formed during operation of the electrochemical device, (ii) increases growth of insoluble materials (e.g., of reacting material, e.g., insoluble lithium sulfide species) formed during operation of the electrochemical device, (iii) increases precipitation of insoluble materials (e.g., of reacting material, e.g., insoluble lithium sulfide species) formed during operation of the electrochemical device, (iv) increases segregation of insoluble materials (e.g., of reacting material, e.g., insoluble lithium sulfide species) formed during operation of the electrochemical device at desired locations (e.g., at the electroactive region) on the internal surface of the electrochemical device.

In some embodiments, the first portion passively promotes at least one effect selected from the list consisting of: (i) inhibits nucleation (e.g., of scale or of reacting material, e.g., insoluble lithium sulfide species as discussed herein), (ii) decreases growth (e.g., of scale or reacting material, e.g., insoluble lithium sulfide species as discussed herein), (iii) inhibits precipitation (e.g., of reacting material, e.g., insoluble lithium sulfide species as discussed herein), (iv) decreases segregation (e.g., of scale or of reacting material, e.g., insoluble lithium sulfide species as discussed herein) at undesired locations (e.g., away from the electroactive region (because, e.g., if undesired nucleation takes place away from the electroactive region, battery capacity may be lost)) on the internal surface of the electrochemical device of insoluble materials formed during operation of the electrochemical device.

In some embodiments, the first portion passively extends an operating temperature range of the electrochemical device (e.g., the electrochemical device may be operated at lower temperatures, e.g., wherein the liquid-lubricant impregnated surface inhibits crystallization of electroactive phase components). In some embodiments, the electroactive device may be successfully operated at temperatures lower than the crystallization temperature of the electroactive phase components. In some embodiments, the electroactive phase flows along the liquid lubricant impregnated surface at temperatures below the crystallization temperature of the electroactive phase components. In some embodiments, the electroactive phase flows along the liquid lubricant impregnated surface at temperatures below the crystallization temperature of the electroactive phase components without leaving a residue along its path of flow (or, e.g., where the path of flow is essentially free from electroactive phase residue).

In some embodiments, a second portion (e.g., other than the first portion) of the internal surface does not comprise the plurality of solid features disposed thereon (for example, where a portion of the internal surface includes a liquid lubricant impregnated surface and a portion of the internal surface does not include a liquid lubricant impregnated surface). The first and second portions may be designed or patterned in any desired patterns depending on desired electrochemical device performance specifications. For example, in some embodiments, the path of flow of the electroactive phase includes regions that include liquid lubricant impregnated surfaces and regions that do not include liquid lubricant impregnated surface.

In some embodiments, the internal surface includes one or more first portions comprising the plurality of solid features disposed thereon and one or more second portions not comprising the plurality of solid features disposed thereon.

In some embodiments, the first portion is electronically conductive. In some embodiments, the first portion is not electronically conductive. In some embodiments, the second portion is electronically conductive. In some embodiments, the second portion is not electronically conductive.

In some embodiments, the plurality of solid features include an electronically conductive material (e.g., nanoparticles (or microparticles or combination of nanoparticles and microparticles) suspended in a percolating network of carbon black (or other conductive additive) in TEG-DME (or another suitable solvent)) and/or wherein the liquid lubricant comprises an electronically conductive suspension or polymer solution (e.g., a percolating network of carbon black (or another conductive additive) in a vacuum pump oil (e.g., KRYTOX® 1506)).

In some embodiments, the first portion is ionically conductive. In some embodiments, the plurality of solid features include an ion-conducting glass or polymer. In some embodiments, the plurality of solid features include an ion-conducting glass or polymer and the liquid lubricant includes an ionically conductive liquid (e.g., an electrolyte).

In some embodiments, the liquid lubricant is selected such that it is electrochemically stable (e.g., where an amount of side reactions due to the liquid lubricant is less than 5%, less than 4%, less than 3%, less than 2%, less than 1%, less than 0.5%, less than 0.1% of total electrochemical reactions). Some embodiments discussed herein relate to methods of selecting appropriate liquid lubricants to be used in electrochemical devices discussed herein, wherein one of the criteria for selecting the liquid lubricant is its electrochemical stability (e.g., such that an amount of side reactions due to the liquid lubricant is less than 5%, less than 4%, less than 3%, less than 2%, less than 1%, less than 0.5%, less than 0.1% of the total electrochemical reactions).

In some embodiments, the liquid lubricant is thermodynamically stable (e.g., wherein when surface tension of the liquid lubricant is subtracted from surface tension of an electrolyte solvent, the resulting value is greater than zero).

In some embodiments, the liquid lubricant is immiscible or partially miscible (e.g., less than 5%, less than 4%, less than 3%, less than 2%, less than 1%, less than 0.5%, less than 0.1% miscibility) with the electroactive phase.

In some embodiments, the plurality of solid features include at least one material selected from the group consisting of: hydrocarbons, (e.g., alkanes, and fluoropolymers (e.g., polytetrafluoroethylene, trichloro(1H,1H,2H,2H-perfluorooctyl)silane (TCS), octadecyltrichlorosilane (OTS), heptadecafluoro-1,1,2,2-tetrahydrodecyltrichlorosilane, fluoroPOSS)), ceramics (e.g., titanium carbide, titanium nitride, chromium nitride, boron nitride, chromium carbide, molybdenum carbide, titanium carbonitride, electroless nickel, zirconium nitride, fluorinated silicon dioxide, titanium dioxide, tantalum oxide, tantalum nitride, diamond-like carbon, fluorinated diamond-like carbon, and/or combinations thereof. Intermetallic compounds may include, for example, nickel aluminide, titanium aluminide, and/or combinations thereof), polymeric materials (e.g., polytetrafluoroethylene, fluoroacrylate, fluorourethane, fluorosilicone, fluorosilane, modified carbonate, chlorosilanes, silicone, polydimethylsiloxane (PDMS), and/or combination thereof), fluorinated materials, intermetallic compounds, composite materials, and any combination thereof.

In some embodiments, the liquid lubricant is selected from the list consisting of oil-based lubricants (e.g., silicone oils, e.g., 10 cSt silicone oil, 1000 cSt silicone oil); ionic liquids (e.g., BMI-IM, e.g., having ionic conductivity between 1 mS/cm to 10 mS/cm); hexadecane, vacuum pump oils (e.g., perfluorinated vacuum oils), fluorocarbons (e.g., perfluoro-tripentylamine), shear-thinning fluids, shear-thickening fluids, liquid polymers, dissolved polymers, viscoelastic fluids, liquid fluoroPOSS, hydrocarbon liquids, fluorocarbon liquids, and/or electronically conducting liquids.

In some embodiments, the electroactive device includes a first volume including the electroactive phase (e.g., flow electrode, e.g., lithium polysulfide suspension); a second volume separated from the first volume by a separator (e.g., membrane, e.g. ion-permeable membrane), wherein the separator spatially separates a positive current collector and a negative current collector. In some embodiments, the separator is coated with or includes a liquid-lubricant impregnated surface.

Another aspect of the present invention relates to an electrochemical device including a positive electrode current collector; a negative electrode current collector; and an ion-permeable membrane separating the positive current collector and the negative current collector; a positive electrode disposed between the positive electrode current collector and the ion-permeable membrane; the positive electrode current collector and the ion-permeable membrane defining a positive electroactive zone accommodating the positive electrode; and a negative electrode disposed between the negative electrode current collector and the ion-permeable membrane; the negative electrode current collector and the ion-permeable membrane defining a negative electroactive zone accommodating the negative electrode, wherein at least a portion of the positive electrode current collector surface that comes into contact with the positive electrode and/or at least a portion of the negative electrode current collector surface that comes into contact with the negative electrode comprises a plurality of solid features disposed thereon, the plurality of solid features defining a plurality of regions therebetween, and a liquid lubricant disposed in the plurality of regions, the plurality of solid features retaining the liquid lubricant in the plurality of regions during operation of the device, thereby providing a liquid lubricant impregnated surface, wherein the liquid lubricant impregnated surface introduces a slip at the surface (e.g., where a ratio of slip velocity against mean velocity ($u_w/\bar{u}$) is greater than 0.9) when the positive electrode or the negative electrode flows along the surface and promoting plug flow of the positive electrode or the negative electrode along the surface.

In some embodiments, the electroactive device includes a positive electrode storage tank and a negative electrode storage tank, wherein at least a portion of an internal surface of the positive electrode storage tank and/or the negative electrode storage tank includes or is coated with a liquid lubricant impregnated surface. In some embodiments, the electroactive device includes a positive electrode storage tank and a negative electrode storage tank, wherein the positive electrode storage tank and the negative electrode storage tank are connected to the electroactive zone via piping, wherein at least a portion of an internal surface of the piping includes or is coated with a liquid lubricant impregnated surface.

In some embodiments, the ion-permeable membrane includes or is coated with a liquid-lubricant impregnated surface.

Some embodiments described herein relate to methods of manufacturing electrochemical devices discussed herein. Some embodiments described herein relate to methods of retrofitting electrochemical devices with liquid lubricant impregnated surfaces discussed herein. Some embodiments described herein relate to improving slip of electroactive phase materials in electroactive devices by introducing a lubricant impregnated surface on surfaces of the electroactive devices that come into contact with electroactive phase materials.

Elements of embodiments discussed with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWING

The foregoing and other objects, aspects, features, and advantages of the present disclosure will become more apparent and better understood by referring to the following description taken in conjunction with the accompanying drawings, in which:

FIG. 1C illustrates schematics of wetting configurations outside and underneath a drop. The total interface energies per unit area are calculated for each configuration by summing the individual interfacial energy contributions. Equivalent requirements for stability of each configuration are also shown in FIG. 1C.

FIG. 1D depicts macroscopic motion of an electrolyte between walls of a flow battery, in accordance with certain embodiments of the present invention.

FIG. 1E depicts an electrolyte moving on a regular (non-LIS) surface. As shown in FIG. 1E, the advancing contact line pins on asperities and results in a stick-slip motion of the electrolyte on the non-LIS surface.

FIG. 1F depicts an electrolyte moving on a LIS surface. As shown in FIG. 1F, the advancing contact line moves freely along the LIS surface with no stick-slip motion, in accordance with certain embodiments of the present invention.

FIG. 2 is a plot showing exemplary electrochemical impedance spectroscopy as a function of carbon black (Ketjenblack, KB) loading, in accordance with certain embodiments of the present invention.

FIGS. 3A and 3B illustrate a concept of a gravity-induced flow battery, in accordance with certain embodiments of the present invention. In this example, the lithium polysulfide suspension (cathode) 302 can be loaded into half of the flow channel of the battery 300. By tilting the device (battery) 300 at a sufficient angle α, as shown in FIG. 3B, the Lithium polysulfide suspension 302 flows along the interior surface of the battery 300 due to gravitational force. Discharging and charging can be carried out in the electro-active region, e.g., between the current collectors 304.

FIG. 6A is a cyclic voltogramm for a surface that is not impregnated with any lubricant, and FIGS. 6B-6F are cyclic voltogramms for surfaces impregnated with various different lubricants, as designated in FIGS. 6B-6F. FIGS. 6B-6F illustrate cyclic voltammetry (CV) of lubricants and electroactive phases (TEG-DME (tetraethylene glycol dimethyl ether), 0.5M LiTFSi (Lithium bis(trifluoromethane sulfonyl) imide), 1 wt % $LiNO_3$ (Lithium Nitrate)) to probe the electrochemistry of the mixture. The tests were performed with a Swagelok cell configuration in a horizontal manner. Arrows in FIGS. 6D-6F indicate that reactions occurred during the CV test on the stability of lubrications, showing the lubricant is not electrochemically stable at the tested voltages.

As shown in FIG. 7, 10 cSt silicone oil was experimentally found to be the least electrochemically active lubricant.

DETAILED DESCRIPTION

Figure 1A:
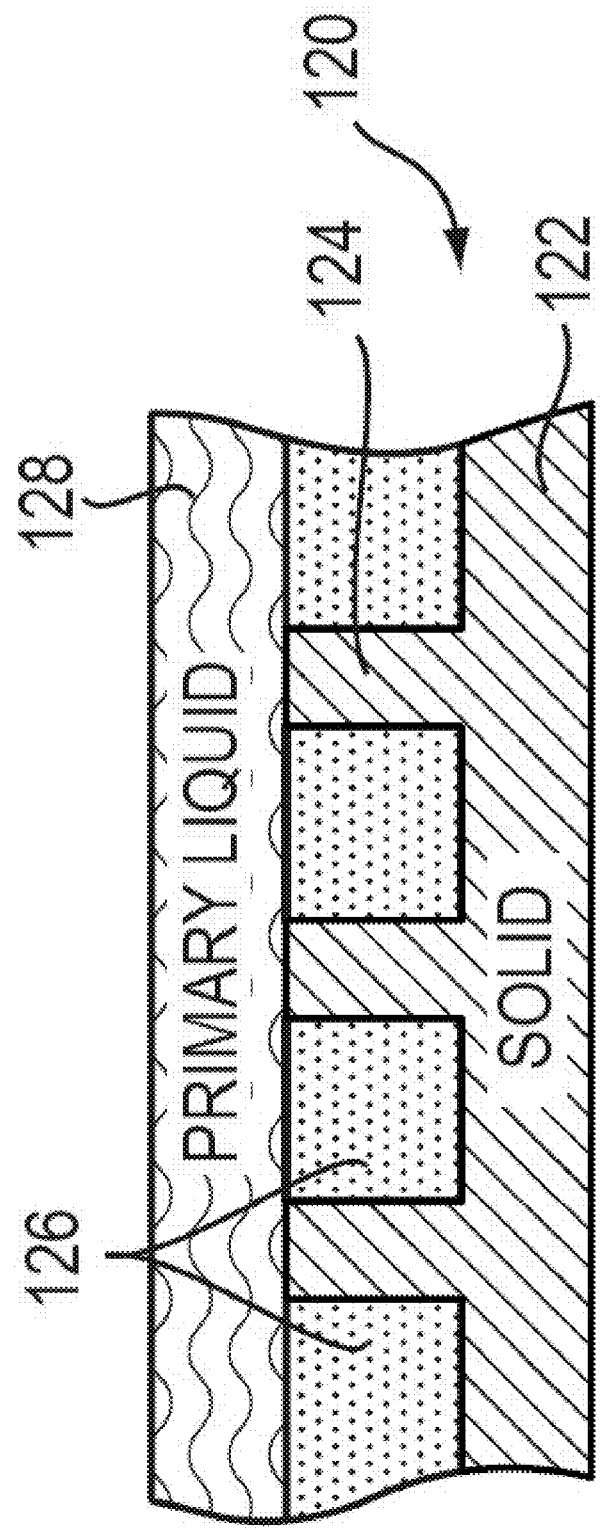
FIG. 1A is a schematic cross-sectional view of a liquid in contact with a liquid-impregnated surface, in accordance with certain embodiments of the invention.

In order for the present disclosure to be more readily understood, certain terms are first defined below. Additional definitions for the following terms and other terms are set forth throughout the specification.

In this application, the use of "or" means "and/or" unless stated otherwise. As used in this application, the term "comprise" and variations of the term, such as "comprising" and "comprises," are not intended to exclude other additives, components, integers or steps. As used in this application, the terms "about" and "approximately" are used as equivalents. Any numerals used in this application with or without about/approximately are meant to cover any normal fluctuations appreciated by one of ordinary skill in the relevant art.

As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Many methodologies described herein include a step of "determining". Those of ordinary skill in the art, reading the present specification, will appreciate that such "determining" can utilize or be accomplished through use of any of a variety of techniques available to those skilled in the art, including for example specific techniques explicitly referred to herein. In some embodiments, determining involves manipulation of a physical sample. In some embodiments, determining involves consideration and/or manipulation of data or information, for example utilizing a computer or other processing unit adapted to perform a relevant analysis. In some embodiments, determining involves receiving relevant information and/or materials from a source. In some embodiments, determining involves comparing one or more features of a sample or entity to a comparable reference.

As used herein, the term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

In certain embodiments, a static contact angle θ between a liquid and a solid is defined as the angle formed by a liquid drop on a solid surface as measured between a tangent at the contact line, where the three phases—solid, liquid, and vapor—meet, and the horizontal. The term "contact angle" usually implies the static contact angle θ since the liquid is merely resting on the solid without any movement.

As used herein, dynamic contact angle, $\theta_d$, is a contact angle made by a moving liquid on a solid surface. In the context of droplet impingement, $\theta_d$ may exist during either advancing or receding movement.

As used herein, a surface is "non-wetting" if it has a dynamic contact angle with a liquid of at least 90 degrees. Examples of non-wetting surfaces include, for example, superhydrophobic surfaces, superoleophobic surfaces, and supermetallophobic surfaces.

As used herein, contact angle hysteresis (CAH) is CAH=$\theta_a$-$\theta_r$, where $\theta_a$ and $\theta_r$ are advancing and receding contact angles, respectively, formed by a liquid on a solid surface. The advancing contact angle $\theta_a$ is the contact angle formed at the instant when a contact line is about to advance, whereas the receding contact angle $\theta_r$ is the contact angle formed when a contact line is about to recede.

It is contemplated that compositions, mixtures, systems, devices, methods, and processes of the claimed invention encompass variations and adaptations developed using information from the embodiments described herein. Adaptation and/or modification of the compositions, mixtures, systems, devices, methods, and processes described herein may be performed by those of ordinary skill in the relevant art.

Throughout the description, where compositions, articles, and devices are described as having, including, or comprising specific components, or where processes and methods are described as having, including, or comprising specific steps, it is contemplated that, additionally, there are compositions, articles, and devices of the present invention that consist essentially of, or consist of, the recited components, and that there are processes and methods according to the present invention that consist essentially of, or consist of, the recited processing steps.

Similarly, where compositions, articles, and devices are described as having, including, or comprising specific compounds and/or materials, it is contemplated that, additionally, there are compositions, articles, and devices of the present invention that consist essentially of, or consist of, the recited compounds and/or materials.

It should be understood that the order of steps or order for performing certain action is immaterial so long as the invention remains operable. Moreover, two or more steps or actions may be conducted simultaneously.

The mention herein of any publication is not an admission that the publication serves as prior art with respect to any of the claims presented herein. Headers are provided for organizational purposes and are not meant to be limiting.

Described herein are technologies that may be applied to portions (e.g., interior surfaces or parts thereof) of various electrochemical devices (e.g., batteries (e.g., flow batteries, aqueous batteries, non-aqueous batteries, metal air batteries) fuel cells, capacitors (e.g., electrolytic capacitors, flow capacitors)). In some embodiments, the electrochemical device is a battery. In some embodiments, the battery is a flow battery, an aqueous battery, a non-aqueous battery, or a metal-air battery. In some embodiments, the electrochemical device is a fuel cell. In some embodiments, the electrochemical device is a capacitor. In some embodiments, the capacitor is an electrolytic capacitor or a flow capacitor.

The advent of micro/nano-engineered surfaces in the last decade has opened up new techniques for enhancing a wide variety of physical phenomena in thermofluids sciences. For example, the use of micro/nano surface textures has provided non-wetting surfaces capable of achieving less viscous drag, reduced adhesion to ice and other materials, self-cleaning, and water repellency. These improvements result generally from diminished contact (i.e., less wetting) between the solid surfaces and adjacent liquids.

One type of non-wetting surface of interest is a superhydrophobic surface. In general, a superhydrophobic surface includes micro/nano-scale roughness on an intrinsically hydrophobic surface, such as a hydrophobic coating. Superhydrophobic surfaces resist contact with water by virtue of an air-water interface within the micro/nano surface textures.

Some embodiments described herein relate to flow batteries that have one or more internal surfaces coated (e.g., at time of manufacture or via retrofitting) with a liquid-impregnated surface (LIS) to lower pumping energy losses and/or to improve electrochemical efficiency of the flow battery. In some embodiments, the flow battery uses aqueous electrochemistry. In some embodiments, the flow battery uses non-aqueous electrochemistry. As shown, for example, in publication titled, "Maximizing Energetic Efficiency in Flow Batteries Utilizing Non-Newtonian Fluids," by Kyle C. Smith, W. Craig Carter and Y.-M. Chiang, *J. Electrochem. Soc.*, 161 (4) pp. A486-A496 (2014), which is incorporated herein by reference in its entirety, introducing slip at the interface between a flow battery electrode (also referred to as electrolytes, catholytes, and anolytes) and the internal wall of a flow channel lowers the energy consumed in pumping the flow electrode, and also increases the electrochemical efficiency of the electrochemical device (e.g., flow battery, flow cell).

The effects of slip and viscoplastic flow do not occur independently—they are fluid-mechanically coupled through rheological constitutive and momentum balance equations. Consideration of this coupling is necessary to quantify the efficiency trade-offs between the rheological and transport properties of semi-solid suspensions. Slip can be modeled by a linear velocity/shear-stress relationship $u_w = \beta \tau_w$, where $u_w$ and $\tau_w$ are velocity and shear stress, respectively, at the channel wall and $\beta$ is the Navier slip coefficient. Various means can be employed to control the degree of wall slip, including surface roughness and the volume fraction of suspended particles. A viscoplastic case, a Bingham plastic, for which viscosity $\mu$ varies with shear rate $\dot{\gamma}$ as $\mu = \mu_p + \tau_0/|\dot{\gamma}|$, and the flow is rigid (i.e., $|\dot{\gamma}|=0$) for shear stresses less than the yield stress $\tau_0$ can be modeled. This rheology exhibits shear-thinning behavior (in other words, viscosity $\mu$ decreases monotonically with increasing shear-rate magnitude $|\dot{\gamma}|$), with viscosity converging to the material-dependent plastic viscosity $\mu_p$ at high shear rates (for example, $\mu(|\dot{\gamma}|, \to \infty) = \mu_p$). The pressure-driven (for example, Poiseuille) velocity profiles of these fluids are governed by momentum balance, and their shape is uniform where rigid, and quadratic in space where flowing. The critical aliquot factor for a given velocity profile depends on two dimensionless numbers: the Bingham number $[B_n = \tau_0 w/(2\mu_p \bar{u})]$, and the slip number $(Sl = 2\mu_p \beta/w)$. $B_n$ is a characteristic scale of elastic shear stresses (given by yield stress $\tau_0$) relative to the characteristic contribution from viscoplastic stress (given by $2\mu_p \bar{u}/w$). Sl is a measure of the flow's slipperiness and is the ratio of the slip extrapolation length to the channel's half-width in the high-velocity limit $(B_n \to 0)$.

Figure 12:
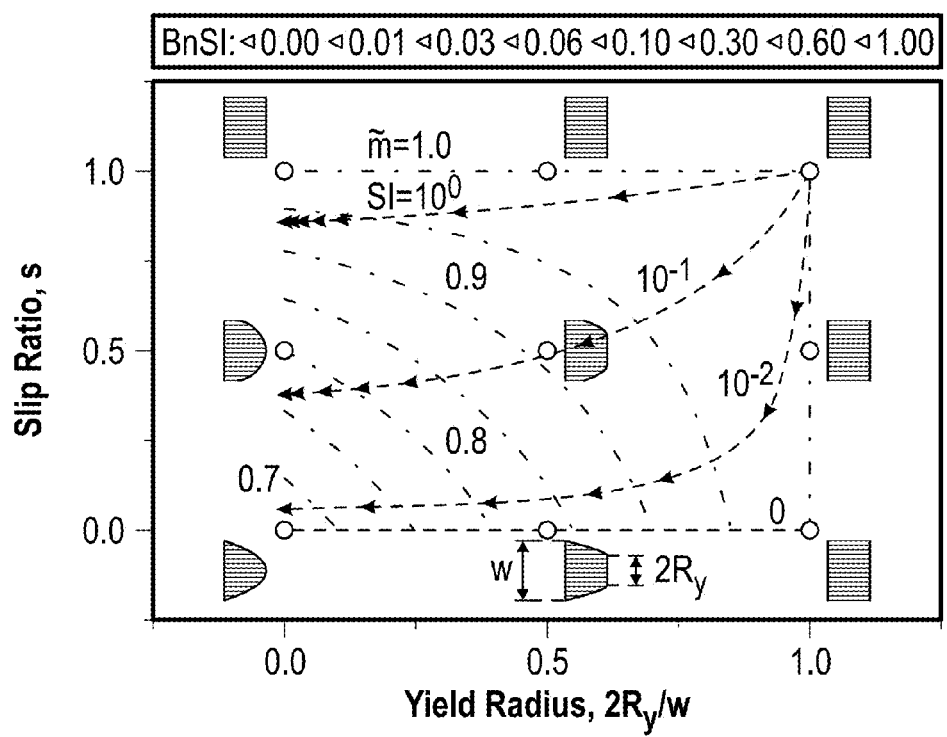
FIG. 12 is a critical displacement profile map for the flow of a Bingham-plastic with wall slip, in accordance with certain embodiments of the present invention.

Referring now to FIG. 12, a critical displacement profile map for the flow of a Bingham-plastic with wall slip is shown. Displacement profiles are depicted at the points specified by circles. The variations of slip ratios s with yield radius $R_y$ for suspensions with constant slip number Sl (0, $10^{-2}$, $10^{-1}$, and $10^0$) are represented by dark dashed lines, upon which triangular symbols indicate the product of Bingham and slip numbers, BnSl, for particular flow conditions (as shown in legend of FIG. 12). The dotted contours of constant critical aliquot factor ($\tilde{m}$=0.70, 0.75, 0.80, 0.85, 0.90, 0.95, and 1.00) are superimposed on the map.

FIG. 12 shows the space of suspension displacement profiles (i.e., path of suspension parcels during an intermittent flow pulse) for a Bingham plastic with slip, when displaced at a critical aliquot factor corresponding to the particular velocity profile. Each displacement profile is described geometrically by the flow's yield radius Ry (half the width of the flow's rigid core) and the slip ratio s (ratio of the slip velocity $u_w$ to the mean velocity $(\bar{u})$. For a fixed yield radius Ry the displacement profile becomes more plug-like as the slip ratio s increases (i.e., along a vertically ascending line on FIG. 12). For a fixed slip ratio s the displacement profile becomes plug-like as the yield radius Ry increases (i.e., along a horizontal line moving rightward on FIG. 12). The slip ratio s and yield radius Ry depend on the Bingham number Bn and slip number Sl. In other words, for each point defined by (Ry,s) on the displacement profile map (FIG. 12), there corresponds a pair (Bn,Sl). For a particular slip number Sl, the yield radius Ry and slip ratio s evolve as Bingham number Bn is varied (FIG. 12, dark-dashed lines). FIG. 12 shows such curves for several slip numbers (0, $10^{-2}$, $10^{-1}$, and $10^0$). Points are marked along each constant-Sl curve by triangular symbols that indicate the corresponding Bingham number Bn (see FIG. 12, legend). These curves can be thought of as "flowcurves" along which volumetric flow-rate is adjusted continuously, because an increase in Bingham number Bn is equivalent to a decrease in mean flow velocity $\bar{u}$ when material properties and channel width are fixed. For a given constant-Sl curve, both yield radius Ry and slip ratio s increase with increasing Bingham number Bn, in other words, flow uniformity increases with increasing Bn.

The set of possible velocity profiles for Bingham-plastic flow with slip comprise a two-dimensional space as shown in FIG. 12. Superimposed on this map are light dotted curves along which critical aliquot factor $\tilde{m}$ is constant; the particular curves shown in FIG. 12 are for $\tilde{m}$ equal to 0.70, 0.75, 0.80, 0.85, 0.90, 0.95, and 1.00. Accordingly, given a specific velocity profile (determined by Bingham number Bn and slip number Sl) a critical aliquot factor that maximizes discharge capacity and energetic efficiency may be determined.

In some embodiments, slip ratio s (calculated as ratio of the slip velocity to the mean velocity, $u_w/\bar{u}$) is equal to or greater than 0.9. In some embodiments, the use of LIS on various surface(s) of electrochemical devices enables plug-like flow of the electroactive phase with a slip ratio s that is equal to or greater than 0.9.

In some instances, as discussed above, flow electrodes have a continuous percolating network of an electronic conductor phase that imparts electronic conductivity to the flow electrodes. As also discussed above, the rheology of the flow electrodes may be non-Newtonian by possessing, for example, shear-thinning behavior, or Bingham plastic or Hershel-Bulkley rheology, wherein there is a measureable yield stress to the fluid followed by Newtonian or non-Newtonian viscosity after the yield stress is overcome. For example, in some embodiments, flow electrodes may be composed of non-Newtonian fluids (e.g., with shear-thinning behavior, or Bingham plastic or Hershel-Bulkley rheology), where there is a measurable yield stress to the fluid.

Bingham plastics (e.g., yield stress fluids) are fluids that require a finite yield stress before beginning to flow. Typically, Bingham plastics will not flow solely via gravitational forces; in other words, an additional force (e.g., in addition to gravity) needs to be applied to Bingham plastics in order for Bingham plastics to flow. Shear-thinning fluids (also known as thixotropic fluids) are fluids with viscosities that depend on the time history of shear (and whose viscosities decrease as shear is continually applied). Shear-thinning fluids need to be agitated over time to begin to thin (and flow). Shear-thinning fluids typically will not flow solely via gravitational forces; in other words, an additional force (e.g., in addition to gravity) needs to be applied to shear-thinning fluids in order for shear-thinning fluids to flow.

Lubricant-impregnated surfaces (LISs) have been explored for their slippery properties in some applications. Whereas a superhydrophobic surface is a surface composed of solid and air, a LIS is a surface composed of, for example, a solid and a liquid lubricant. Compared to superhydrophobic surfaces, LISs are more robust to pressure and are self-healing. The slippery properties of LISs led to incorporation of these surfaces for heat transfer, anti-icing, and biological systems. LISs typically have low contact angle hysteresis (<1°) with high droplet mobility. Surfaces of this type give rise to advantages in electrochemical systems that have previously not been conceived or explored. Some exemplary LISs are described, for example, in U.S. Pat. No. 8,574,704, filed on Aug. 16, 2012 and U.S. Pat. No. 8,535,779, filed on Jul. 17, 2012, the disclosure of each of which is incorporated herein by reference in its entirety.

Referring to FIG. 1A, in certain embodiments, a non-wetting, liquid-impregnated surface 120 is provided that includes a solid 122 in the form of textures (e.g., posts 124) that are impregnated with an impregnating liquid 126, rather than a gas. The solid can be a coating on a substrate or the solid can be the substrate itself (e.g., internal surface of a battery or flow cell). In the depicted embodiment, a contacting liquid 128 (e.g., electrochemical phase) in contact with the surface, rests on the posts 124 (or other suitable surface texture) of the surface 120. In the regions between the posts 124, the contacting liquid 128 is supported by the impregnating liquid 126. In certain embodiments, the contacting liquid 128 is immiscible with the impregnating liquid 126 (immiscibility is discussed in further detail below). In some embodiments, the impregnating liquid 126 forms a thin (e.g., several nanometers, e.g., 1-10 nm, 5-15 nm, 10-30 nm, 25-50 nm, 40-75 nm, 50-100 nm) layer on top of the posts 124 (or other solid surface features); in such embodiments, the contacting liquid 128 is in contact with the impregnating liquid 126.

The solid 122 may include any intrinsically hydrophobic, oleophobic, and/or metallophobic material or coating. For example, the solid 122 may include: hydrocarbons, such as alkanes, and fluoropolymers, such as TEFLON®, trichloro (1H,1H,2H,2H-perfluorooctyl)silane (TCS), octadecyltrichlorosilane (OTS), heptadecafluoro-1,1,2,2-tetrahydrodecyltrichlorosilane, fluoroPOSS, and/or other fluoropolymers. Additional possible materials or coatings for the solid 122 include: ceramics, polymeric materials, fluorinated materials, intermetallic compounds, and composite materials. Polymeric materials may include, for example, polytetrafluoroethylene, fluoroacrylate, fluorourethane, fluorosilicone, fluorosilane, modified carbonate, chlorosilanes, silicone, polydimethylsiloxane (PDMS), and/or combinations thereof. Ceramics may include, for example, titanium carbide, titanium nitride, chromium nitride, boron nitride, chromium carbide, molybdenum carbide, titanium carbonitride, electroless nickel, zirconium nitride, fluorinated silicon dioxide, titanium dioxide, tantalum oxide, tantalum nitride, diamond-like carbon, fluorinated diamond-like carbon, and/or combinations thereof. Intermetallic compounds may include, for example, nickel aluminide, titanium aluminide, and/or combinations thereof.

In some embodiments, the solid 122 is a coating of an underlying substrate, where the substrate and/or the solid 122 comprises any suitable material for use in an electrochemical device. In some embodiments, the substrate or the coating includes (or is made of) a material such as, for example, PTFE (TEFLON®), rare earth elements (e.g., rare earth oxides, e.g., ceria), and silicons. In some embodiments, the underlying substrate is a commercial TEFLON® membrane, for example, a commercial PTFE membrane available from Stelitech Corporation (e.g., laminated PTFE membranes that are chemically and biologically inert, stable up to, e.g., 260° C. (500° F.) or higher, and naturally hydrophobic). In some embodiments, PTFE membranes composed of fibers provide a desired level of roughness for electrochemical devices used herein. In some embodiments, the underlying substrate is an electronically conductive surface. In some embodiments, the electronically conductive surface includes metals. In some embodiments, the electronically conductive surface includes a material selected from the group consisting of Carbon (graphene), Silver, Copper, Gold, Aluminum, Calcium, Tungsten, Zinc, Nickel, Lithium, Iron, Platinum, Tin, Carbon steel, Lead, Titanium, Grain oriented electrical steel, Manganin, Constantan, Stainless steel, Mercury, Nichrome, Carbon (graphite), and any combination thereof. In some embodiments, the substrate includes an electrically conductive plastic (e.g., radical polymers, e.g., Poly(2,2,6,6-tetramethylpiperidinyloxy methacrylate) (PTMA)).

The use of rare earth elements in non-wetting surfaces is discussed, for example, in U.S. Application Publication No. 2013/0251946, filed on Jan. 15, 2013, the disclosure of which is incorporated herein by reference in its entirety. In certain embodiments, the rare earth element material comprises a rare earth oxide, a rare earth carbide, a rare earth nitride, a rare earth fluoride, and/or a rare earth boride. In certain embodiments, the rare earth element material comprises scandium oxide ($Sc_2O_3$), yttrium oxide ($Y_2O_3$), lanthanum oxide ($La_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_2O_3$), gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), lutetium oxide ($Lu_2O_3$), cerium carbide ($CeC_2$), praseodymium carbide ($PrC_2$), neodymium carbide ($NdC_2$), samarium carbide ($SmC_2$), europium carbide ($EuC_2$), gadolinium carbide ($GdC_2$), terbium carbide ($TbC_2$), dysprosium carbide ($DyC_2$), holmium carbide ($HoC_2$), erbium carbide ($ErC_2$), thulium carbide ($TmC_2$), ytterbium carbide ($YbC_2$), lutetium carbide ($LuC_2$), cerium nitride (CeN), praseodymium nitride (PrN), neodymium nitride (NdN), samarium nitride (SmN), europium nitride (EuN), gadolinium nitride (GdN), terbium nitride (TbN), dysprosium nitride (DyN), holmium nitride (HoN), erbium nitride (ErN), thulium nitride (TmN), ytterbium nitride (YbN), lutetium nitride (LuN), cerium fluoride ($CeF_3$), praseodymium fluoride ($PrF_3$), neodymium fluoride ($NdF_3$), samarium fluoride ($SmF_3$), europium fluoride ($EuF_3$), gadolinium fluoride ($GdF_3$), terbium fluoride ($TbF_3$), dysprosium fluoride ($DyF_3$), holmium fluoride ($HoF_3$), erbium fluoride ($ErF_3$), thulium fluoride ($TmF_3$), ytterbium fluoride ($YbF_3$), and/or lutetium fluoride ($LuF_3$).

A variety of methods may be used to produce the surface texture in a LIS, as discussed above. In some embodiments, photolithography may be used, especially for relatively small size scale and flat surfaces. In some embodiments, chemical etching processes may be used, especially for metal oxides and plastics. Certain materials have intrinsically low surface energies (e.g., lower than about 50 mN/m, lower than 40 mN/m, lower than 30 mN/m, lower than 25 mN/m, between 25 and 50 mN/m, etc.) that meet the thermodynamic requirements (e.g., polycarbonate and other polymers, certain metals, certain ceramics (e.g., oxides of the lanthanides)), and are used without substantial additional processing (e.g., used without requiring, e.g., chemical vapor deposition or solution based deposition of low surface energy material (e.g., non-fluorinated (carbon chain) silanes and thiols)). In some embodiments, chemical vapor deposition of a hydrophobic monomer or grafting of a hydrophobic thiol may be used to produce surfaces with the thermodynamic requirements for LISs.

In some embodiments, a metal surface (e.g., an electronically conductive metal surface) is etched to provide a rough surface texture. In some embodiments, a thin (e.g., several nano-scale or micro-scale) layer of material with a low surface energy (e.g., below 50 mN/m) is applied to the roughened metal surface. In some embodiments, the thin layer is a monolayer (e.g., molecularly thin) or the thin layer may be thicker so long at the thin layer does not cover up the rough texture (e.g., such that sufficient surface roughness remains on the surface after application of the thin layer). In some embodiments, the thin layer can be deposited by a number of suitable processes, including vapor deposition and solution-based deposition. In some embodiments, a number of common chemicals can be used to form the thin monolayer, including fluorinated and non-fluorinated (carbon chain) silanes and thiols. In some embodiments, the low surface energy material is PTFE. In some embodiments, the low surface energy material is a rare earth oxide. In some embodiments, the low surface energy material is at least one material listed above as a component making up the solid 122.

The textures within the liquid-impregnated surface 120 are physical textures or surface roughness. The textures may be random, including fractal, or patterned. In certain embodiments, the textures are micro-scale and/or nano-scale features. For example, the textures may have a length scale L (e.g., an average pore diameter, or an average protrusion height) that is less than about 100 microns, less than about 10 microns, less than about 1 micron, less than about 0.1 microns, or less than about 0.01 microns. In certain embodiments, the texture includes posts 124 or other protrusions, such as spherical or hemispherical protrusions. Rounded protrusions may be preferable in some embodiments to avoid sharp solid edges and minimize pinning of liquid edges. The texture may be introduced to the surface using any conventional method, including mechanical and/or chemical methods such as lithography, self-assembly, and deposition, for example. In some embodiments, the surface features (e.g., particles) are spray-deposited (e.g., deposited by aerosol or other spray mechanism).

In some embodiments, the solid features have a height no greater than about 100 micrometers. In certain embodiments, the features are posts (e.g., posts 124). In certain embodiments, the features include one or more spherical particles, nanoneedles, nanograss, and/or random geometry features that provides surface roughness. In certain embodiments, the feature comprises one or more pores, cavities, interconnected pores, and/or interconnected cavities. In certain embodiments, the surface comprises porous media with a plurality of pores having different sizes.

The impregnating liquid 126 may be any type of liquid that is capable of providing the desired non-wetting properties for desired applications. For example, the impregnating liquid 126 may be oil-based (e.g., silicone oil). In certain embodiments, the impregnating liquid 126 is an ionic liquid (e.g., BMI-IM). Other examples of possible impregnating liquids include hexadecane, vacuum pump oils (e.g., FOMBLIN® 06/6, KRYTOX® 1506) silicone oils (e.g., 10 cSt or 1000 cSt), fluorocarbons (e.g., perfluoro-tripentylamine, FC-70), shear-thinning fluids, shear-thickening fluids, liquid polymers, dissolved polymers, viscoelastic fluids, and/or liquid fluoroPOSS. In certain embodiments, the impregnating liquid is (or comprises) a hydrocarbon liquid, and/or a fluorocarbon liquid. In some embodiments, the impregnating liquid 126 is electronically or ionically conducting. In some embodiments, the impregnating liquid includes additional components that impart electric or ionic conductivity.

In some embodiments, the impregnating liquid 126 includes electronically-conducting particles (e.g., nanoparticles, microparticles) suspended therein (e.g., any impregnating liquid 126 discussed herein with electronically conducting particles suspended therein). In some embodiments, the electronically-conducting particles suspended in the impregnating liquid include nano-sized carbon particles or nano-sized metal particles. In some embodiments, the electronically-conducting particles form a percolating network of electronically-conducting particles, which allows a layer (e.g., layer 128 in FIG. 1A) to be electronically conducting. In some embodiments, the LIS (e.g., LIS comprising an impregnating liquid 126 including electronically-conducting particles suspended therein) is applied to the current collector.

In some embodiments, a "percolating conductive network," refers to particles that are electronically connected, such that electronic charge carriers can be transported throughout the network. The particles themselves may be in actual physical contact with each other and/or some of the particles may not necessarily be in actual physical contact, but the particles may be positioned near enough to each other (e.g., as in a suspension) such that the particles are electronically connected and electronic charge carriers can be transported between the particles. Without being bound by a particular theory, a percolating conductive network may be formed in some embodiments by electronically conductive particles undergoing diffusion-limited aggregation (DLA). Diffusion-limited aggregation refers to a process where particles undergoing a random walk due to Brownian motion exhibit "hit-and-stick" behavior; that is, they stick to other particles they hit—and thereby aggregate to form fractal networks. Such networks may have a self-similar structure when observed at varying magnifications.

In some embodiments, the impregnating liquid 126 is made shear thickening with the introduction of nano particles. A shear-thickening impregnating liquid 126 may be desirable for preventing impalement and resisting impact from impinging liquids, for example.

In some embodiments, the impregnating liquids 126 with low vapor pressures (e.g., less than 0.1 mmHg, less than 0.001 mmHg, less than 0.00001 mmHg, or less than 0.000001 mmHg) are used. In certain embodiments, the impregnating liquid 126 has a freezing point of less than −20° C., less than −40° C., or about −60° C. In certain embodiments, the surface tension of the impregnating liquid 126 is about 15 mN/m, about 20 mN/m, or about 40 mN/m (e.g., ionic liquids). In certain embodiments, the viscosity of the impregnating liquid 126 is from about 10 cSt to about 1000 cSt).

The impregnating liquid 126 may be introduced to the surface 120 using any conventional technique for applying a liquid to a solid. In certain embodiments, a coating process, such as a dip coating, blade coating, or roller coating, is used to apply the impregnating liquid 126. In certain embodiments, the liquid lubricant is mixed with a solvent and then sprayed, because the solvent will reduce the liquid lubricant viscosity, allowing it to spray more easily and more uniformly. Then, the solvent will dry out of the coating. In certain embodiments, the method further includes chemically modifying the substrate prior to applying the texture to the substrate and/or chemically modifying the solid features of the texture.

In some embodiments, after the impregnating liquid 126 has been applied, capillary forces hold the liquid 126 in place between the surface textures (e.g., between surface posts 124). Capillary forces scale roughly with the inverse of feature-to-feature distance or pore radius, and the features may be designed such that the liquid is held in place in-between and/or within the features despite movement of the surface and despite movement of fluids over the surface. In some embodiments, the lubricant is stabilized by the capillary forces arising from the microscopic texture, and provided that the lubricant wets the solid preferentially, this allows the electroactive phase to move (e.g., slide, roll, slip, etc.) above the LIS surface with remarkable ease, as evidenced by the extremely low contact angle hysteresis (~1°) of the electroactive phase. In some embodiments, in addition to low hysteresis, these non-wetting surfaces can self-heal by capillary wicking upon damage. Contact line morphology governs pinning of the electroactive phase and hence its mobility on the surface.

In some embodiments, the impregnating liquid is held in place between the features regardless of orientation of the article (e.g., oriented at any angle). In some embodiments, the impregnating liquid is not displaced (e.g., removed) from the article (e.g., battery) during use, transport, and/or storage of the article. In some embodiments, the impregnating liquid and the article itself is shelf-stable, e.g., during storage and during the useful life of the article.

In certain embodiments, nano-scale features (e.g., 1 nanometer to 1 micrometer) are used to facilitate stable containment of the impregnating liquid in-between and/or within the surface features, especially where high dynamic forces, gravitational forces, and/or shearing could pose a threat to removing the impregnating liquid from the surface. In some embodiments, small (e.g., nano-scale) features may also be useful to provide robustness.

In some embodiments, the LISs are useful for reducing viscous drag between a solid surface (e.g., an interior surface of an electroactive device) and a flowing liquid (e.g., electroactive phase). In general, the viscous drag or shear stress exerted by a liquid flowing over a solid surface is proportional to the viscosity of the liquid and the shear rate adjacent to the surface. A traditional assumption is that liquid molecules in contact with the solid surface stick to the surface, in a so-called "no-slip" boundary condition. While some slippage may occur between the liquid and the surface, the no-slip boundary condition is a useful assumption for most applications.

In certain embodiments, non-wetting surfaces, such as LISs, are desirable as they induce a large amount of slip at the solid surface. For example, referring again to FIG. 1A, when a contacting liquid 128 (e.g., electroactive phase) is supported by an impregnating liquid 126, the liquid-liquid interface is free to flow or slip with respect to the underlying solid material. Drag reductions of as much as 40% may be achieved due to this slippage.

Figure 1B:
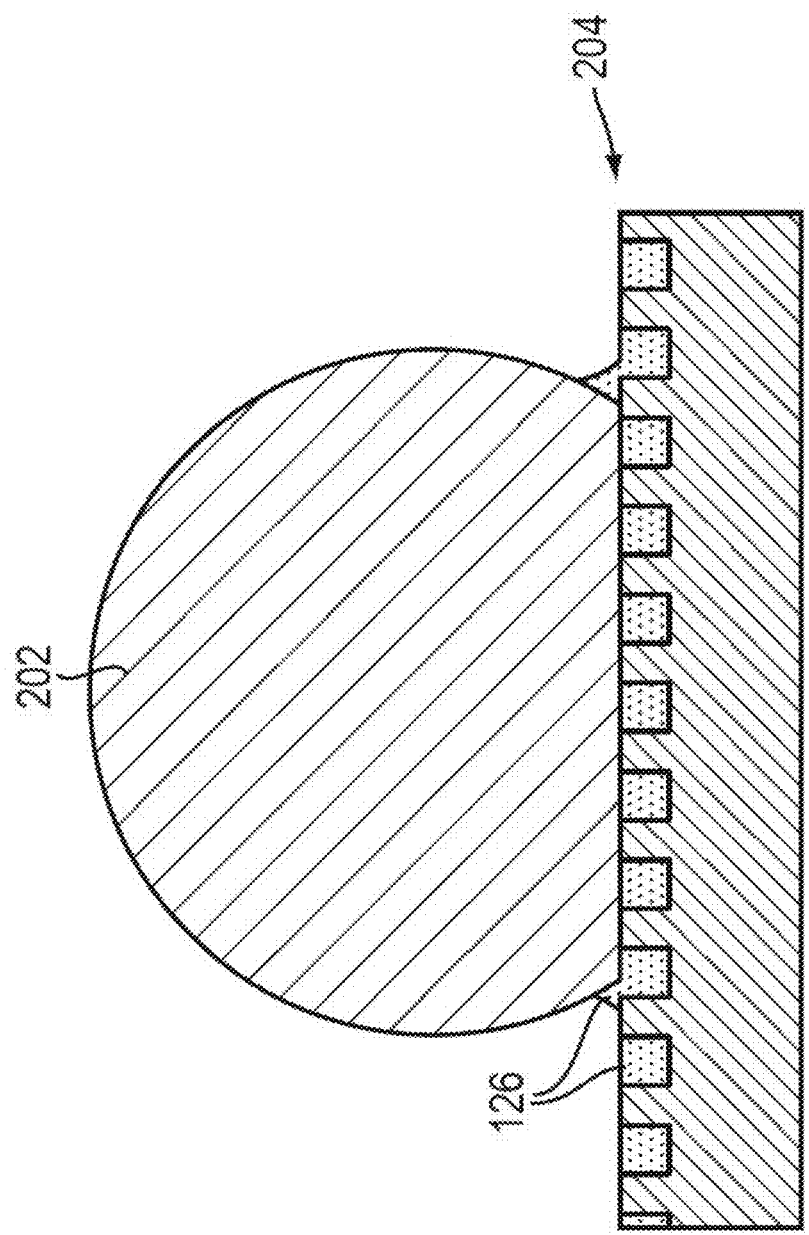
FIG. 1B is a schematic cross-sectional view of a droplet resting on a liquid-impregnated surface, in accordance with certain embodiments of the invention.
Figure 1D:
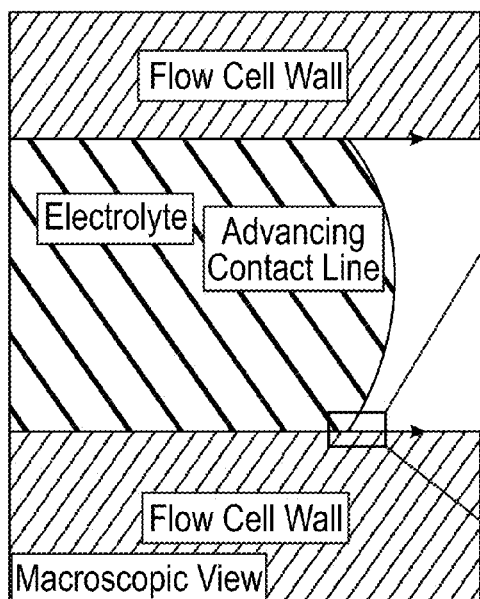
FIGS. 1D-1F illustrate schematics of electrolyte flow between flow cell walls, in accordance with certain embodiments of the present invention.

FIG. 1B is a schematic cross-sectional view of a liquid droplet 202 (e.g., droplet of an electroactive phase) resting on a liquid-impregnated surface 204, in accordance with certain embodiments of the invention. In some embodiments, the morphology of the droplet edge, which governs its mobility, is affected by the properties of the impregnating liquid 126. For example, as depicted, the droplet may "pick up" the impregnating liquid 126 locally near the droplet edges. The pooling of impregnating liquid 126 at the edges of the droplet gives rise to pinning forces. In some embodiments, during droplet roll-off, the pinning forces, and viscous forces resist droplet movement due to gravity A thermodynamic framework that allows one to predict whether a system will be stable for a given droplet, oil, and substrate material will be discussed in further detail below. Droplets placed on lubricant-impregnated surfaces exhibit fundamentally different behavior compared to droplets placed on typical superhydrophobic surfaces. In some embodiments, these four-phase systems can have up to three different three-phase contact lines, giving up to twelve different thermodynamic configurations. There are three possible configurations to consider for the interface outside of the droplet (in an air environment), and three possible configurations to consider for the interface underneath the droplet (in a water environment). These configurations are shown in FIG. 1C along with the total interface energy of each configuration.

The configurations possible outside the droplet are A1 (not impregnated, i.e., dry), A2 (impregnated with emergent features), and A3 (impregnated with submerged features—i.e., encapsulated). On the other hand, underneath the droplet, the possible configurations are W1 (impaled), W2 (impregnated with emergent features), and W3 (impregnated with submerged features—i.e., encapsulated). The stable configuration will be the one that has the lowest total interface energy. Referring now to configurations outside the droplet, the textured surface as it is slowly withdrawn from a reservoir of oil could be in any of states A1, A2, and A3 depending on which has the lowest energy. For example, state A2 would be stable if it has the lowest total interface energy, i.e. $E_{A2} < E_{A1}, E_{A3}$. From FIG. 1C, this results in:

$$E_{A2} < E_{A1} \leftrightarrow (\gamma_{sa} - \gamma_{os})/\gamma_{oa} > (1-\varphi)/(r-\varphi) \quad (1)$$

$$E_{A2} < E_{A3} \leftrightarrow \gamma_{sa} - \gamma_{os} - \gamma_{oa} < 0 \quad (2)$$

where γ is the interfacial tension between the two phases designated by subscripts w, a, o, and s, where w is water, a is air, and o is the impregnating liquid, s is solid surface, $\varphi$ is the fraction of the projected area of the surface that is occupied by the solid and r is the ratio of total surface area to the projected area of the solid. In the case of square posts with width "a", edge-to-edge spacing "b", and height "h", $\varphi = a^2/(a+b)^2$ and $r = 1 + 4ah/(a+b)^2$. Applying Young's equation, $\cos(\theta_{os(a)}) = (\gamma_{sa} - \gamma_{os})/\gamma_{oa}$, Eq. (1) reduces to the hemi-wicking criterion for the propagation of oil through a textured surface: $\cos(\theta_{os(a)}) > (1-\varphi)/(r-\varphi) = \cos(\theta_c)$. This requirement can be conveniently expressed as $\theta_{os(a)} < \theta_c$. In Eq. (2), $\gamma_{sa} - \gamma_{os} - \gamma_{oa}$, is simply the spreading coefficient $S_{os(a)}$ of oil on the textured surface in the presence of air. This may be reorganized as $(\gamma_{sa} - \gamma_{os})/\gamma_{oa} < 1$, and applying Young's equation again, Eq. (2) can be written as $\theta_{os(a)} > 0$. Expressing Eq. (1) in terms of the spreading coefficient $S_{os(a)}$, yields:

$-\gamma_{oa}(r-1)/(r-\varphi) < S_{os(a)}$. The above simplifications then lead to the following equivalent criteria for the surface to be in state A2:

$$E_{A2} < E_{A1}, E_{A3} \leftrightarrow \theta_c > \theta_{os(a)} > 0 \leftrightarrow -\gamma_{oa}(r-1)/(r-\varphi) < S_{os(a)} < 0 \quad (3)$$

Similarly, state A3 would be stable if $E_{A3} < E_{A2}, E_{A1}$. From FIG. 1C, this gives:

$$E_{A3} < E_{A2} \leftrightarrow \theta_{os(a)} = 0 \leftrightarrow \gamma_{sa} - \gamma_{os} - \gamma_{oa} \equiv S_{os(a)} \geq 0 \quad (4)$$

$$E_{A3} < E_{A1} \leftrightarrow \theta_{os(a)} < \cos^{-1}(1/r) \leftrightarrow S_{os(a)} > -\gamma_{oa}(1/r) \quad (5)$$

Note that Eq. (5) is automatically satisfied by Eq. (4), thus the criterion for state A3 to be stable (i.e., encapsulation) is given by Eq. (4). Following a similar procedure, the condition for state A1 to be stable can be derived as $$E_{A1} < E_{A2}, E_{A3} \leftrightarrow \theta_{os(a)} > \theta_c \leftrightarrow S_{os(a)} < -\gamma_{oa}(r-1)/(r-\varphi) \quad (6)$$

The rightmost expression of Eq. (4) can be rewritten as $(\gamma_{sa} - \gamma_{os})/\gamma_{oa} \geq 1$. This raises an important point: Young's equation would suggest that if $\theta_{os(a)} = 0$, then $(\gamma_{sa} - \gamma_{os})/\gamma_{oa} = 1$ (i.e., $S_{os(a)} = 0$). However, $\theta_{os(a)} = 0$ is true also for the case that $(\gamma_{sa} - \gamma_{os})/\gamma_{oa} > 1$ (i.e., $S_{os(a)} > 0$). It is important to realize that Young's equation predicts the contact angle based on balancing the surface tension forces on a contact line—the equality only exists for a contact line at static equilibrium. For a spreading film ($S_{os(a)} > 0$) a static contact line does not exist, hence precluding the applicability of Young's equation.

The configurations possible underneath the droplet are discussed in the paragraphs below. Upon contact with water, the interface beneath the droplet will attain one of the three different states—W1, W2, or W3 (FIG. 1C)—depending on which has the lowest energy. Applying the same method to determine the stable configurations of the interface beneath the droplet, the stability requirements take a form similar to Eqs. (3), (4), and (6), with $\gamma_{oa}$, $\gamma_{sa}$, $\theta_{os(a)}$, $S_{os(a)}$, replaced with $\gamma_{ow}$, $\gamma_{sw}$, $\theta_{os(w)}$, $S_{os(w)}$ respectively. In addition, $\theta_c$ is not affected by the surrounding environment as it is only a function of the texture parameters, $\varphi$ and $r$. Thus, the texture will remain impregnated with oil beneath the droplet with emergent post tops (i.e., state W2) when:

$$E_{W2} < E_{W1}, E_{W3} \leftrightarrow \theta_c > \theta_{os(w)} > 0 \leftrightarrow -\gamma_{ow}(r-1)/(r-\varphi) < S_{os(w)} < 0 \quad (7)$$

State W3 will be stable (i.e., the oil will encapsulate the texture) when:

$$E_{W3} < E_{W1}, E_{W2} \leftrightarrow \theta_{os(w)} = 0 \leftrightarrow \gamma_{sw} - \gamma_{os} - \gamma_{ow} \equiv S_{os(w)} \geq 0 \quad (8)$$

and the droplet will displace the oil and be impaled by the textures (state W1) when:

$$E_{W1} < E_{W2}, E_{W3} \leftrightarrow \theta_{os(w)} > \theta_c \leftrightarrow S_{os(w)} < -\gamma_{ow}(r-1)/(r-\varphi) \quad (9)$$

Figure 1E:
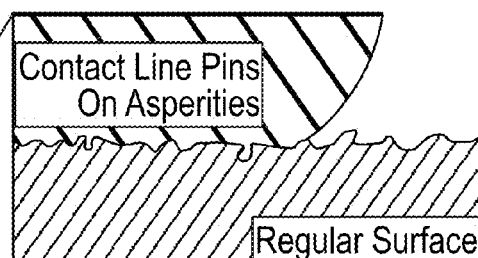
Figure 1F:
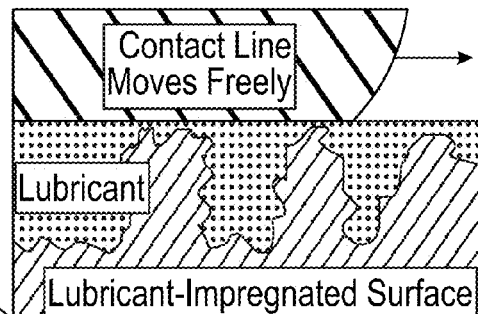

As depicted in FIG. 1F, in some embodiments, a LIS is composed of textures that contain a lubricant (e.g., impregnating liquid 126 of FIG. 1A). In some embodiments, as discussed above, the lubricant is held between the surface features by capillary forces. In some embodiments, the lubricant is stably held in place between the surface features regardless of orientation of the surface (e.g., the lubricant does not escape the surface features via gravitational forces). The contact line of working fluid moves across a LIS freely. An untreated surface (e.g., a surface without a lubricant and/or impregnated liquid) on the other hand typically has inherent roughness and the advancing contact line readily pins on asperities, as depicted, for example, in FIG. 1E, resulting in non-slip motion. On a LIS, the advancing contact line moves freely with slip motion, as shown in FIG. 1F.

In some embodiments, LISs may be used to reduce friction (e.g., viscous drag) between a solid surface and a flowing liquid, e.g., where an electrochemically active component (e.g., charge storing electrodes or electrochemical fuels) contacts the surface(s) (or a portion of the surface(s)) of an electrochemical device.

In some embodiments, charge storing electrodes may be battery electrodes, flow battery electrodes (e.g., catholytes, anolytes), capacitor electrodes, and flow capacitor electrodes.

In some embodiments, electrochemical fuels may include condensed phase from which electrical energy is obtained through the electrochemical reaction in a device. Condensed phase fuels may be single phase or multiphase. Condensed phase fuels may include organic or inorganic compound(s) (or any combination thereof). In some embodiments, condensed phase fuels may include liquids, phase separated liquids, solids, liquid-solid suspensions, semi-solids, gels, micelles, and any combination thereof. In some embodiments, the condensed phase includes water in a hydrogen fuel cell or water in a methanol fuel cell.

In some embodiments, LISs are used to reduce friction during operation of an electrochemical device where one or more electroactive phases undergo flow through the device.

In some embodiments, LISs are used to reduce friction during manufacture of an electrochemical device. In some embodiments, one or more electroactive phases are flowed/transported along one or more surface(s) (and/or portion(s) thereof) of the electrochemical device during manufacture of the electrochemical device. In some embodiments, any surface (or part or portion thereof) (e.g., pipeline for the manufacturing process) or any part of any equipment that comes into contact with one or more electroactive phases during manufacture of the electrochemical device includes or is coated with a LIS. For example, devices that are coated with LIS may lose less active material during pumping or transporting. In manufacturing of conventional batteries, the components of the battery are added to the cell and the cell is sealed (e.g., as in a cylindrical battery cell). In some embodiments, the devices that pump, transport, or otherwise come into contact with the electrochemically active phases that are included in conventional batteries (and other devices) are coated with LISs such that a smaller fraction of the electrochemically active phase is lost during the manufacturing processes.

In some embodiments, embodiments of the present invention may be useful for flow batteries and similar devices, as the surfaces described herein can lower pumping energy losses and/or increase the electrochemical energy efficiency of flow batteries. In some embodiments, LISs of the present invention enable the electrode to flow where otherwise the yield stress of the electrode cannot be overcome without the LIS (e.g., where the electrode would not flow without the LIS or where the electrode would become pinned to the surface, as shown, for example in FIG. 1E).

In some embodiments, LISs may influence or control flow velocity, gradients in velocity, extent of slip, and/or direction of flow of an electroactive phase or electrolyte in an electrochemical device. In some embodiments, LISs allow for precise control of the velocity and/or trajectory of movement of an electroactive phase or electrolyte in an electrochemical device.

In some embodiments, LISs may be used to facilitate and/or control the flow of any viscous or yield-stress fluid(s) flowing through a fluidic or microfluidic geometry for electrochemical applications.

In some embodiments, a location of a reactant or product phase on a LIS may be controlled by selecting lubricants and/or surface coatings with desired properties (e.g., surface tension, wettability, viscosity, melting/freezing point, and any combination thereof). In some embodiments, LISs may increase or decrease an amount of nucleation, growth, precipitation, or segregation of a liquid or solid phase at the interface between LISs and electroactive phases. For example, in a lithium-sulfur battery, the sulfur undergoes a series of transformations, e.g., from $S_8$ to $Li_2S_8$, $Li_2S_6$, $Li_2S_4$, $Li_2S_2$, and $Li_2S$ during cycling. Of these species, $Li_2S_8$, $Li_2S_6$ are soluble in the electrolyte. $Li_2S_4$ is insoluble in typical solvents (e.g., for example, $Li_2S_4$ is insoluble in TEG-DME) and, therefore, may deposit on surfaces. If $Li_2S_4$ (or other insoluble species such as $Li_2S_2$ or $Li_2S$) deposit away from the electrode, that material may not be recovered (e.g., such deposition would typically result in loss of Li-bearing active material, and hence loss of capacity of the battery). The use of a LIS may prevent insoluble species, for example $Li_2S_4$ from depositing on unwanted surfaces (e.g., from depositing on surfaces that are not electrically connected to the terminals of the battery or are otherwise electrochemically inactive). Similarly, $Li_2S_2$, and $Li_2S$ are insoluble in typical solvents, and the use of a LIS may prevent these species from depositing on unwanted surfaces (e.g., from depositing on surfaces that are not electrochemically active). In some embodiments, LISs may increase precipitation of a phase (e.g., electroactive phase) at the interface by acting as a heterogeneous nucleation surface, as discussed in further detail below. In certain embodiments, LISs may serve to suppress nucleation, growth, or precipitation of a phase (e.g., electroactive phase) at the interface by producing an interface such that the precipitating phase has a high contact angle at the interface.

In some embodiments, at least one surface (or any portion thereof) in an electrochemical device may have (or be coated or retrofitted with) a LIS. In some embodiments, a non-wetting lubricant phase may be used to avoid infiltration into a porous component or membrane of the device. In some embodiments, a current collector of the device is selected to be non-wetting. In some embodiments, a membrane covers the current collector. In some embodiments, the membrane is filled with the working solvent (e.g., TEG-DME, which is not used as an impregnating liquid lubricant in this embodiment). In some embodiments, the LIS, which comprises the impregnating liquid lubricant, is provided before the current collector. In some embodiments, the impregnating liquid lubricant is selected such that it does not spread out of the LIS and cannot and get into the membrane on the current collector, which would prevent it from working properly, which is undesirable. In some embodiments, the impregnating liquid lubricant is KRYTOX® 1506 (a fluorinated ether). In some embodiments, the impregnating liquid lubricant (e.g., KRYTOX® 1506) is impregnated into a porous TEFLON® membrane (e.g., having a pore size of about 0.2 μm).

Flow Battery

In some embodiments, the electrochemical device is a flow battery. In certain embodiment, a flow cathode is a solution and/or suspension of lithium polysulfide $Li_xS_y$ in aqueous or non-aqueous electrolyte, and comprises a suspension of carbon black that forms a percolating network providing electronic conductivity. The non-aqueous electrolyte may, for example, be based on glymes (e.g., tetraethylene glycol dimethyl ether (TEG-DME), diglyme, dioxolane-dimethoxyethane (DOL-DME)), and may optionally include a lithium salt (e.g., Bis(trifluoromethane)sulfonimide lithium salt (LiTFSI)). A high carbon black content may be desired in some embodiments to increase the electronic conductivity of the flow cathode, but without compromising the ability of the electrode to flow.

FIG. 2 is a plot showing exemplary electrochemical impedance spectroscopy as a function of carbon black (Ketjenblack, KB) loading, in accordance with certain embodiments of the present invention. The suspension tested to construe the chart shown in FIG. 2 included carbon black and an electrolyte (tetraethylene glycol dimethyl ether (TEG-DME), 0.5M bis(trifluoromethane)sulfonimide lithium salt (LiTFSI) and 1 wt % $LiNO_3$). The measurements were conducted with a Swagelok cell with two parallel plates of 1.59 mm.

As seen, for example, in FIG. 2, the charge transfer resistance of a lithium half-cell may decrease with increasing amount of carbon black in the suspension. However, as the concentration of carbon black increases, the viscosity of the suspension also increases, and at sufficiently high concentrations (e.g., carbon black loadings greater than or equal to (≥) about 0.15 vol %, 0.2 vol %, 0.3 vol %, 0.4 vol %, 0.45 vol %, 0.5 vol %), the flow cathode becomes a yield-stress fluid. In some embodiments, a carbon network percolates at a carbon black volume fraction of 0.15 vol %. Typically, any suspension with carbon black loading of 0.15 vol % or greater may exhibit a yield-stress. For example, TEG-DME exhibits a yield-stress of 0.2 Pa when loaded with 0.25 vol % carbon black. Yield-stress is typically not a linear function with carbon black loading. For example, TEG-DME loaded with 0.75 vol % carbon black has a yield-stress of 4 Pa, while TEG-DME loaded with 1.5 vol % carbon black has a yield-stress of about 42 Pa. Yield-stress fluids create difficulties in using such flow electrodes in flow batteries. In some embodiments, use of LISs enables overcoming these difficulties as these surfaces enable flow of yield-stress fluids along the LISs. In some embodiments, yield-stress fluids flow along the surfaces of the flow batteries such that the interior surfaces of the flow batteries that are in contact with the yield-stress fluids are substantially free from residue left by the yield-stress fluids along the path of flow of the yield-stress fluids. In some embodiments, no residue of the yield-stress fluids is left along their path of flow. In some embodiments, the yield-stress fluids flow along the surfaces of the flow batteries solely due to gravity (e.g., without requiring an application of an additional force, e.g., without requiring shaking or otherwise agitating the yield-stress fluids).

Gravity Induced Flow Cell ("GIF Cell")

In some embodiments, the electrode flows along a LIS surface under the influence of gravity (e.g., a gravity-induced flow cell, or GIF cell, as described in U.S. Patent Application 61/911,101, filed on Dec. 3, 2013, which is incorporated herein by reference in its entirety). In some embodiments, the electrode of a GIF cell flows along a LIS surface solely due to gravitational forces (e.g., without requiring any agitation or other forces in order for the electrode to move along the surface).

In some embodiments, the GIF cell includes first and second reservoirs having a selected volume containing a flowable redox electrode. In some embodiments, a membrane is provided separating charged and discharged material. In some embodiments, the flow cell includes an energy-extraction region including electronically conductive current collectors through or adjacent to which the flowable redox electrodes flow and to which charge transfer occurs. In some embodiments, the current collector is a plate including channels to direct flow and/or to increase surface area, a porous electronically conductive material, or a percolating network of conductor particles or fibers that flows with the electrode. In some embodiments, structure is provided for altering orientation of the flow cell with respect to gravity whereby gravity induces flow of the redox electrodes between the first and second reservoirs. In some embodiments, the GIF cell includes a motor for varying the angle of the cell with respect to gravity. In some embodiments, the energy extraction region has a volume and ratio of the volume of the energy-extraction region to reservoir volume is selected to be in the range of about 1 to about 1000.

In some embodiments, a stationary current collector includes carbon. In some embodiments, the carbon is selected from the group consisting of glassy carbon, disordered carbon, graphite, and nanoparticulate carbon including fullerenes, carbon nanofibers, and carbon nanotubes, graphene, and graphene oxide. In some embodiments, the carbon may be in the form of a carbon plate, plate with nonplanar surface features including channels, compacted fibers, woven fibers, paper, or 3D reticulated foam. In some embodiments, a stationary current collector may be a carbon coating on a support or substrate comprising an insulating or conductive material.

In some embodiments, the stationary current collector is a metal or metal alloy such as aluminum, copper, nickel, and stainless steel. In some embodiments, the metal or metal alloy may be in the form of a metal plate, plate with nonplanar surface features including channels, compacted metal fibers, woven metal fibers, 3D reticulated metal foam. In some embodiments, a stationary current collector may be a metal or metal alloy coating on a support substrate comprising an insulating or conductive material.

In some embodiments, the stationary current collector is a metal oxide, including, for example, an electronically conductive metal oxide such as indium-tin-oxide (ITO), titanium, oxide with an oxygen/titanium atomic ratio less than 2, vanadium oxide with oxygen/vanadium atomic ratio less than about 2.5, ruthenium oxide, a transition metal oxide, a perovskite oxide, a spinel oxide including but not limited to spinels containing the transition metals Fe. Co, Mn and Ni, and mixtures and doped variants of such oxides including those doped to impart n-type or p-type electronic conductivity. The metal oxide may be in the form of a metal oxide plate, plate with nonplanar surface features including channels, metal fibers, or porous sintered metal oxide. In some embodiments, a stationary current collector may be a metal oxide coating on a support or substrate comprising an insulating or conductive material.

In some embodiments, the electroactive phase of (e.g., of a GIF cell) is a redox electrode. In some embodiments, the redox electrode is a suspension. In some embodiments, the suspension includes conductor particles and active material particles. In some embodiments, due to the existence of a percolating electronically conductive network in such suspensions, the percolating network itself acts as an extended, mobile current collector allowing electrochemical reaction to take place throughout the volume of the flow electrode. In some embodiments, active materials suspensions include those described in U.S. Pat. No. 8,722,227, which is incorporated herein by reference in its entirety. In some embodiments, the flowable redox electrode is a metal sulfide composition described in PCT/US2014/014681, which is incorporated herein by reference in its entirety. In some embodiments, the flowable redox electrode working ion is an alkali ion selected from the group consisting of $Li^+$, $Na^+$, $K^+$, and $Cs^+$. In some embodiments, the working ion is a trivalent ion of aluminum or yttrium. In some embodiments, the reservoirs and/or the energy-extraction region includes a LIS surface, as discussed herein.

In some embodiments, the electroactive phase includes water as a solvent. In some embodiments, the electroactive phase is non-aqueous. In some embodiments, the electroactive phase is a suspension including conductor particles. In some embodiments, the suspension includes an electronically percolating network, which includes solids (e.g., carbons, metal oxides, metals, and metal alloys). In some embodiments, the suspension is electronically conductive. In some embodiments, the suspension is a mixed electronic-ionic conductor.

FIGS. 3A and 3B show a schematic of a battery 300 (GIF cell). A flow electrode 302 (e.g., the cathode when the counter electrode is a stationary electrode (e.g., a Li metal electrode)) may be stored in a top compartment 312 of the battery 300. By tilting the device 300 at an angle α (310), as shown in FIG. 3B, the flow electrode 302 may move from the top compartment 312 to a lower compartment 314 due to gravity (e.g., solely due to gravity, e.g., without requiring the application of additional force(s) to enable flow of the flow electrode 302). Charging and discharging of the flow electrode 302 may be carried out in the electrochemical-active region (e.g., in between the current collectors 304). As shown in FIGS. 3A and 3B, the battery includes a current collector 304 that is in contact with a layer of lithium 306. The layer of lithium 306 is in contact with a separator 308. In some embodiments, electronically conductive flow electrodes can be used in this device (e.g., device 300). For example, carbon black may be included in the electroactive phase (e.g., flow electrode 302). In some embodiments, an increased content of carbon black may increase electronic conductivity. However, in conventional GIF cells, the maximum carbon black content (e.g., about 0.5 vol % or lower) is typically determined by flowability (e.g., viscosity, yield stress of the flowing phase) with the given gravitational force. In conventional systems, an amount of carbon black higher than 0.5 vol % typically results in pinning of the electroactive phase to the surface. A LIS may enable an electroactive phase with higher carbon content (e.g., for example, but not limited to, higher than 0.5 vol %, up to about 1 vol % or higher than 1 vol %) to slip in GIF cells, since the yield stress need not be overcome for flow to occur. This is particularly true of flow battery designs where the cross-sectional dimensions of the flow channels are substantially constant. In some embodiments, the use of LIS surfaces allows electroactive phases (e.g., suspensions) with any amount of carbon black loading to be used (e.g., there is no upper limit of yield-stress).

In some embodiments, once a flow electrode overcomes a required yield stress by gravitational force, it may pass through the electroactive zone of the flow battery (i.e., the stack) rapidly (e.g., flow quickly). Once the flow electrode overcomes the required yield stress and starts moving, due to its high flow rate, it may not have sufficient time at the electroactive zone to produce desired current rates, which is undesirable in some embodiments. In some embodiments, the use of LISs enables precise control of flow rates of the flow electrode, resulting in high electrochemical utilization of the flow electrodes and high round-trip energy efficiency of the flow battery. In some embodiments, the use of the LISs enables control of flow rates of the flow electrode such that the flow electrode to be charged or discharged has sufficient time at the electroactive zone to produce desired current rates. For example, the speed at which the flow electrode moves may be controlled by the viscosity of the impregnating liquid. For example, in some embodiments, the use of impregnating liquids with higher viscosity results in slowing down the speed of the flow of the electroactive phase. In some embodiments, the use of the LISs enables control of flow trajectories of the flow electrode.

For example, in some embodiments, the flow electrode flows from a first position (e.g., top compartment) to a second position (e.g. bottom compartment), passing through an electroactive zone (e.g., middle compartment located between the top compartment and the bottom compartment) along its path of flow. In some embodiments, the use of LISs allows for the flow electrode to flow (or slip) at a first velocity from the first position to the electroactive zone. In some embodiments, the use of LISs allows for the flow electrode to flow (or slip) at a second velocity through the electroactive zone, e.g., where the second velocity is slower than the first velocity (so that, e.g., the flow electrode spends sufficient time in the electroactive zone). In some embodiments, the flow electrode stops (e.g., has no velocity) in at least a portion of the electroactive zone. In some embodiments, the flow electrode has a third velocity from the electroactive zone to the second position (e.g., where the third velocity is the same as or different than the first velocity).

Figure 4:
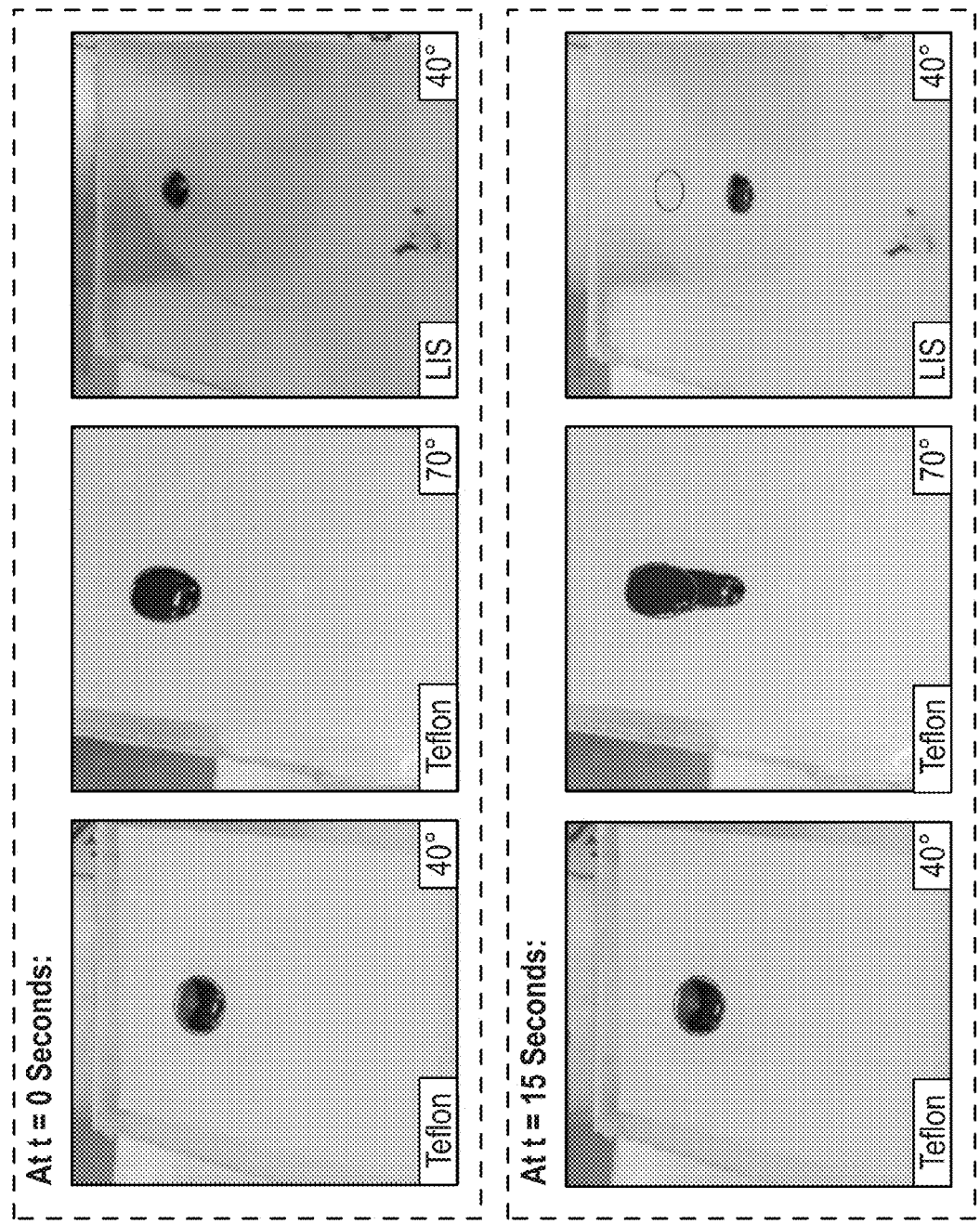
FIG. 4 illustrates the behavior of droplets of an exemplary flow electrode (cathode) on different surfaces, at different tilting angles α, at different time periods (α=40° on a TEFLON® (a polytetrafluoroethylene) surface in the left portion of FIG. 4; α=70° on TEFLON® surface in the middle portion of FIG. 4; and α=40° on a LIS in the right portion of FIG. 4), in accordance with certain embodiments of the present invention.

FIG. 4 illustrates the behavior of droplets of an exemplary flow electrode (cathode) on different surfaces, at different tilting angles α, at different time periods. In FIG. 4, α=40° on Teflon surface in the left portion of FIG. 4; α=70° on TEFLON® surface in the middle portion of FIG. 4; and α=40° on a LIS in the right portion of FIG. 4. A non-stick surface (e.g., TEFLON®) is used in the leftmost and middle experimental setups, and is found to increase droplet slip compared to the underlying ABS-like plastic. The top row of FIG. 4 (left, right, and middle) shows a droplet composed of 0.75 vol % carbon black (Ketjenblack EC-600JD, Akzo Nobel) dispersed in 0.5 M LiTFSI, 1 wt % of $LiNO_3$ and 2.5 M $Li_2S_8$ (molarity with respect to sulfur) in TEG-DME. The droplet is composed of fluid that is a yield-stress fluid, where the yield stress is estimated to be 5 Pa (e.g., about the yield stress of ordinary ketchup). The circles around the black droplets in the top row of FIG. 4 indicate where the drops were initially deposited (at t=0 seconds). The bottom row of FIG. 4 shows the motion of the droplets after t=15 seconds. On a smooth TEFLON® surface at a 40° incline, the droplet did not move at all (the droplet is stuck (pinned) to the surface), as shown in the bottom left portion of FIG. 4. On the same surface inclined to 70°, the droplet also exhibits contact line pinning: while the front of the droplet moved, the droplet left a trail of wetted surface where the droplet was in contact with the TEFLON® surface (e.g., after 15 seconds, a significant amount of the droplet remained in the same position as it was at t=0), as shown in the bottom middle portion of FIG. 4. On the LIS surface inclined at 40°, the droplet of the flow electrode (cathode) moved in the direction of the tilting angle α and left no fluid behind (e.g., left no fluid along its path of flow), as shown in the bottom right portion of FIG. 4. In FIG. 4 (right), the LIS was a porous TEFLON® membrane (pore size of 0.2 μm, Sterlitech) impregnated with silicone oil.

As shown in FIG. 4 (rightmost), the LIS coated surface allows the flow electrode droplet to move under gravitational force without leaving any residue along the flow electrode path of flow when the tilting angle α=40°. The LIS exhibits markedly improved slip as compared to the TEFLON® surface without a LIS.

In some embodiments, when the flow electrode (cathode) moves from a first location to a second location along its path of flow, the first location from which the flow electrode (cathode) moves is free of flow electrode (cathode) residue (e.g., the path of flow is clean, the flow electrode (cathode) does not smear or smudge along its path of flow as shown, for example, in the right portion of FIG. 4). In some embodiments, when the flow electrode (cathode) moves from a first location to a second location along its path of flow, the first location from which the flow electrode (cathode) moves is essentially free of flow electrode (cathode) (e.g., where less than 10%, less than 7.5%, less than 5%, less than 2.5%, less than 1%, less than 0.5%, less than 0.1%, less than 0.01%, less than 0.001% by weight of the flow electrode (cathode) remains in the first location).

Thus, LISs allow flow electrodes with yield-stresses (e.g., yield stresses above 5 Pa, 5 Pa-20 Pa, 10 Pa-30 Pa, 20 Pa-40 Pa, 25 Pa-50 Pa, up to 50 Pa, 60 Pa, 50 Pa-100 Pa, 75 Pa-150 Pa, 100 Pa-250 Pa, 200 Pa-450 Pa, 400 Pa-650 Pa, 500 Pa-800 Pa, 750 Pa-900 Pa, 850 Pa-1.25 kPa, 1 kPa-1.5 kPa, 1.25 kPa-1.75 kPa, 1.5 kPa-2 kPa, 1.75 kPa-2 kPa, etc. (e.g., with appropriate geometry of the cell design)) to be used and improves the performance of cells using such electrodes, for example, by lowering the pressure required to pump the fluid, or allowing controlled flow in a passively driven flow battery, one example of which is a GIF cell.

Advantages of Using LISs in Electrochemical Applications

In some embodiments, a LIS allows most of the flow electrode (e.g., more than 75%, more than 80%, more than 90%, more than 95%, more than 97%, more than 98%, more than 99%, more than 99.5%, more than 99.9%) to pass through the electroactive region rather than being left on the interior walls of the tank and/or the reservoir. In other words, in some embodiments, a LIS allows the flow electrode to flow without leaving a residue along its path of flow. In some embodiments, the path of flow of the flow electrode is substantially free from residue (e.g., less than 10%, less than 5%, less than 3%, less than 2%, less than 1%, less than 0.5%, less than 0.1%, less than 0.01%, less than 0.001% of residue of the flow electrode (calculated based on the total amount of the flow electrode flowing along the path of flow) remains along the path of flow of the flow electrode). In some embodiments, LISs help in preventing flow instabilities (e.g., viscous fingering or cavitation forming bubbles within the flow compartment) that can block the flow. For example, in some embodiments, the use of LISs reduces the occurrence of flow instabilities, e.g., that occur as a result friction (shear stress), at the surface, and thus reduces viscous fingering or cavitation forming bubbles.

Figure 5:
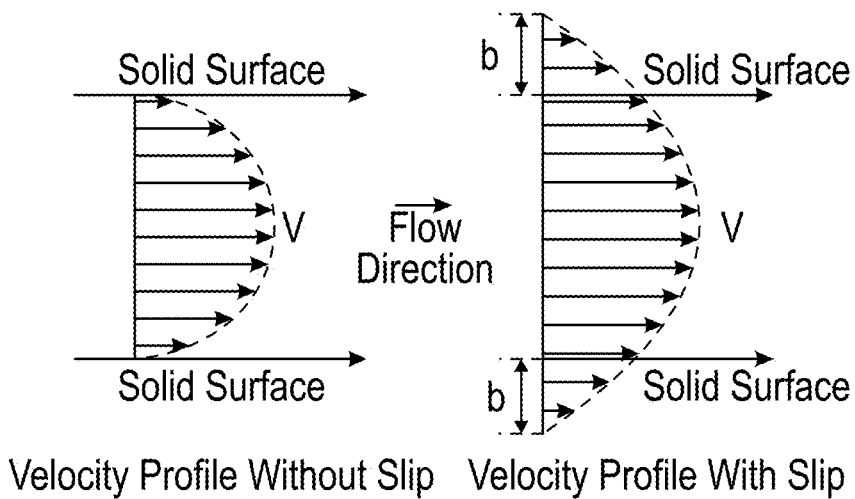
FIG. 5 illustrates schematics of velocity profiles without boundary slip (left side) and with slip (right side), in accordance with certain embodiments of the present invention. As shown, for example, in FIG. 5, a LIS introduces slip boundary conditions, which results in significant changes in the velocity profile.
Figure 6A:
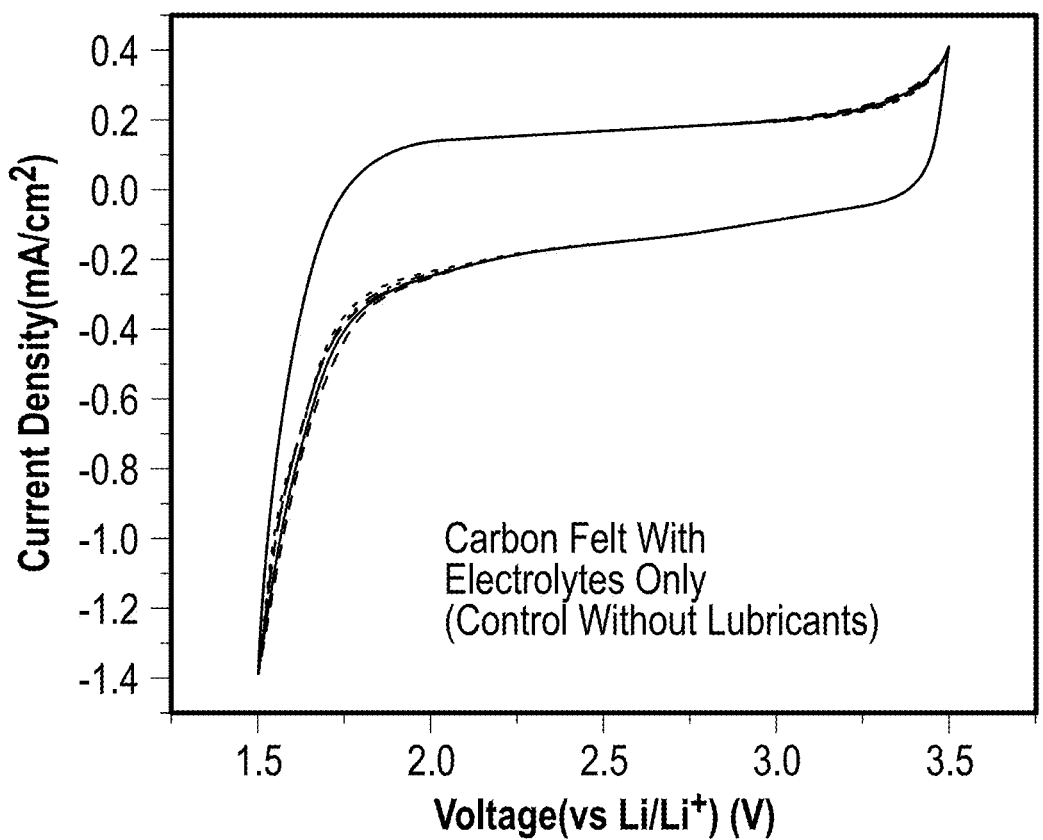
FIGS. 6A-6F show cyclic voltogramms (current density at the working electrode (y-axis) versus applied voltage (x-axis)) for various surfaces, in accordance with certain embodiments of the present invention.
Figure 6B:
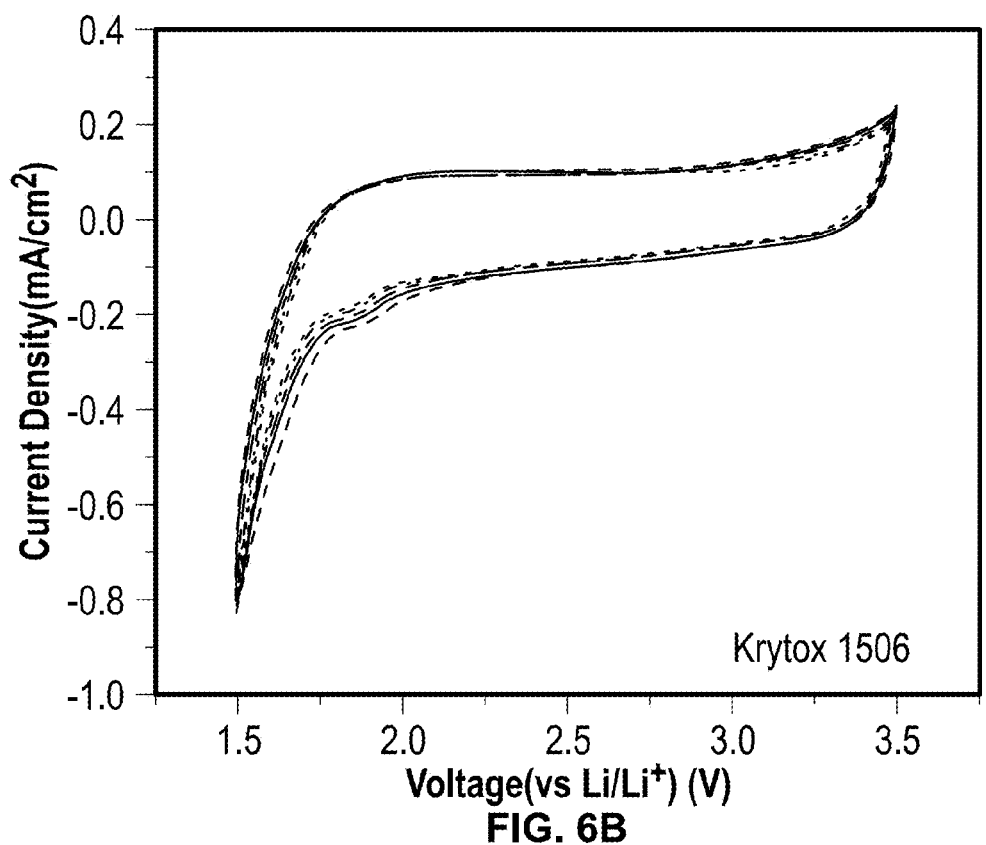
Figure 6C:
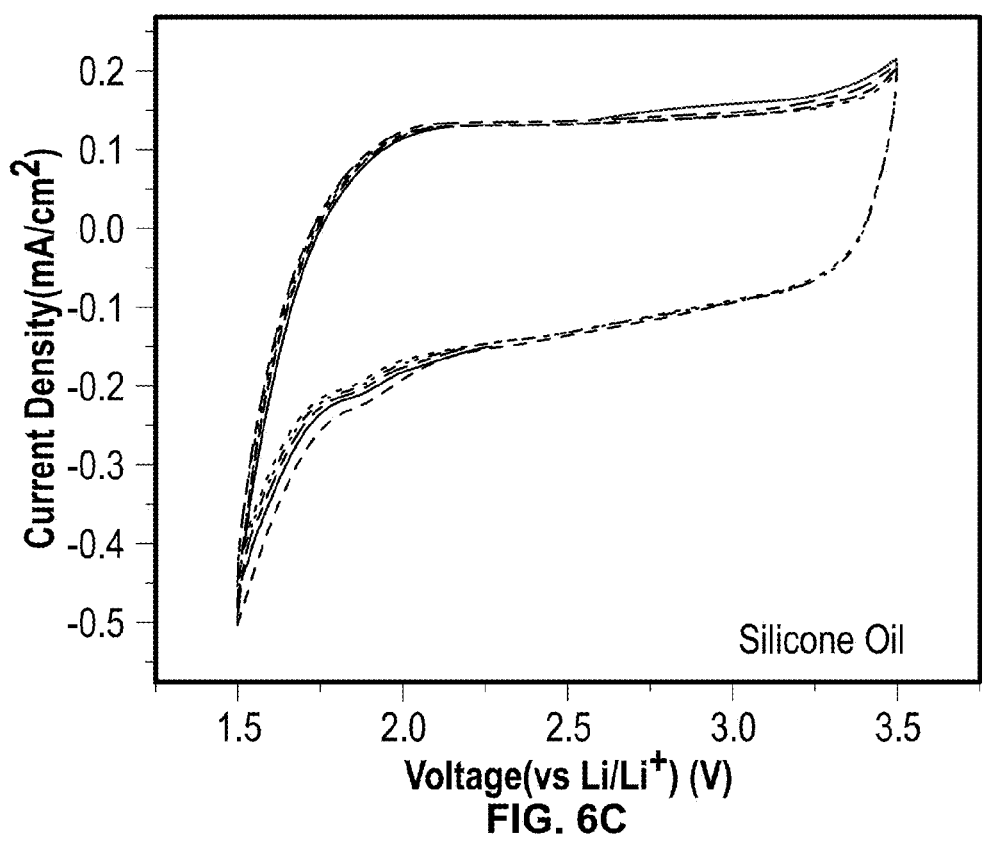
Figure 6D:
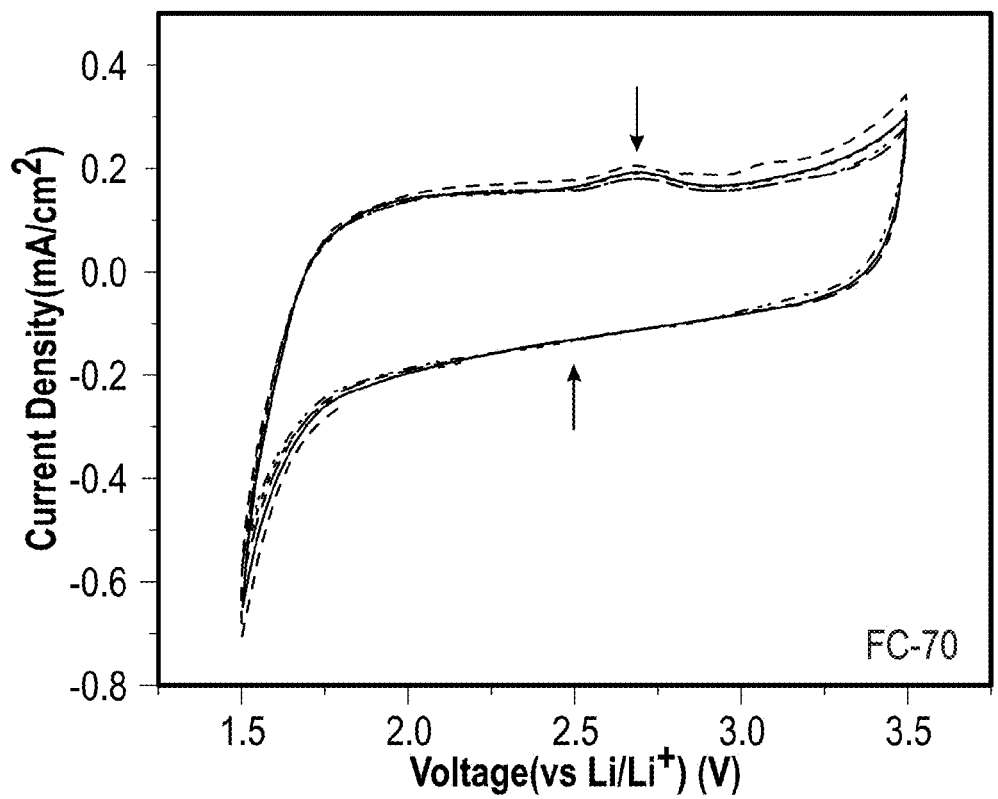
Figure 6E:
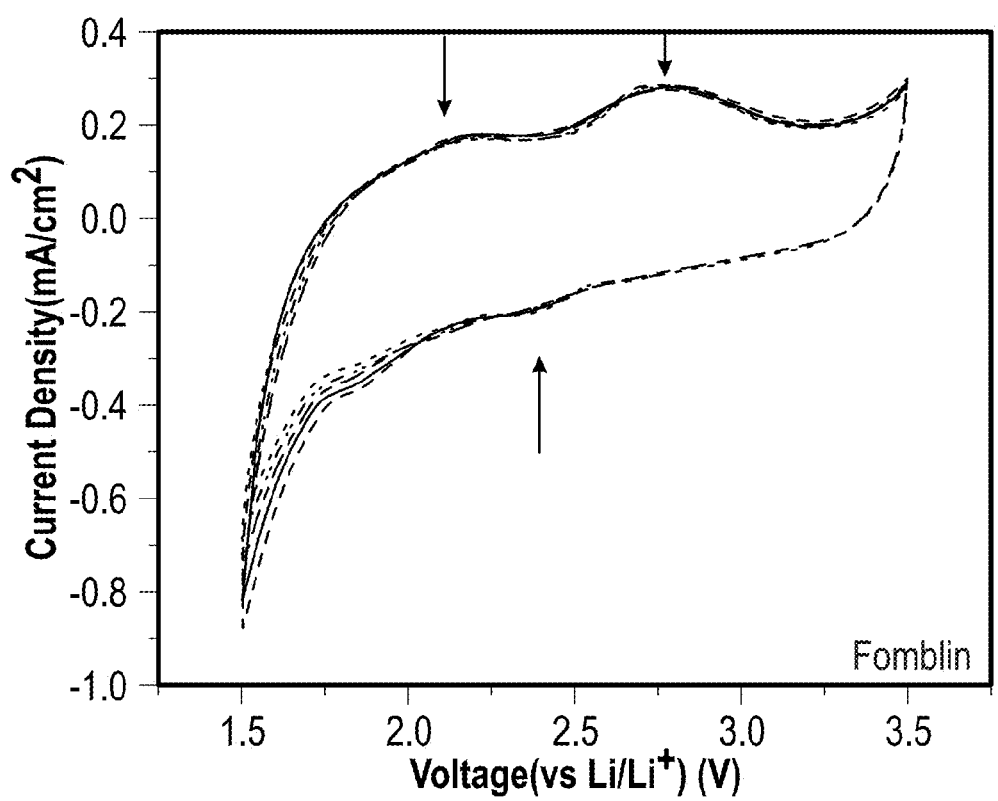
Figure 6F:
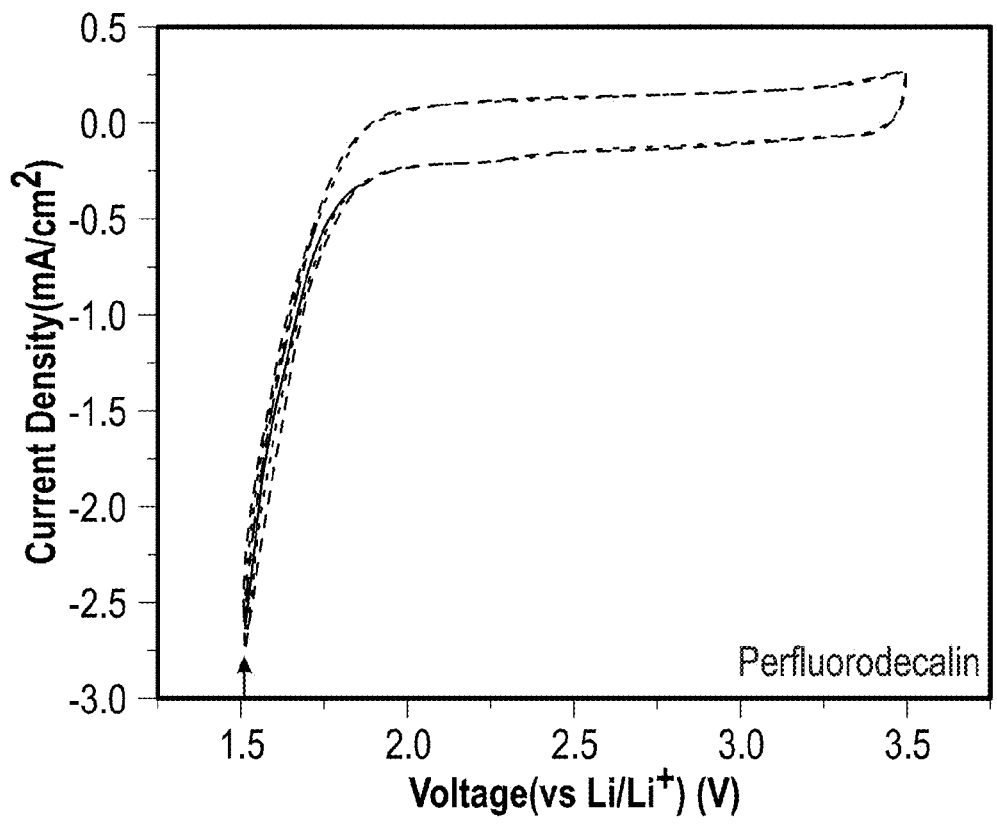

In some embodiments, a LIS surface introduces slip when a flowing fluid contacts the walls. As shown in FIG. 5, the slip surface changes the shape of the velocity profile, closer to plug flow (e.g., velocity at interface≈velocity at center of the flow) than non-slip flow (e.g., velocity at interface<<velocity at center of the flow). As shown by computational modeling in "Maximizing Energetic Efficiency in Flow Batteries Utilizing Non-Newtonian Fluids," by Kyle C. Smith, W. Craig Carter and Y.-M. Chiang, *J. Electrochem. Soc.*, 161 (4) pp. A486-A496 (2014), 8 plug flow changes the dynamics of charge transfer during the electrochemical reaction and leads to higher energy efficiency.

In some embodiments, slip may reduce shearing in the fluid. The rate of shear in the fluid is related to the derivative of the velocity. As shown in FIG. 5, a surface with slip has less shear in the bulk fluid. For a battery, shearing can result in deteriorating the electrolyte. For example, shearing in a lithium sulfide battery using carbon black may destroy the conducting network of the carbon black and make the suspension (flow cathode) less electronically conductive. A LIS may introduce slip conditions, reducing this effect.

Use of LIS Provides Benefits During Manufacturing of Non-Flow Electrochemical Devices The advantages of using LISs are not limited to flow-based devices (e.g., flow batteries, flow capacitors, or fuel cells). In some embodiments, electrode cavities in stationary or non-flow electrochemical devices may be filled with a flowable electrode during the manufacturing processes (e.g., as described in Y.-M. Chiang, W. C. Carter, P. Limthongkul, R. Bazzarella, M. Duduta, J. Disko, J. Cross, *Semi-Solid Filled Battery and Method of Manufacture*, Int'l Patent Application WO2012088442A2, published Jun. 28, 2012, which is incorporated herein by reference in its entirety). As fluid flow is used primarily for the manufacturing process, a LIS can enhance manufacturability by lowering the required pressure to initiate flow (e.g., to overcome a yield stress or to achieve steady state flow with a highly viscous electrode suspension or paste), by improving the uniformity of filling the electrode cavity, and/or by increasing the dimensions or aspect ratio (e.g., length or width relative to thickness) of the electrode that can be practically manufactured.

Controlling Phase Transitions/Deposition

Controlling Precipitate Formation

In some electrochemical systems, including, but not limited to storage batteries and capacitors, the electrochemical reaction involves a reacting material that is soluble at certain states of charge of the device, but insoluble at other states of charge, or under different operating conditions, such as, for example, at different temperatures.

Lithium sulfur batteries are one example of such a device where the reactive material undergoes solubility changes during operation. Discharging a sulfur-based battery involves the chemical transformation of S to $Li_2S$. The sulfur positive electrode is present as solid sulfur in some Li—S batteries, and as solubilized polysulfide species in other types of Li—S batteries. Intermediate polysulfides such as, for example, $Li_2S_8$, $Li_2S_6$, $Li_2S_4$, $Li_2S_2$ are typically formed during the electrochemical cycling process. In commonly used solvents (for example, in TEG-DME), only $Li_2S_8$ and $Li_2S_6$ species are soluble while $Li_2S$ is not soluble and precipitates from the solution. If the non-soluble material precipitates on the current collector during discharge, electron transfer to and from the precipitate may subsequently occur, allowing reversible precipitation and dissolution and providing reversible storage capacity to the battery. However, the precipitating material can also deposit on internal surfaces of the electrochemical systems (e.g., batteries) that are not in contact with the current collectors, especially as its solubility limit is exceeded. Surfaces that act as heterogeneous nucleation sites for the precipitating reaction product may be deposition sites where the precipitate is electronically isolated from the current collectors. In this instance, the precipitate cannot be re-dissolved upon charge, and the charge storage capacity of the isolated precipitate material becomes effectively lost, which is undesirable. The stored capacity and energy of the battery may thereby be degraded as the battery is cycled and increasing amounts of precipitate (e.g., $Li_2S$) are electrically isolated.

In some embodiments, LISs can be used to prevent undesirable capacity loss due to precipitation of insoluble materials discussed above. In some conventional systems, a loss of 5-80% (e.g., 5-15%, 10-25%, 20-35%, 30-45%, 40-60%, 45-65%, 50-70%, 65%-80%, 75%-80% of capacity over 100 cycles as a result of precipitation of insoluble materials is observed. In some embodiments, the use of LISs provides a significant reduction in undesirable capacity loss due to the precipitation of insoluble materials (e.g., $Li_2S$). As discussed above, a LIS provides a liquid interface between the electroactive phase and the underlying surface of the electrochemical device (e.g., battery). As such, the LIS interface is extremely smooth (e.g., in some embodiments, the tops of the solid features are coated with a thin layer of lubricant), and, in addition, has a lower interfacial energy than most solid surfaces, and therefore, is a less potent heterogeneous nucleation site than typical solid-liquid interfaces within electrochemical devices. In other words, the adhesion strength between the LIS and the precipitate is lower than the adhesion strength between a solid surface and precipitate. In some embodiments, the tops of the solid features are not coated with a thin layer of lubricant. As such, in some embodiments, LISs are used to inhibit nucleation of precipitate formed in electrochemical systems, e.g., in some embodiments, LISs are used to inhibit scale formation, acting as an "antifouling coating." In some embodiments, LISs are used to inhibit nucleation of precipitate formed in the electrochemical active region (e.g., where the transformation from soluble $Li_2S_6$ to $Li_2S$ results in insoluble species forming), where the LIS prevents the insoluble species (e.g., $Li_2S$) from sticking to the current collector. In some embodiments, the nucleation/precipitation may occur in the bulk fluid rather than on the surface, which is typically not concerning because in such a case, the precipitate is not lost by adhering to the surfaces away from the current collector. In some embodiments, the desired reactions for charging or discharging may be enhanced, as nucleation/precipitation is less advantageous. Inhibiting/preventing the precipitation and adherence of reacting material (such as insoluble lithium sulfide species) to the electroactive region surface(s) is beneficial to the reversibility and energy density of a storage battery, and is an extension of the antifouling function. Undesirable precipitation (and resulting adherence of insoluble species to surface(s) of the electrochemically active region) from solution can also occur in other electrochemical systems such as capacitors and fuel cells. In some embodiments, LISs are used to inhibit/prevent adherence of insoluble lithium sulfide species to electroactive surfaces in capacitors and fuel cells.

In some embodiments, the use of LISs mitigates the effects of undesirable precipitation from solution in various electrochemical systems. In some embodiments, the use of LISs mitigates the effects of undesirable precipitation from solution in various electrochemical systems by maintaining the reversibility of the electrochemical device (e.g., battery) by, for example, inhibiting/preventing adhesion of insoluble species to surface(s) of electroactive region(s). In some embodiments, the use of LISs mitigates the effects of undesirable precipitation from solution in various electrochemical systems by maintaining the energy density of the electrochemical device (e.g., battery, capacitor, flow cell, etc.).

Delaying Freezing

In some embodiments, the use of LISs prevents the formation of ice for similar reasons as discussed above in relation to precipitation: the LIS is a less energetically favorable nucleation site than other types of surfaces. In electrochemical systems that use a liquid electrolyte, freezing of the electrolyte can cause (and often does cause) its ionic conductivity to be greatly decreased, amongst other possible detrimental effects such as mechanical damage from crystallization. In some embodiments, the use of a LIS extends the operating temperature range of an electrochemical device to lower temperatures compared to the same system without a LIS. With the use of a LIS, in some embodiments, electrochemical systems can be undercooled further below the freezing point of the liquid electrolyte before crystallization occurs.

In some embodiments, the electrolyte includes a lithium-containing salt. In some embodiments, a reduction in temperature can result in crystallization of the lithium-containing salt. In some conventional systems, the presence of a rough surface increases the amount of nuclei sites that encourage the crystallization of the salts. In some embodiments, LISs do not allow these nuclei sites to form and thus prevents crystallization of lithium-containing salts (and other similar electrolyte components), which in turn extends the operating temperature range of the battery.

Material Considerations for Designing and Selecting LIS

Various criteria affect the stability of LISs in electrochemical systems. As discussed above, in some embodiments, electrochemical systems (or portions or surfaces thereof) come into contact with highly viscous and/or yield stress fluids, which present particular challenges, as such fluids do not easily move along surfaces. In some embodiments, at least one of the criteria below, or a combination of different criteria below, or all the criteria below are considered and/or optimized in selecting a lubricant to be used in an electrochemical system.

Thermodynamic stability. In some embodiments, it is very important that the electrolyte, electrode, or electrochemical fuel does not displace the lubricant from the textured surface. In some embodiments, in order to form a LIS, a lubricant may be impregnated within surface textures and/or features spontaneously. The requirements for this process are outlined in FIG. 1C (e.g., in some embodiments, the system is designed such that either state W2 or W3 is achieved). In the design of electrochemical systems discussed herein, when referring to the table in FIG. 1C, the water phase (w) is the flow electrode. The surface tension of the lubricant, the surface tension of the textured surface, and the roughness of the textured surface may determine the stability of the lubricant in the textured surface. Various parameters affecting stability of the lubricant are discussed, for example, in International Application Publication No. WO 2014/078867, filed on Nov. 19, 2013. In some embodiments, a combination of the following features may be desired: a low surface tension lubricant (e.g., lower than about 50 mN/m), a low surface tension solid (e.g., lower than about 50 mN/m), and a high roughness solid may be desired. In some embodiments, the solid features of the surface have a surface roughness>50 nm, >100 nm, or <1 µm. In some embodiments, roughness of the surface provides or enables stable impregnation of the lubricant therebetween or therewithin. In some embodiments, roughness of the surface provides or enables stable impregnation of the lubricant therebetween or therewithin, such that $\theta_{os(v),receding} < \theta_c$, where $\theta_c$ is critical contact angle.

Immiscibility. In some embodiments, the liquid phase(s) comprising the electrolyte, electrode, or electrochemical fuel are immiscible or substantially immiscible with the lubricant so that a well-defined lubricant/electrolyte interface is produced. In some embodiments, immiscibility also prevents the lubricant phase from contaminating the electrochemically active phase(s). For example, in some embodiments, lithium sulfide flow batteries may use polar, aprotic solvents such as TEG-DME, diglyme, or dioxolane-dimethoxyethane (DOL-DME); in such instances, the lubricant is chosen such that it is immiscible with such solvents. In some embodiments, the electrolyte or electrode or electrochemical fuel is aqueous in nature; in such instances, the lubricant is chosen such that it is immiscible with aqueous solutions or suspensions.

In some embodiments, the choice of the lubricant (lubricating liquid) is contingent upon the material properties of the electroactive phase. In some embodiments, desirable traits of the lubricant with respect to the electroactive phase include immiscibility or partial miscibility (<5% of its weight), non-reactiveness, and/or a lower surface tension (than the electroactive phase) (e.g., to form a stable system). In certain embodiments, a higher surface tension (than the electroactive phase) is preferred. In certain embodiments, the partial miscibility of the lubricant with the electroactive phase results in a change of surface tension of the electroactive phase such that the spreading coefficient, S, of the lubricant on the electroactive phase becomes negative and thereby the electroactive phase does not spread over the primary phase, where S is defined according the following Equation $(S=\gamma_{wa}-\gamma_{oa}-\gamma_{ow})$.

Some examples of such lubricants whose spreading coefficient changes upon partial miscibility and which can be used as lubricants with respect to an electroactive phase include 1,1-diphenyl-ethane, benzene, ionic liquid (e.g., 1-butyl-3-methylimidazolium bis(trifluoromethylsulfonyl) imide), etc. In some embodiments, the lubricant is partially miscible with the electroactive phase and the partial miscibility changes the spreading coefficient of the lubricant on the electroactive phase, such that the electroactive phase flows along the surface of the LIS without getting cloaked by the lubricant.

Electrochemical Stability. In some embodiments, the lubricant itself, as well as mixtures of the lubricant and the working fluid of an electrochemical device, are stable over the electrochemical window of the device. Electrochemical devices are typically designed to operate over a certain voltage on the basis of the activity and stability of the components within. For example, in some embodiments, a lithium sulfur battery may operate over a window of about 1.6 V to 2.2 V with respect to Li/Li$^+$. In some embodiments, a lithium ion battery may operate over a window of about 1.5V to 4.25V. In some embodiments, the lubricant phase of the LIS, any mixtures produced upon combining the lubricant with the working fluids of the electrochemical device, and any reaction products produced between the lubricant or texture material and all other components of the electrochemical device (e.g., flow cell) are electrochemically stable over the operating voltage window. In some embodiments, immiscible fluids may have some mutual solubility. For example, although water and hexadecane are considered insoluble, about 100 ppm of hexadecane dissolves in water. In some embodiments, even trace levels, if electrochemically active, can disrupt the functioning of the electrochemical system. In some embodiments, "side reactions" that result in parasitic current flow are such that they have negligible current over the voltage window compared to the desired electrochemical reactions (which is achieved by, e.g., proper selection of the lubricant). In some embodiments, the lubricant is selected such that it does not contribute a side reaction rate in excess of about 1% of the total reaction rate, the two rates being measured on the basis of the current produced, to be considered electrochemically active.

Tuning the Transport Properties of LISs

In some embodiments, a LIS structure comprising a substrate, solid textures/features and a lubricant is applied to internal surfaces (or part(s) or portion(s) thereof) of an electrochemical device. For example, in some embodiments, a LIS is incorporated in the walls of a flow battery or fuel cell tank, flow battery or fuel cell stack, pipes, channels, cavities, manifolds, valves, seals, pumps or any other internal surface(s).

In some embodiments, a LIS is designed and selected to provide desired electronic or ionic or diffusional transport properties (or any combination of these properties, as needed). In some embodiments, a LIS is insulating, electronically conductive, ionically conductive, mixed ionically and electronically-conducting, semi-conducting, a diffusion barrier, and/or a diffusion-enhancing medium (or a combination thereof). In some embodiments, transport properties of the LIS are tuned according to the needs of a particular component of an electrochemical device.

In some embodiments, an electronically conductive LIS may be used on the current collectors of a stationary battery, flow battery, or fuel cell. In some embodiments, the electronically conductive LIS is made by using an electronically conductive material (e.g., conductive particles such as carbon black) as the solid texture material, and/or by using an electronically conductive suspension or polymer solution as the lubricant.

In some embodiments, an ionically conductive LIS is used on a separator structure or other cell parts by incorporating a solid ionic conductor (e.g., an ion-conducting glass, crystal, or polymer) as a textured surface, or by using an ionically conductive liquid (e.g., an electrolyte) as the lubricant phase.

In some embodiments, an insulating LIS is used to prevent unwanted precipitation of electrochemical reaction products.

In some embodiments, a diffusion barrier LIS may be used to prevent corrosion of system components. In some embodiments, the electrochemical device is a flow battery. In some embodiments, the flow battery includes organic solvent(s) in the flowable electrode. In conventional systems, organic solvent(s) can corrode stainless steel tanks or pipes (or other system components). Similarly, in conventional systems, organic liquids (e.g., acids) in flow batteries can also corrode the stainless steel tanks or pipes (or other system components). In addition, in conventional systems such as pouch cells, the organic solvent used in liquid electrolyte can corrode the materials that are used to seal the cell. In some embodiments, the use of a diffusion barrier LIS can be used to inhibit/prevent corrosion of system components (e.g., caused by organic solvents, acids, etc.).

Selectively Lubricated Surfaces

In some embodiments, an electrochemical device includes at least one surface within the device that has slipperiness and at least one surface that does not have slipperiness. Some embodiments discussed herein relate to methods for producing selectively lubricated surfaces (e.g., where at least a portion of the surface has slipperiness and at least a portion of the surface does not have slipperiness) on electrochemical devices (e.g., on internal surfaces thereof). In some embodiments, it is desirable to have surfaces that are lubricated on certain portions/surfaces of the device and to avoid lubrication or to have a lesser degree of lubrication on other surfaces within the same electrochemical device.

In some embodiments, it is desirable to have selectively lubricated surfaces for electrochemical cells. In some embodiments, the electrochemical cells for which it is desirable to have selectively lubricated surfaces include gravity-induced flow cell (GIF cell) devices. In some embodiments, GIF cell devices are designed such that the walls of the flow cell are slippery (e.g., include a LIS) but the current collectors are not slippery (e.g., do not include a LIS), in order to maintain a low resistance to electronic charge transfer and/or a surface having a high exchange current density.

In some embodiments, a silicone oil lubricant (10 cSt oil) is designed such that it does not spread from a textured LIS surface and does not infiltrate a porous polymer separator of a battery (which could potentially prevent ion transport across the membrane). In some embodiments, a lubricant is selected such that it does not spread from a textured LIS surface and does not coat the metal current collectors.

In some embodiments, when a liquid droplet is placed on a smooth surface of a certain chemistry, the droplet makes a contact angle θ. When the contact angle is zero, the liquid spreads on the surface. In some embodiments, even if a contact angle of liquid is greater than zero (e.g., non-spreading on the flat surface), the liquid may spread over a surface that is not smooth. This is referred to as hemi-wicking A liquid may hemi-wick across a surface when its contact angle on a chemically identical smooth surface θ is less than critical contact angle, $\theta_c = \cos^{-1}[(1-\varphi)/(r-\varphi)]$. Here, and as discussed above, φ is the fraction of the projected area of the textured surface that is occupied by a solid (the solid fraction) and r is the ratio of total surface area of the textured surface to its projected area. For example, in some embodiments, surfaces non-wetting to particular liquids have low surface energy and are sufficiently flat. In some embodiments, surfaces in an electrochemical device that are desirable to be maintained free of lubricant have a contact angle greater than or equal to the critical contact angle $\theta_c$.

In some embodiments, the lubricant film encapsulating the texture is stable only if it wets the texture completely (θ=0), otherwise portions of the textures dewet and emerge from the lubricant film. In some embodiments, complete encapsulation of the texture is desirable in order to eliminate pinning. In some embodiments, texture geometry and hierarchical features can be exploited to reduce the emergent areas and achieve roll-off angles close to those obtained with fully wetting lubricants. In some embodiments, additional parameters, such as droplet and texture size, as well as the substrate tilt angle, may be modeled to achieve desired droplet (and/or other substance) movement (e.g., rolling) properties and/or to deliver optimal non-wetting properties.

Electrochemical Devices

In some embodiments, the electrochemical device is a flow battery (or redox flow battery).

Figure 10:
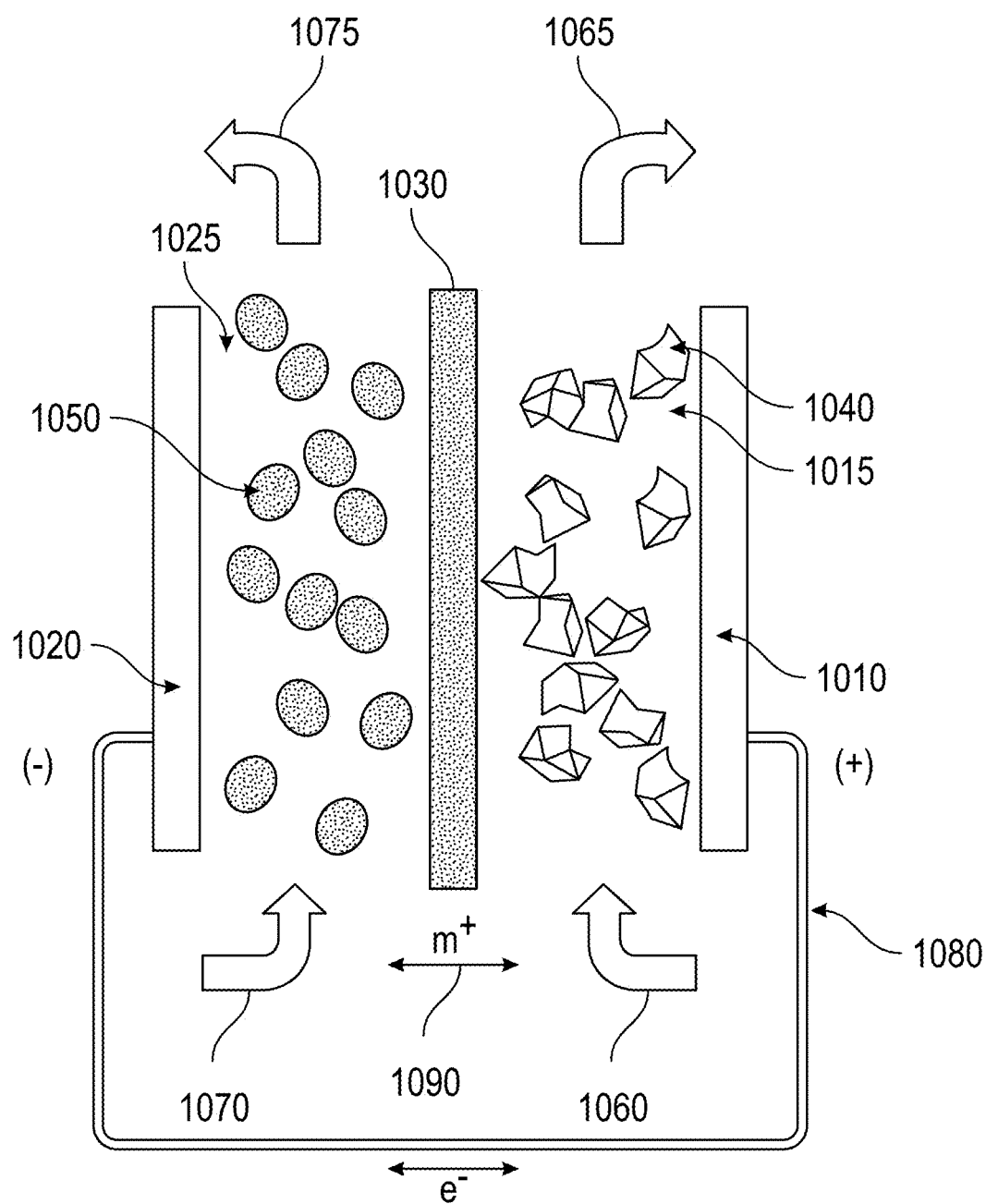
FIG. 10 s a cross-sectional illustration of a redox flow battery, in accordance with certain embodiments of the present invention.

An exemplary redox flow energy storage device is illustrated in FIG. 10. Redox flow energy storage device may include a positive electrode current collector 1010 and a negative electrode current collector 1020, separated by an ion permeable separator 1030. Current collectors 1010, 1020 may be in the form of a thin sheet and are spaced apart from separator 1030. In some embodiments, the current collector 1010 (or a part or portion thereof) includes or is coated with a LIS, as discussed above. In some embodiments, the current collector 1020 (or a part or portion thereof) includes or is coated with a LIS, as discussed above. Positive electrode current collector 1010 and ion permeable separator 1030 define an area, 1015, herein after referred to as the "positive electroactive zone" that accommodates the positive flowable electrode active material 1040. In some embodiments, the ion permeable separator 1030 includes or is coated with a LIS (e.g., on either side or on both sides of the ion permeable separator 1030). In some embodiments, a LIS is incorporated into the ion permeable separator 1030. In some embodiments, a LIS is incorporated into the ion permeable separator 1030 (e.g., wherein the ion permeable separator 1030 is an ion selective membrane), wherein the lubricating liquid is ionically conductive. Negative electrode current collector 1020 and ion permeable separator 1030 define an area, 1025, herein after referred to as the "negative electroactive zone" that accommodates the negative flowable electrode active material 1050. The electrode-active materials can be flowable redox compositions and can be transported to and from the electroactive zone at which the electrochemical reaction occurs. The flowable redox composition can include a semi-solid or a condensed liquid ion-storing electroactive material, and optionally a fluid for supporting or suspending the solid or condensed ion-storing liquid electrolyte. As used herein, semi-solid refers to a mixture of liquid and solid phases, such as a slurry, particle suspension, colloidal suspension, emulsion, or micelle. In some embodiments, the emulsion or micelle in a semi-solid includes a solid in at least one of the liquid-containing phases. As used herein, condensed liquid or condensed ion-storing liquid refers to a liquid that is not merely a solvent as it is in the case of an aqueous flow cell catholyte or anolyte, but rather that the liquid is itself redox-active. The liquid form can also be diluted by or mixed with another, non-redox-active liquid that is a diluent or solvent, including mixing with such a diluents to form a lower-melting liquid phase, emulsion or micelles including the ion-storing liquid.

The positive electrode flowable material 1040 can enter the positive electroactive zone 1015 in the direction indicated by arrow 1060. Positive electrode material 1040 can flow through the electroactive zone and exit at the upper location of the electroactive zone in the direction indicated by arrow 1065. Similarly, the negative electrode flowable material 1050 can enter the negative electroactive zone 1025 in the direction indicated by arrow 1070. Negative electrode material 1050 can flow through the electroactive zone and exits at the upper location of the electroactive zone in the direction indicated by arrow 1075. The direction of flow can be reversed, for example, when alternating between charging and discharging operations. It is noted that the illustration of the direction of flow is arbitrary in FIG. 10. Flow can be continuous or intermittent. In some embodiments, the positive and negative redox flow materials are stored in a storage zone or tank (not shown) prior to use. In some embodiments, the flowable redox electrode materials can be continuously renewed and replaced from the storage zones, thus generating an energy storage system with very high energy capacity. In some embodiments, a transporting device is used to introduce positive and negative ion-storing electroactive materials into the positive and negative electroactive zones, respectively. In some embodiments, a transporting device is used to transport depleted positive and negative ion-storing electroactive materials out of the positive and negative electroactive zones, respectively, and into storage tanks for depleted electroactive materials for recharging. In some embodiments, the transporting device can be a pump or any other conventional device for fluid transport. In some specific embodiments, the transporting device is a peristaltic pump.

During operation, the positive and negative electroactive materials can undergo reduction and oxidation. Ions 1090 can move across ion permeable membrane 1030 and electrons can flow through an external circuit 1080 to generate current. In a typical flow battery, the redox-active ions or ion complexes undergo oxidation or reduction when they are in close proximity to or in contact with a current collector that typically does not itself undergo redox activity. Such a current collector may be made of carbon or nonreactive metal, for example. Thus, the reaction rate of the redox active species can be determined by the rate with which the species are brought close enough to the current collector to be in electrical communication, as well as the rate of the redox reaction once it is in electrical communication with the current collector. In some instances, the transport of ions across the ionically conducting membrane may rate-limit the cell reaction. Thus the rate of charge or discharge of the flow battery, or the power to energy ratio, may be relatively low. The number of battery cells or total area of the separators or electroactive zones and composition and flow rates of the flowable redox compositions can be varied to provide sufficient power for any given application.

Figure 11:
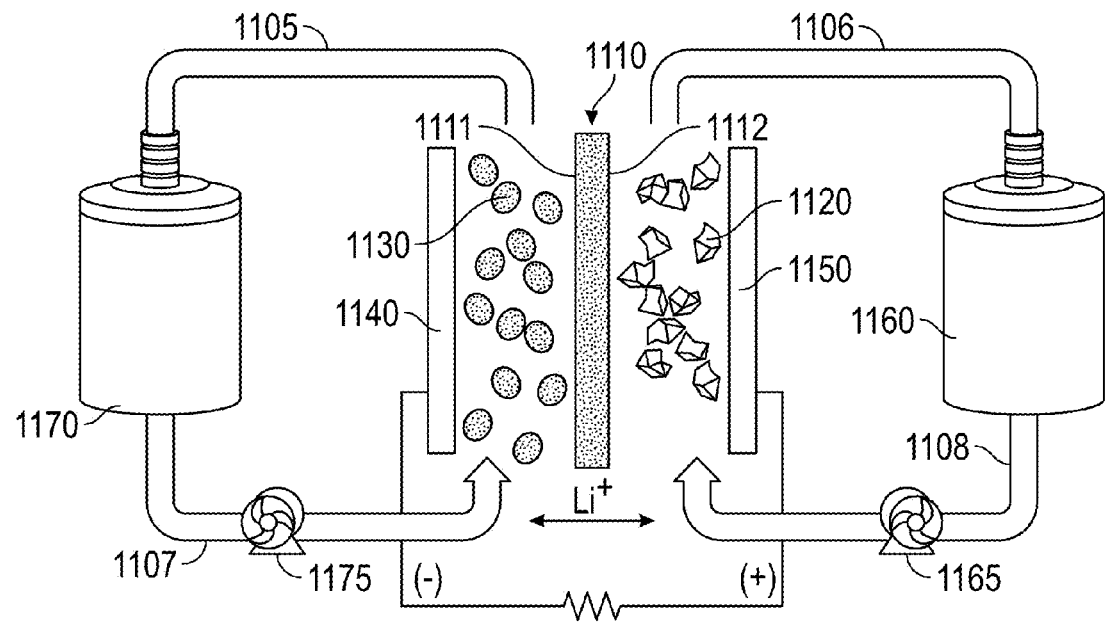
FIG. 11 is a schematic illustration of an exemplary redox flow cell for a lithium battery system, in accordance with certain embodiments of the present invention.

An exemplary redox flow cell for a lithium battery (e.g., semi-solid lithium redox flow battery) is shown in FIG. 11. In this example, the membrane 1110 can be a microporous membrane such as a polymer separator film (e.g., Celgard™ 2400) that prevents cathode particles 1120 and anode particles 1130 from crossing the membrane, or can be a solid nonporous film of a lithium ion conductor. The negative and positive electrode current collectors 1140, 1150 can be made of any suitable materials and can be made of the same materials, or of different materials. In some embodiments, the negative and positive electrode current collectors are made of copper and aluminum, respectively. In some embodiments, the negative electrode composition includes a graphite or hard carbon suspension. In some embodiments, the positive electrode composition includes $LiCoO_2$ or $LiFePO_4$ as the redox active component. In some embodiments, carbon particulates are optionally added to the cathode or anode suspensions to improve the electronic conductivity of the suspensions. In some embodiments, the solvent in which the positive and negative active material particles are suspended is an alkyl carbonate mixture and includes a dissolved lithium salt such as $LiPF_6$.

In some embodiments, the current collector 1140 (or a part or portion thereof) includes or is coated with a LIS, as discussed above. In some embodiments, the current collector 1150 (or a part or portion thereof) includes or is coated with a LIS, as discussed above. In some embodiments, the membrane 1110 includes or is coated with a LIS (e.g., on either side or on both sides of the membrane 1110). In some embodiments, a LIS is incorporated into the membrane 1110. In some embodiments, a LIS is incorporated into the membrane 1110 (e.g., wherein the membrane 1110 is an ion selective membrane), wherein the lubricating liquid is ionically conductive.

In some embodiments, the positive electrode composition is stored in positive electrode storage tank 1160, and is pumped into the electroactive zone using pump 1165. In some embodiments, the negative electrode composition is stored in negative electrode storage tank 1170, and is pumped into the electroactive zone using pump 1175. In some embodiments, at least a portion (or all) of the interior surface of at least one storage tank 1160 and/or 1170 is coated with or includes a LIS. In some embodiments, the interior walls of at least one storage tank 1160 and/or 1170 are coated with or include a LIS. In some embodiments, piping 1105, 1106, 1107, and 1108 connects the tanks 1160 and 1170 with the electroactive zones. In some embodiments, at least a portion of interior surface of at least one pipe 1105, 1106, 1107, and 1108 is coated with or includes a LIS. In some embodiments, the interior surface of all pipes 1105, 1106, 1107, and 1108 is coated with or includes a LIS.

In some embodiments, at least one of the positive electrode and the negative electrode includes a semi-solid or condensed liquid ion-storing redox composition. In some embodiments, the semi-solid or condensed liquid ion-storing redox composition includes a conductive additive. In some embodiments, the conductive additive is selected from the group consisting of metal carbides, metal nitrides, carbon black, graphitic carbon powder, carbon fibers, carbon microfibers, vapor-grown carbon fibers (VGCF), fullerenes, carbon nanotubes (CNTs), multiwall carbon nanotubes (MWNTs), single wall carbon nanotubes (SWNTs), graphene sheets, and materials comprising fullerenic fragments that are not predominantly a closed shell or tube of the graphene sheet, and any combination or mixture thereof.

In some embodiments, the condensed liquid ion-storing redox composition has the capability to take up or release ions. In some embodiments, the condensed liquid ion-storing redox composition remains substantially insoluble during operation of the energy storage device. In some embodiments, the semi-solid or condensed liquid ion-storing redox composition forms a continuously electronically conductive network percolative pathway to the negative current collector and/or the positive current collector. In some embodiments, the positive electrode and the negative electrode include a semi-solid or condensed liquid ion-storing redox composition.

In some embodiments, the ion storage compound stores at least one of lithium, sodium, or hydrogen (or a combination thereof).

In some embodiments, the volume percentage of the ion-storing solid phase is between 5% and 70%. In some embodiments, the volume percentage of the total solids including the conductive additive is between 10% and 75%. In some embodiments, the volume percentage of the ion-storing solid phase is between 5% and 70% and the volume percentage of the total solids including the conductive additive is between 10% and 75%.

Figure 13:
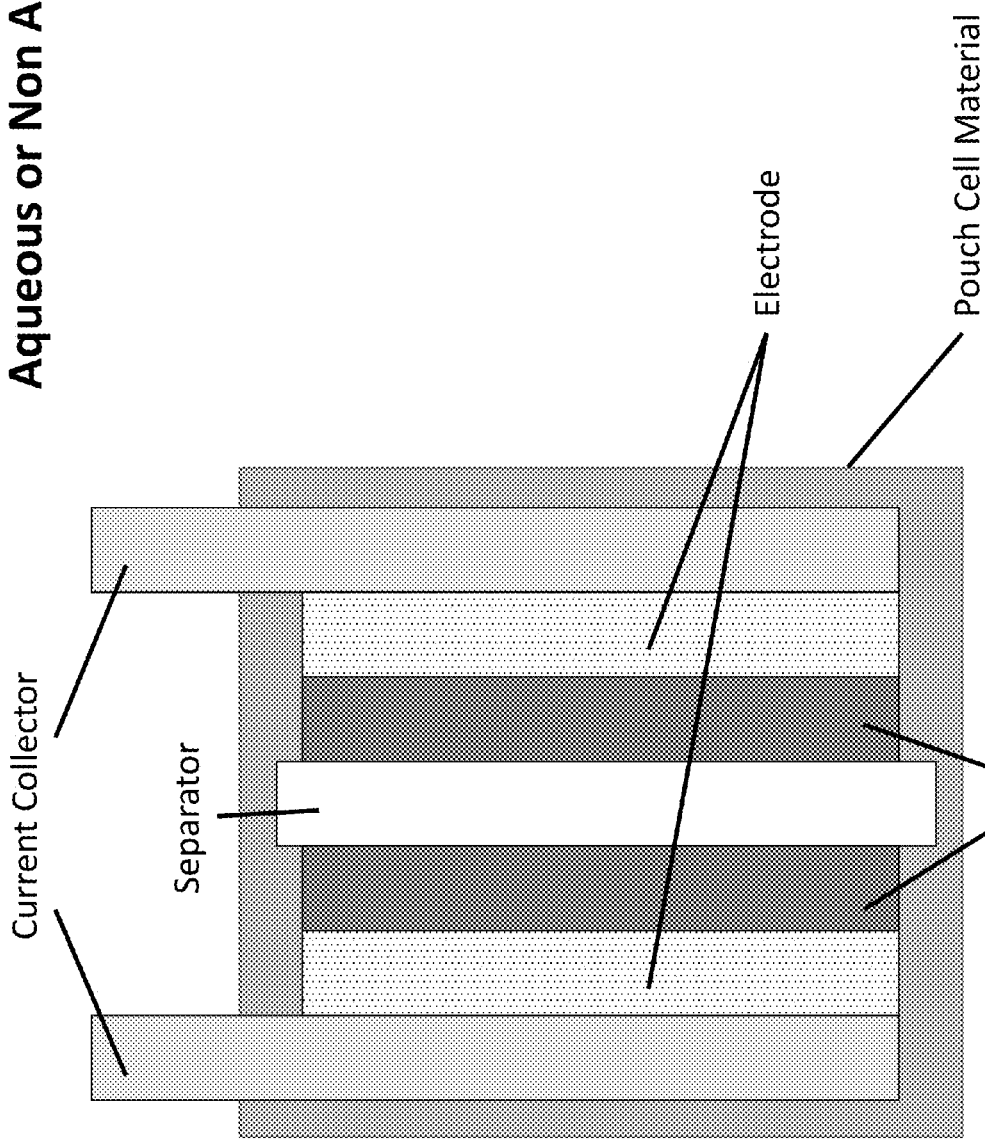
FIG. 13 is a schematic illustration of an exemplary aqueous or non-aqueous battery, in accordance with certain embodiments of the present invention.

Aqueous Batteries: In some embodiments, the electrochemical device is an aqueous electrolyte battery, for example as shown in FIG. 13. In some embodiments, the aqueous battery includes pouch cell material, two current collectors, two electrodes, two aqueous electrolytes, and a separator, arranged as shown in FIG. 13. In some embodiments, the aqueous electrolyte battery is a stationary-electrode battery or a flow battery. In some embodiments, aqueous batteries include an electrolyte or electrode or electrochemical fuel that is water-based; in such instances, the lubricant is chosen such that it is immiscible with aqueous solutions or suspensions. In some embodiments, one or more interior surfaces of said aqueous battery, including the surfaces of components such as current collectors, separators, flow channels, or the interior walls of the battery housing, include an LIS in order to serve one or more of the earlier described functions of the LIS. In some embodiments, a LIS can be applied to the separator (e.g., on either or both sides of the separator shown in FIG. 13). In some embodiments, a LIS can be applied on the inside of the pouch cell material (e.g., pouch cell material shown in FIG. 13) that is in contact with the cell material. In some embodiments, the a LIS can be applied on any surfaces of the current collector (e.g., surfaces of the current collector in contact with the electrode as shown in FIG. 13).

Non-Aqueous Batteries: In some embodiments, the electrochemical device is a non-aqueous battery, for example, as shown in FIG. 13. In some embodiments, the non-aqueous battery includes pouch cell material, two current collectors, two electrodes, two aqueous electrolytes, and a separator, arranged as shown in FIG. 13. In some embodiments, the non-aqueous battery is a stationary-electrode battery or a flow battery. In some embodiments, non-aqueous batteries include an electrolyte or electrode or electrochemical fuel that is non-aqueous in composition; in such instances, the lubricant is chosen such that it is immiscible with non-aqueous solutions or suspensions. In some embodiments, one or more interior surfaces of said non-aqueous battery, including the surfaces of components such as current collectors, separators, flow channels, or the interior walls of the battery housing, include a LIS in order to serve one or more of the earlier described functions of the LIS. In some embodiments, a LIS can be applied to the separator (e.g., on either or both sides of the separator shown in FIG. 13). In some embodiments, a LIS can be applied on the inside of the pouch cell material (e.g., pouch cell material shown in FIG. 13) that is in contact with the cell material. In some embodiments, the a LIS can be applied on any surfaces of the current collector (e.g., surfaces of the current collector in contact with the electrode as shown in FIG. 13).

Figure 14:
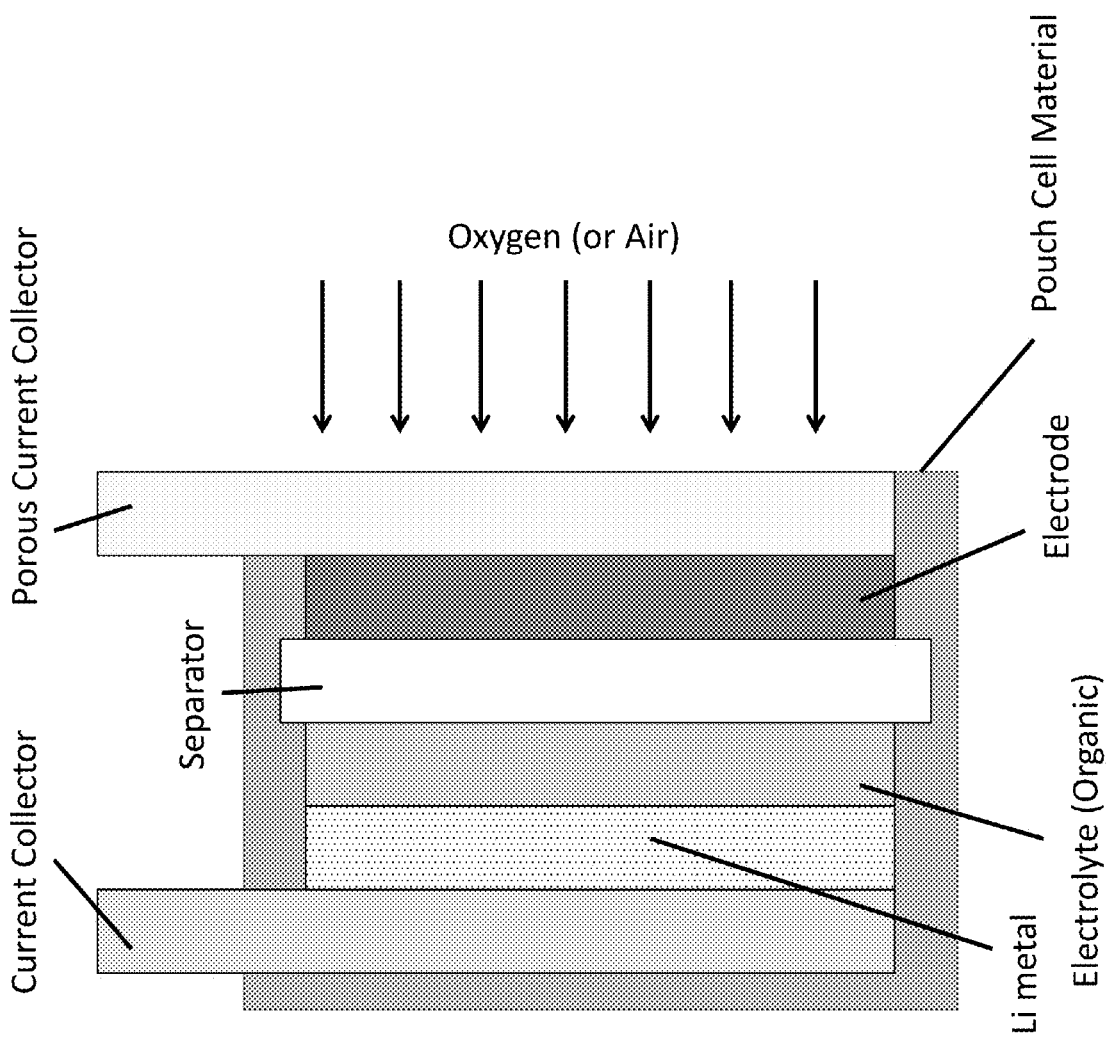
FIG. 14 is a schematic illustration of an exemplary metal-air battery, in accordance with certain embodiments of the present invention.

Metal-Air Batteries: In some embodiments, the electrochemical device is a metal-air battery comprising a metal negative electrode and an air positive electrode, as shown, for example, in FIG. 14. In some embodiments, a metal-air battery includes pouch cell material, a current collector, Li metal layer, an electrolyte (e.g., organic electrolyte), a separator, an electrode, and a porous current collector, arranged as shown, for example, in FIG. 14. In some embodiments, said metal-air battery includes an aqueous or non-aqueous electrolyte in contact with one or both electrodes. In some embodiments, during discharge of said metal air battery, an oxide, peroxide, hydroxide, or other salt of the metal is formed at the positive electrode. In some embodiments, one or more interior surfaces of said metal-air battery including the surfaces of current collectors, separators, or interior walls of the battery housing are coated with LIS in order to serve one or more of the earlier described functions of the LIS. In some embodiments, a LIS can be applied to any surface of the separator, e.g., either side of the separator, as shown, for example in FIG. 14. In some embodiments, a LIS is applied to the side of the separator that is in contact with the electrolyte, as shown, for example, in FIG. 14. In some embodiments, a LIS is applied to the side of the separator that is in contact with the electrode, as shown, for example, in FIG. 14. In some embodiments, a LIS is applied to the inside of the pouch cell material that is in contact with the cell materials. In some embodiments, a LIS is applied to the current collector. In some embodiments, a LIS is applied to or is part of the porous current collector.

Figure 15:
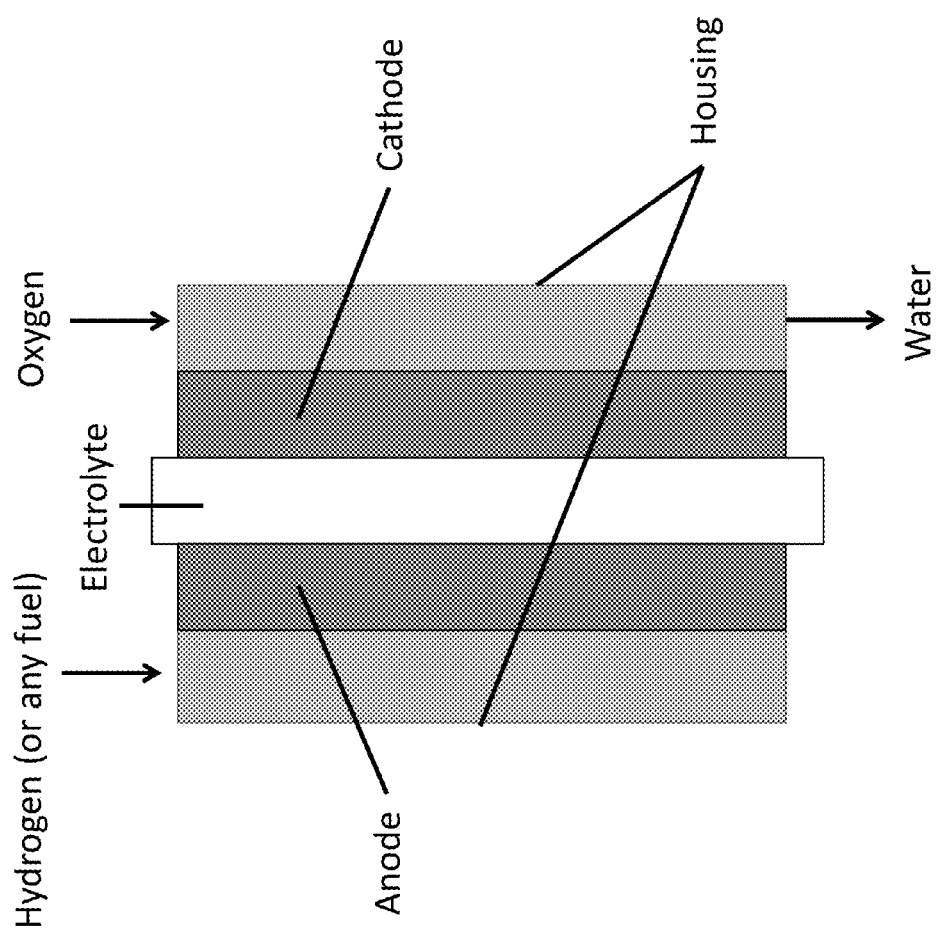
FIG. 15 is a schematic illustration of an exemplary fuel cell, in accordance with certain embodiments of the present invention.
Figure 16:
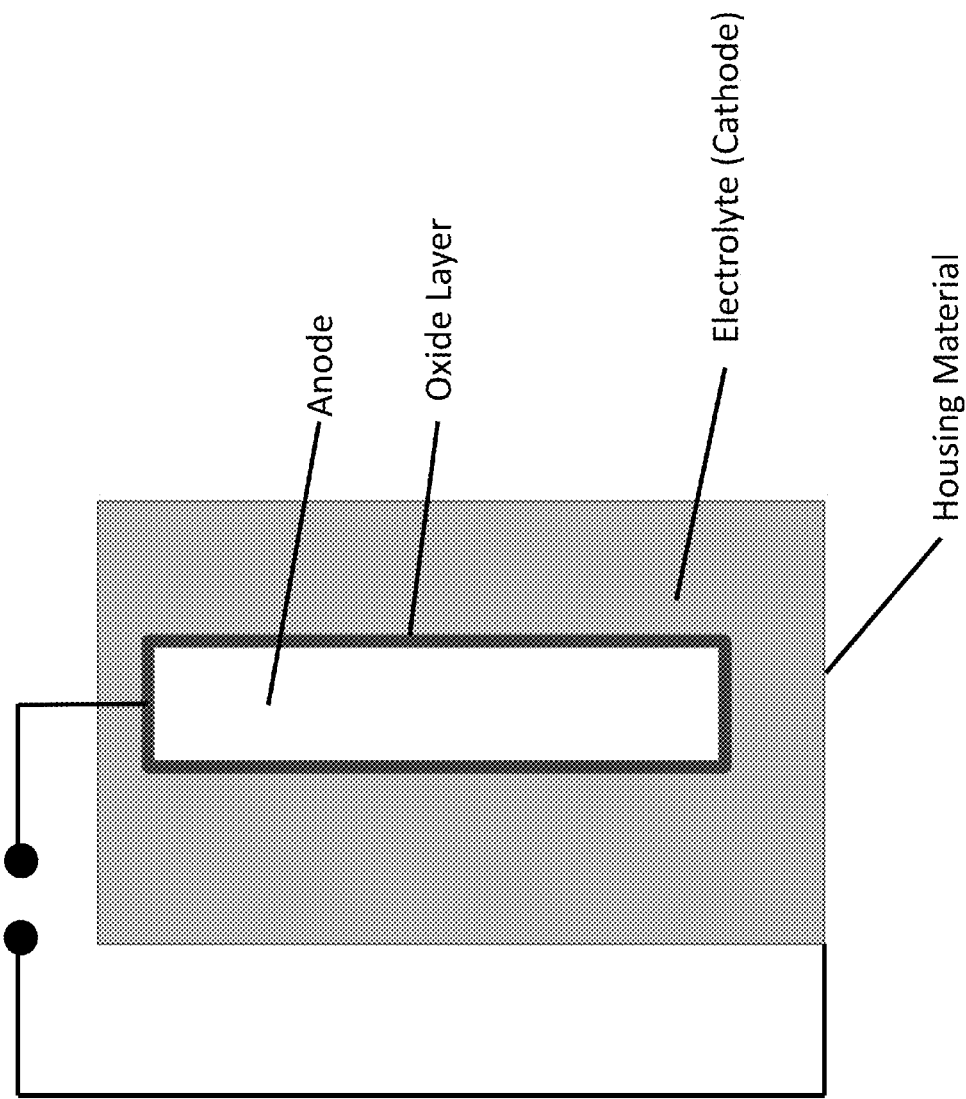
FIG. 16 is a schematic illustration of an exemplary electrolytic capacitor, in accordance with certain embodiments of the present invention.

Fuel Cells: In some embodiments, the electrochemical device is a fuel cell, in which the LIS may serve to control the behavior of a liquid component, such as the phosphoric acid electrolyte layer in a phosphoric acid fuel cell, or the condensation/nucleation of a liquid phase from a vapor phase on one or more exposed component surfaces, such as water on the exhaust side of a hydrogen fuel cell. An exemplary fuel cell is shown in FIG. 15. In some embodiments, a fuel cell includes a housing, an anode, a cathode, and an electrolyte in contact with both the anode and the cathode, as shown for example in FIG. 15. In some embodiments, a LIS can be applied to the surface of the cathode material. In some embodiments, a LIS is applied to the portion of the cathode material that is in contact with the electrolyte, as shown in FIG. 15. In some embodiments, a LIS is applied in the inside of the housing material that is in contact with water (e.g., as shown in FIG. 15) or that is in contact with another liquid or fluid, Electrolytic Capacitors: An exemplary electrolytic capacitor is shown in FIG. 16. In some embodiments, an electrolytic capacitor includes housing material, an electrolyte (e.g., cathode), an oxide layer, and anode (e.g., encapsulated by the oxide layer), arranged as shown, for example in FIG. 16. In some embodiments, a LIS is used to coat one or more internal surfaces of an electrolytic capacitor, including the current collectors, separator, or internal surfaces of the capacitor housing. In some embodiments, a LIS can be applied or coated to the inside of the housing material that is in contact with the electrolyte (e.g., cathode). Said electrolytic capacitor may utilize an aqueous electrolyte, in which case the LIS may contain a liquid that is immiscible with the aqueous electrolyte, or the electrolytic capacitor may utilize a non-aqueous electrolyte, in which case the LIS may contain a liquid immiscible with the non-aqueous electrolyte.

Figure 17:
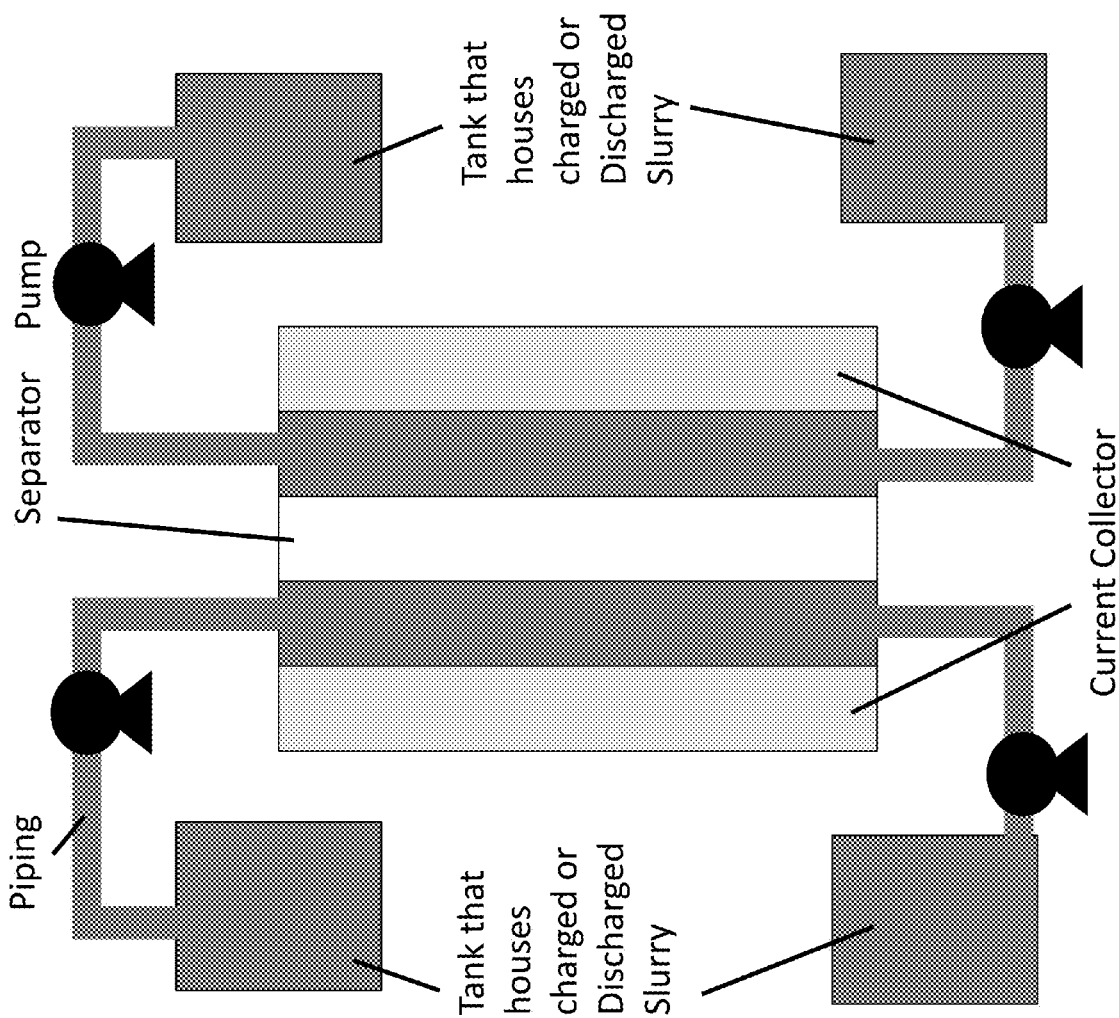
FIG. 17 is a schematic illustration of an exemplary flow capacitor, in accordance with certain embodiments of the present invention.

Flow Capacitors: In some embodiments, the flow capacitor is an electrochemical flow capacitor disclosed, for example, in PCT/US2012/024960, filed on Feb. 14, 2012, the disclosure of which is incorporated by reference herein in its entirety. An exemplary flow capacitor is shown in FIG. 17. In some embodiments, a flow capacitor includes two current collectors a separator, one or more pumps for pumping charged or discharged slurry (e.g., 4 pumps as shown in FIG. 17), one or more tanks (e.g., 4 tanks housing charged or discharged slurry as shown in FIG. 17), piping connecting the tanks to the positive or negative half cells. In some embodiments, at least one surface of at least one current collector (positive current collector and/or negative current collector) is coated with or includes a LIS. In some embodiments, uncharged slurry is stored in uncharged slurry storage tanks. In some embodiments, charged slurry is stored in charged slurry storage tanks. In some embodiments, at least a part or portion of the interior surface of at least one of the uncharged slurry and/or the charged slurry storage tanks includes or is coated with a LIS. In some embodiments, uncharged slurry is pumped from the tanks to the positive and negative half cells via uncharged slurry pipes. In some embodiments, charged slurry is pumped into the charged slurry tanks via charged slurry pipes. In some embodiments, at least a part or portion of the interior surface of the uncharged slurry and/or the charged slurry pipes is coated with or includes a LIS. In some embodiments, a separator includes or is coated with a LIS (e.g., either or both sides (or any portion thereof) of the separator shown in FIG. 17).

EXPERIMENTAL EXAMPLES

Example 1

LIS for a Lithium Polysulfide Flow Battery

This example demonstrates a lithium polysulfide flow battery with a lubricant-impregnated surface (LIS).

Lithium polysulfide solutions comprising $Li_xS_y$ compounds dissolved in non-aqueous solvents form the basis for flowable catholytes for use in stationary or flow batteries. A representative electrolyte solution was prepared using TEG-DME (≥99%, Sigma-Aldrich), 0.5 M LiTFSI salt (≥99.95%, Sigma-Aldrich), and 1 wt % $LiNO_3$ (ReagentPlus® grade, Sigma-Aldrich). The solution did not include the lithium polysulfide since in electrochemical tests of the lubricant and solvent system, it is necessary to evaluate side reaction currents without interference from the electrochemical couple. To design and select materials for the LIS, several candidate lubricants of various compositions were considered, as listed in Table 1 below.

Table 1 below illustrates compatibility of several candidate lubricants with the electrolyte solvent TEG-DME. Immiscibility was determined by vigorously shaking a 50 wt % lubricant, 50 wt % TEG-DME mixtures and observing the respective phase volumes after four hours. Thermodynamic stability (e.g., spreading coefficient) is calculated from the lubricant surface tension and estimated surface tension of the electrolyte solvent (TEG-DME). Positive values are interpreted as thermodynamically stable and negative values are interpreted as being thermodynamically unstable.

TABLE 1

| Lubricant | Type | Surface tension (mN/m) | Immiscibility | Thermo-dynamic stability (Spreading Coefficient Estimation) |
|---|---|---|---|---|
| perfluorodecalin | fluorinated oil | 19 | immiscible | 5 |
| 10 cSt silicone oil | silicone oil | 20 | slightly miscible | 4 |
| EMI-IM | ionic liquid | 42 | completely miscible | −18 |
| BMI-IM | ionic liquid | 34 | completely miscible | −10 |
| KRYTOX® 1506 | fluorinated ether | 17 | immiscible | 7 |
| FOMBLIN® | fluorinated ether | 20 | immiscible | 4 |
| Ethyl Oleate | fatty acid ester | 31 | completely miscible | −7 |
| FC-70 | fluorinated ether/alkane | 18 | immiscible | 6 |

FIG. 1C illustrates schematics of wetting configurations outside and underneath an aqueous drop (column 2). The total interface energies per unit area (column 3) are calculated for each configuration by summing the individual interfacial energy contributions. Equivalent requirements for stability of each configuration are provided in column 4.

The thermodynamically stability of each lubricant was calculated using the equations provided in FIG. 1C. A positive numerical value ($S_{ow(w)}$) predicts a lubricant to be thermodynamically stable for the electrolyte solvent TEG-DME. Values for the surface tension of TEG-DME are not readily available, but are estimated to be close to that of dimethoxyethane, which has similar chemical composition, and has a surface tension of 24 mN/m. Surface roughness effects are excluded from the calculation but can be incorporated for a more precise prediction.

The miscibility of the candidate lubricants with TEG-DME was evaluated. Immiscibility was determined by vigorously shaking a 50 wt % lubricant, 50 wt % TEG-DME mixtures and observing the respective phase volumes after four hours. Only those lubricants that were at most slightly miscible with TEG-DME, and in addition were thermodynamically stable, were considered for further evaluation. Accordingly, five of the eight candidate lubricants in Table 1 were evaluated further: perfluorodecalin, 10 cSt silicone oil, KRYTOX® 1506, FOMBLIN® (fluorinated lubricant, perfluoropolyether vacuum oil), and FC-70.

Two types of electrochemical tests were carried out to evaluate electrochemical stability in the voltage window of a lithium-sulfur battery. In each test, cyclic voltammetry was conducted in order to measure the current in a lithium half-cell containing the fluid of interest. A Swagelok cell configuration was used, in which the positive electrode (cathode) was composed of carbon felt, the lubricant, and/or electrolyte solvent (TEG-DME). The anode was lithium metal, and the separator was a Tonen membrane. In one test, the lubricant alone was used as the sole liquid phase in the cell. In the second test, mixtures of the lubricant and the electrolyte solution in the volumetric ratio of 3:1 (lubricant:electrolyte) were tested. In each case, evidence was sought for side reactions that produce current sufficiently high as to interfere with the operation or long-term life of the cell. Voltage was swept between 1.5V and 3.5V with respect to Li/Li$^+$, at a sweep rate of 10 mV/min.

Figure 7:
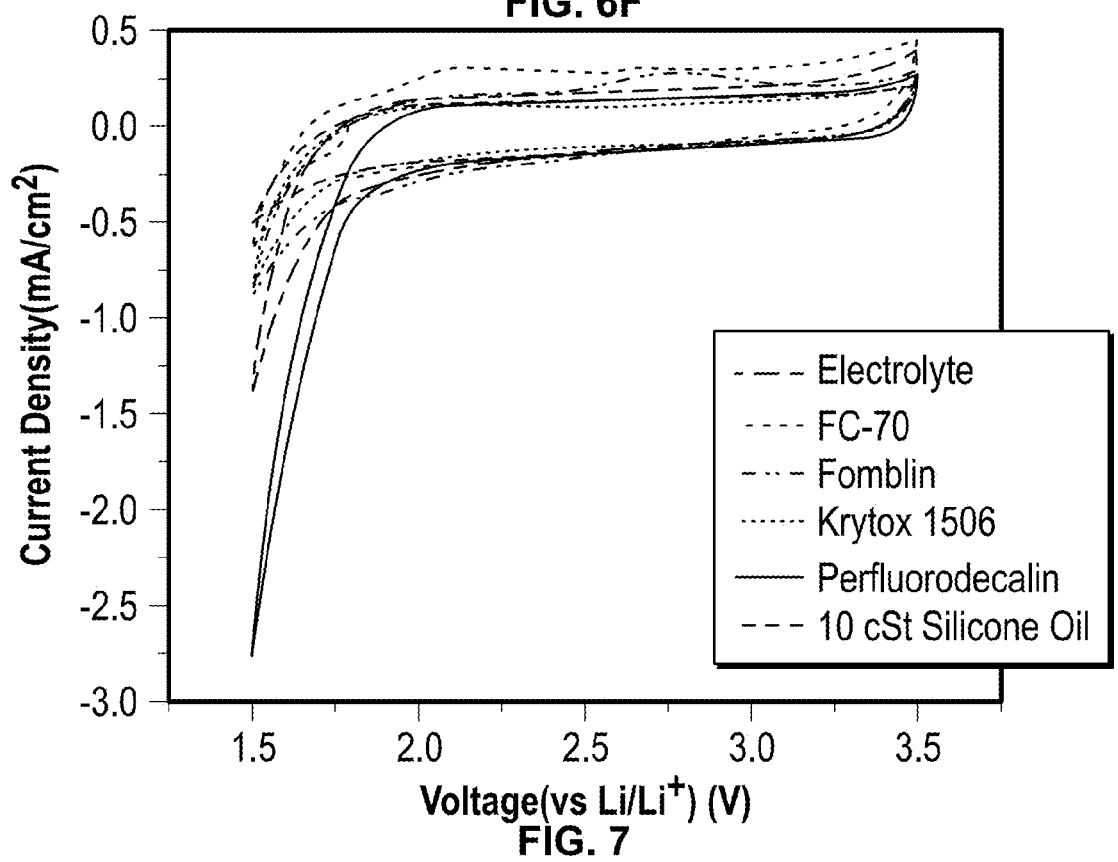
FIG. 7 shows CV of lubricants, TEG-DME (solvent) and electrolyte (TEG-DME, 0.5M LiTFSi, 1 wt % $LiNO_3$) to probe electrochemical properties of the mixture, in accordance with certain embodiments of the present invention. The tests were performed based on a Swagelok cell configuration in a horizontal manner. No carbon felt was included unless otherwise stated.

FIGS. 6A-6F show the cyclic voltammetry test results for the different lubricants. The electrolyte alone was used as a control, and evidence for additional side reaction currents was sought. The vertical scale, current density, is not the same between the different plots in FIGS. 6A-6F. FIG. 7 plots all of the curves from FIGS. 6A-6F together on the same scale.

FC-70, FOMBLIN® and perfluorodecalin all show substantial current density exceeding −0.5 mA/cm$^2$ in the voltage window tested, and these lubricants were therefore considered less desirable for some applications (although potentially still usable) compared to the silicone oil and KRYTOX® 1506.

Figure 8:
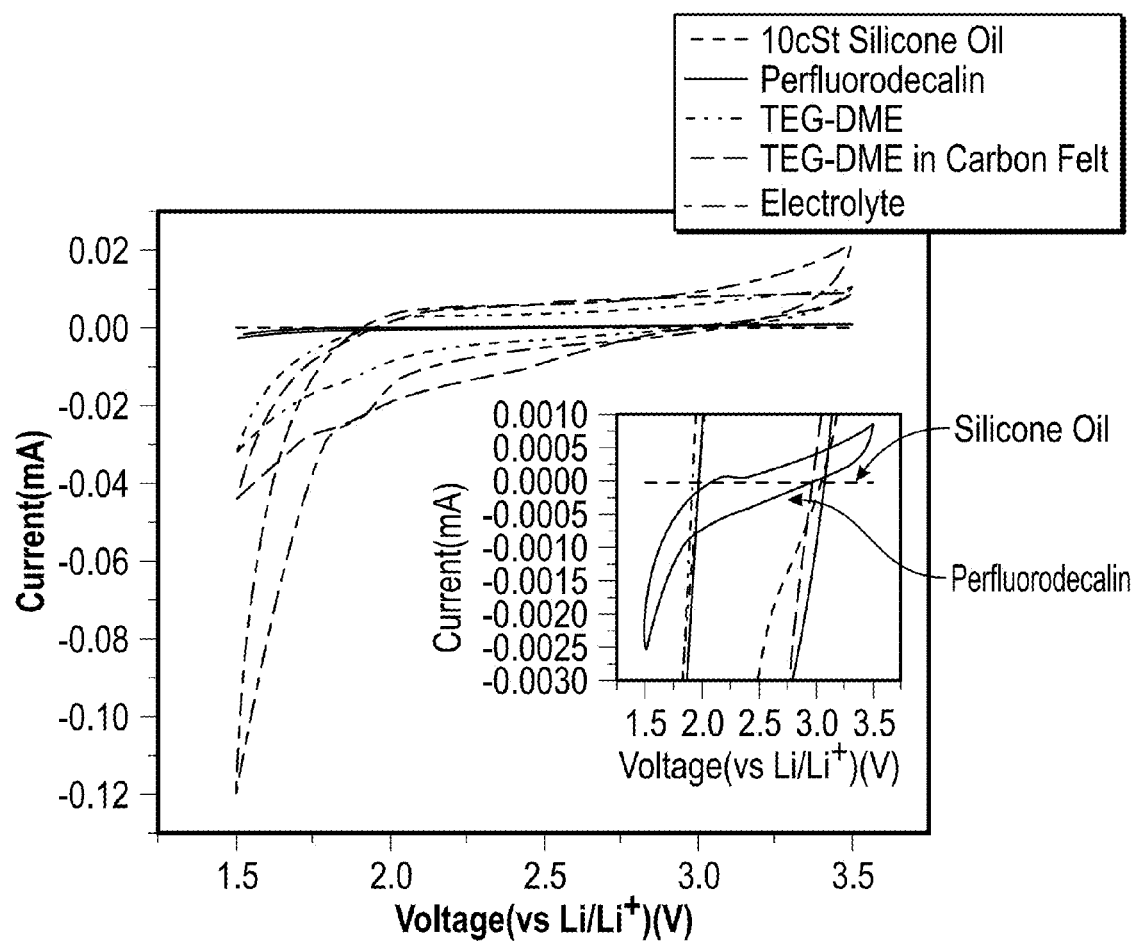
FIG. 8 depicts CV of lubricants, TEG-DME (solvent) and electrolyte (TEG-DME, 0.5M LiTFSi, 1 wt % $LiNO_3$) to probe electrochemical properties of the pure lubricant, in accordance with certain embodiments of the present invention. The tests were performed based on a Swagelok cell configuration in a horizontal manner. No carbon felt was used unless otherwise stated.

The second test was then conducted in which the liquid phase was a mixture of the lubricant and the electrolyte. As the cyclic voltammogram in FIG. 8 illustrates, the currents for 10 cSt silicone oil and for perfluorodecalin are much lower over the measured voltage range than the other three evaluated lubricants. The inset figure in FIG. 8 shows an expanded view of the data for perfluorodecalin and silicone oil. Silicone oil was the most inert, having immeasurably low current within the voltage window.

Based on these tests, the 10 cSt silicone oil was selected for incorporation into a LIS.

To construct the LIS, a porous commercially available TEFLON® membrane (pore size of 0.2 μm, Sterlitech) was immersed in a bath of 10 cSt silicone oil. To create a thermodynamically stable film, the dip-coating withdrawal velocity may be below a critical speed $V_{crit}=0.121\mu_0\gamma(\delta/l_c)^{3/2}$ where $\mu_0$ is the viscosity of the lubricant, $\gamma$ is the surface tension, $l_c$ is the capillary length, and $\delta$ is the depth of the pores of the membrane. Accordingly, the membrane was withdrawn from the silicone oil bath at V=1 mm/s.

FIG. 4 illustrates the effectiveness of the LIS in producing a super-slippery surface for a lithium polysulfide suspension (0.75 vol % carbon black suspended in TEG-DME solution that comprises of 0.5 M lithium LiTFSI, 1 wt % of LiNO$_3$ and 2.5 M of sulfur in the form of Li$_2$S$_8$). At an incline from the horizontal of 40°, a droplet of the suspension did not flow on an untreated PTFE (TEFLON®) surface. At an incline of 70° from the horizontal, the droplet exhibited contact line pinning, producing an elongated droplet. However, on the silicone oil impregnated structure, the droplet slipped at 40°, and exhibited no contact line pinning, as is seen by the undeformed circular shape of the droplet.

Example 2

Surfaces Designed to be Selectively Wet by the Lubricant

This example demonstrates exemplary LISs for GIF cells. In GIF cells, lubricants should be prevented from spreading out from the LIS and over a current collector, or infiltrating the porous separator membrane.

In this example, surfaces designed to be selective to wetting by the lubricant phase of a LIS, silicone oil (10 cSt), were demonstrated. A droplet of silicone oil was placed on certain surfaces to observe whether the silicone oil spreads.

Figures 9A, 9B, 9C, 9D, 9E:
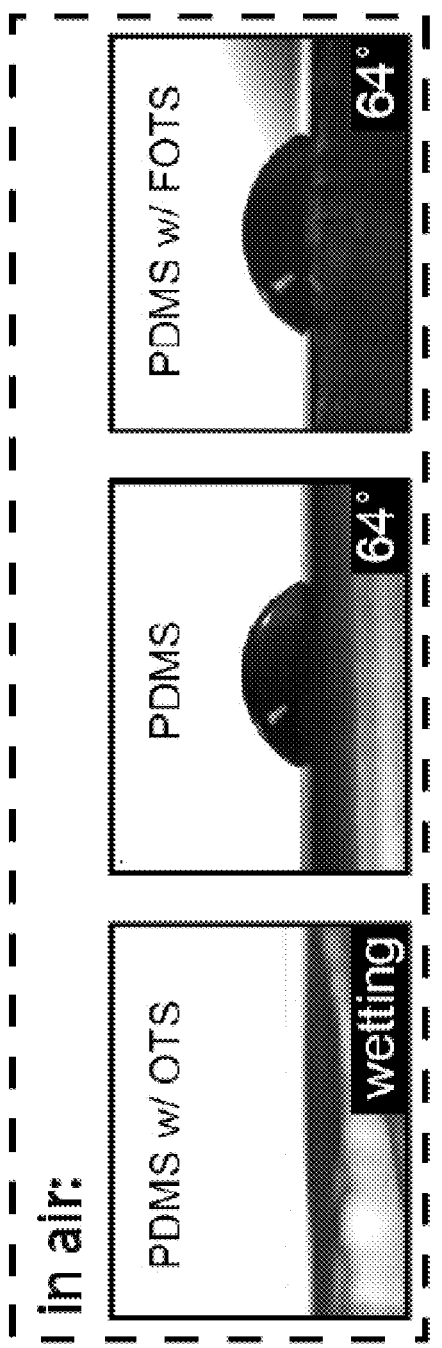
FIGS. 9A-9E show images of silicone oil droplets on certain surfaces, in accordance with certain embodiments of the present invention. The surfaces in FIGS. 9A-9C were exposed to air while the surfaces in FIGS. 9D-9F were immersed in TEG-DME. Surfaces in FIGS. 9A and 9D are made from polydimethylsiloxane (PDMS) functionalized with n-octadecyltrichlorosilane (OTS). Surfaces in FIGS. 9B and 9E are made from un-modified PDMS. Surface in FIG. 9C is PDMS functionalized with trichloro(1H,1H,2H, 2H-perfluorooctyl)silane (FOTS). All surfaces except the one shown in FIG. 9A are non-wetting and prevent silicone oil from spreading.

FIGS. 9A-9E illustrate results showing that surface functionalization can be used to produce surfaces that are wetting and non-wetting to silicone oil. Several surface chemistries are functionalized onto flat polydimethylsiloxane (PDMS) were examined. Un-functionalized PDMS and PDMS functionalized with trichloro(1H,1H,2H,2H-perfluorooctyl)silane were found to prevent silicone oil from spreading (e.g., wetting) in air, as shown in FIGS. 9B and 9C. On the other hand, PDMS functionalized with n-octadecyltrichlorosilane allowed silicone oil to spread in air, as shown in FIG. 9A.

In addition to experiments in air, the same surfaces were examined for their wetting behavior in tetraethylene glycol dimethyl ether (TEG-DME), a typical electrolyte solvent for Li polysulfide flow batteries. The surfaces were immersed in TEG-DME before a droplet of silicone oil was dropped onto each surface to observe the wetting behavior. All the tested surfaces were not wetted by the silicone oil, as shown in FIGS. 9D and 9E.

In some embodiments, the lubricant can be designed to either wet or not wet a surface. In some embodiments, the lubricant can be designed to either wet or not wet a surface when exposed to a gaseous atmosphere. In some embodiments, the lubricant can be designed to either wet or not wet a surface when the surface (and lubricant) is covered by a fluid, such as an internal surface in a liquid electrolyte filled device.

Most electrochemical devices are assembled in air or inert gas environment before being filled with a liquid electrolyte, when it is desirable to prevent the lubricant from wetting specific surfaces, non-wetting behavior in both air and electrolyte is desired to prevent the lubricant from spreading out from the LIS. In this example, un-functionalized PDMS and PDMS functionalized with trichloro(1H,1H,2H,2H-perfluorooctyl)silane are suitable candidates for creating non-wetting surfaces in electrochemical devices using TEG-DME as the electrolyte solvent. In one configuration, a strip of non-wetting surface may be included on either side of the metal current collector in the flow channel to prevent the lubricant in the LIS regions from crossing over to the current collector surfaces.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:
1. An electrochemical device comprising:
an interior surface, at least a first portion of which comprises a plurality of solid features disposed thereon, the plurality of solid features defining a plurality of regions therebetween, and a liquid lubricant disposed in the plurality of regions, the plurality of solid features retaining the liquid lubricant in the plurality of regions during operation of the device, wherein the liquid lubricant stably is held between the plurality of solid features regardless of orientation of the device, thereby providing a liquid lubricant impregnated surface; and
an electroactive phase in contact with at least the first portion of the interior surface, wherein the liquid lubricant impregnated surface introduces a slip at the surface-when the electroactive phase flows along the surface.

2. The electrochemical device of claim 1, wherein the electroactive phase is a non-Newtonian fluid.

3. The electrochemical device of claim 2, wherein the electroactive phase is a yield-stress fluid.

4. The electrochemical device of claim 3, wherein the electroactive phase has a yield-stress between 1 Pa to 2 kPa.

5. The electrochemical device of claim 1, wherein the electroactive phase flows along the first portion of the interior surface such that the first portion is substantially free from residue left by the electroactive phase along its path of flow.

6. The electrochemical device of claim 1, wherein the first portion enables flowing of the electroactive phase solely due to gravity.

7. The electrochemical device of claim 1, wherein the electroactive phase comprises at least one solvent and at least one electrolyte.

8. The electrochemical device of claim 7, wherein the at least one electrolyte is a lithium-containing salt in an organic solvent or combination of solvents or in an aqueous-based solvent or combination of solvents; or
wherein the at least one electrolyte is selected from the group consisting of iron/chromium, bromine/polysulfide, vanadium, zinc/bromine, lithium polysulfide, vanadium, tris(bipyridine)nickel(II)tetrafluoroborate/tris(bipyridine)iron(II)tetrafluoroborate (Ni(Bpy)$_3$(BF$_4$)$_2$/Fe(BPy)$_3$(BF$_4$)$_2$), tris(bipyridine)ruthenium(II) ((Ru(bpy)$_3$]$^{2+}$), and zinc/cerium.

9. The electrochemical device of claim 7, wherein the at least one solvent is selected from the list consisting of water, alkyl carbonates, alkyl phosphonates, phosphites, acetonitrile, propylene carbonate, glyme, diglyme, triglyme, tetraglyme, polyglyme, dioxolane (1,3-dioxolane), dimethyl sulfoxide (DMSO), dichloromethane, ethylene carbonate, tetrahydrafuran (THF), methane sulfonic acid, dimethyl ether (DEM), tetraethylene glycol dimethyl ether (TEG-DME) and dimethoxyethane, and any combination or derivative thereof.

10. The electrochemical device of claim 1, wherein the electroactive phase further comprises at least one flame-retardant additive and/or at least one ion transport enhancer.

11. The electrochemical device of claim 1, wherein the electroactive phase includes at least one conductive additive selected from the group consisting of: metal carbides, metal nitrides, carbon black, graphitic carbon powder, carbon fibers, carbon microfibers, vapor-grown carbon fibers (VGCF), fullerenes, carbon nanotubes (CNTs), multiwall carbon nanotubes (MWNTs), single wall carbon nanotubes (SWNTs), graphene sheets, materials comprising fullerenic fragments that are not predominantly a closed shell or tube of the graphene sheet, and any combination or mixture thereof.

12. The electrochemical device claim 11, wherein the at least one conductive additive is carbon black.

13. The electrochemical device of claim 12, wherein the carbon black is present in the electroactive phase in an amount from between 0.25 vol % to 3 vol %.

14. The electrochemical device of claim 1, wherein the liquid lubricant impregnated surface promotes plug flow, wherein a ratio of slip velocity against mean velocity ($u_w/\bar{u}$) is greater than 0.9.

15. The electrochemical device of claim 1, wherein at least one of the conditions or any combination of conditions (a) through (e) is satisfied:
(a) wherein the solid features have an average dimension in a range of up to 200 microns;
(b) wherein the solid features comprise particles;
(c) wherein a ratio of an exposed surface area of the plurality of solid features to an exposed surface area of the liquid lubricant contained in the plurality of regions is less than 0.5;
(d) wherein the solid features comprise particles and wherein an average spacing between adjacent particles or clusters of particles is in a range of up to 200 microns; and
(e) wherein the interior surface (without the plurality of solid features and the liquid lubricant) has a first roll-off angle and wherein the plurality of solid features and the liquid lubricant collectively define a liquid-impregnated surface, the liquid-impregnated surface having a second roll-off angle, the second roll-off angle being less than the first roll-off angle.

16. The electrochemical device of claim 15, wherein the ratio of the exposed surface area of the plurality of solid features to the exposed surface area of the liquid contained in the plurality of regions is less than 0.3.

17. The electrochemical device of claim 15, wherein the ratio of the exposed surface area of the plurality of solid features to the exposed surface area of the liquid contained in the plurality of regions greater than 0 and less than 0.2.

18. The electrochemical device of claim 15, wherein the second roll-off angle is less than 2°.

19. The electrochemical device of claim 1, wherein the electrochemical device is a member selected from the group consisting of: a battery, a fuel cell, and a capacitor.

20. The electrochemical device of claim 1, wherein the first portion passively promotes at least one effect selected from the list consisting of: (i) increases nucleation of insoluble materials formed during operation of the electrochemical device, (ii) increases growth of insoluble materials formed during operation of the electrochemical device, (iii) increases precipitation of insoluble materials formed during operation of the electrochemical device, and (iv) increases segregation of insoluble materials formed during operation of the electrochemical device at desired locations on the internal surface of the electrochemical device.

21. The electrochemical device of claim 1, wherein the first portion passively promotes at least one effect selected from the list consisting of: (i) inhibits nucleation, (ii) decreases growth, (iii) inhibits precipitation, and (iv) decreases segregation at undesired locations on the internal surface of the electrochemical device of insoluble materials formed during operation of the electrochemical device.

22. The electrochemical device of claim 1, wherein the first portion passively extends an operating temperature range of the electrochemical device.

23. The electrochemical device of claim 1, wherein a second portion of the internal surface does not comprise the plurality of solid features disposed thereon.

24. The electrochemical device of claim 23, wherein the internal surface includes one or more first portions comprising the plurality of solid features disposed thereon and one or more second portions not comprising the plurality of solid features disposed thereon.

25. The electrochemical device of claim 1, wherein the first portion is electronically conductive.

26. The electrochemical device of claim 1, wherein the plurality of solid features comprise an electronically conductive material and/or wherein the liquid lubricant comprises an electronically conductive suspension or polymer solution.

27. The electrochemical device of claim 1, wherein the first portion is ionically conductive.

28. The electrochemical device of claim 27, wherein the plurality of solid features comprise an ion-conducting glass or polymer and wherein the liquid lubricant comprises an ionically conductive liquid.

29. The electrochemical device of claim 1, wherein the liquid lubricant is electrochemically stable.

30. The electrochemical device of claim 1, wherein the liquid lubricant is thermodynamically stable.

31. The electrochemical device of claim 1, wherein the liquid lubricant is immiscible or partially miscible with the electroactive phase.

32. The electrochemical device of claim 1, wherein the plurality of solid features comprise at least one material selected from the group consisting of: hydrocarbons, fluoropolymers, ceramics, polymeric materials, fluorinated materials, intermetallic compounds, and composite materials.

33. The electrochemical device of claim 1, wherein the liquid lubricant is selected from the list consisting of oil-based lubricants, ionic liquids, hexadecane, vacuum pump oils, fluorocarbons, shear-thinning fluids, shear-thickening fluids, liquid polymers, dissolved polymers, viscoelastic fluids, liquid fluoroPOSS, hydrocarbon liquids, fluorocarbon liquids, and/or electronically conducting liquids.

34. The electrochemical device of claim 1, comprising:
a first volume comprising the electroactive phase; and
a second volume separated from the first volume by a separator, wherein the separator spatially separates a positive current collector and a negative current collector, wherein the electroactive phase flows from the first volume to the second volume during operation of the electroactive device.

35. The electroactive device of claim 34, wherein the separator is coated with or comprises a liquid-lubricant impregnated surface.

36. The electroactive phase of claim 34, wherein the first portion is disposed at an interior surface of the first volume.

37. An electroactive device, comprising:
a positive electrode current collector;
a negative electrode current collector;
an ion-permeable membrane separating the positive current collector and the negative current collector;
a positive electrode disposed between the positive electrode current collector and the ion-permeable membrane, the positive electrode current collector and the ion-permeable membrane defining a positive electroactive zone accommodating the positive electrode; and
a negative electrode disposed between the negative electrode current collector and the ion-permeable membrane, the negative electrode current collector and the ion-permeable membrane defining a negative electroactive zone accommodating the negative electrode,
wherein at least a portion of the positive electrode current collector surface that comes into contact with the positive electrode and/or at least a portion of the negative electrode current collector surface that comes into contact with the negative electrode comprises a plurality of solid features disposed thereon, the plurality of solid features defining a plurality of regions therebetween, and a liquid lubricant disposed in the plurality of regions, the plurality of solid features retaining the liquid lubricant in the plurality of regions during operation of the device, wherein the liquid lubricant stably is held between the plurality of solid features regardless of orientation of the device, thereby providing a liquid lubricant impregnated surface,
wherein the liquid lubricant impregnated surface introduces a slip at the surface when the positive electrode or the negative electrode flows along the surface and promotes plug flow of the positive electrode or the negative electrode along the surface.

38. The electroactive device of claim 37, further comprising a positive electrode storage tank and a negative electrode storage tank, wherein at least a portion of an internal surface of the positive electrode storage tank and/or the negative electrode storage tank comprises or is coated with a liquid lubricant impregnated surface.

39. The electroactive device of claim 37, further comprising a positive electrode storage tank and a negative electrode storage tank, wherein the positive electrode storage tank and the negative electrode storage tank are connected to the electroactive zone via piping, wherein at least a portion of an internal surface of the piping comprises or is coated with a liquid lubricant impregnated surface.

40. The electroactive device of claim 37, wherein the ion-permeable membrane comprises or is coated with a liquid-lubricant impregnated surface.

* * * * *